United States Patent
Weston et al.

(10) Patent No.: US 11,014,067 B2
(45) Date of Patent: May 25, 2021

(54) POLYAMINE-APPENDED METAL-ORGANIC FRAMEWORKS FOR CARBON DIOXIDE SEPARATIONS

(71) Applicants: The Regents of the University of California, Oakland, CA (US); ExxonMobil Research and Engineering Company, Annandale, NJ (US)

(72) Inventors: Simon C. Weston, Annandale, NJ (US); Joseph M. Falkowski, Hampton, NJ (US); Jeffrey R. Long, Oakland, CA (US); Eugene J. Kim, Berkeley, CA (US); Jeffrey D. Martell, Berkeley, CA (US); Phillip J. Milner, Ithaca, NY (US); Rebecca L. Siegelman, Berkeley, CA (US)

(73) Assignees: THE REGENTS OF THE UNIVERSITY OF CALIFORNIA, Oakland, CA (US); EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 204 days.

(21) Appl. No.: 16/175,708

(22) Filed: Oct. 30, 2018

(65) Prior Publication Data
US 2019/0126237 A1    May 2, 2019

Related U.S. Application Data

(60) Provisional application No. 62/579,717, filed on Oct. 31, 2017.

(51) Int. Cl.
*B01J 20/22* (2006.01)
*B01J 20/30* (2006.01)
(Continued)

(52) U.S. Cl.
CPC ............ *B01J 20/226* (2013.01); *B01D 53/02* (2013.01); *B01D 53/04* (2013.01);
(Continued)

(58) Field of Classification Search
CPC .. B01J 20/226; B01J 20/3483; B01J 20/3248; B01J 20/3206; B01J 20/3433;
(Continued)

(56) References Cited

U.S. PATENT DOCUMENTS

2012/0070353 A1    3/2012   Trukhan

FOREIGN PATENT DOCUMENTS

CN         104056598 A     9/2014
KR    10-2014-0110645 A    9/2014
(Continued)

OTHER PUBLICATIONS

Cao et al.; Journal of Environmental Sciences 2013, 25(10) 2081-2087. (Year: 2013).*

(Continued)

*Primary Examiner* — Ali Z Fadhel
(74) *Attorney, Agent, or Firm* — Morgan, Lewis & Bockius LLP; Brett A. Lovejoy

(57) ABSTRACT

Polyamines with lengths carefully tailored to the framework dimensions are appended to metal-organic frameworks such as $Mg_2$(dobpdc) (dobpdc4-=4,4'-dioxidobiphenyl-3,3'-dicarboxylate) with the desired loading of one polyamine per two metal sites. The polyamine-appended materials show step-shaped adsorption and desorption profiles due to a cooperative $CO_2$ adsorption/desorption mechanism. Several disclosed polyamine-appended materials exhibit strong ability to capture $CO_2$ from various compositions. Increased stability of amines in the framework has been achieved using high molecular weight polyamine molecules that coordinate multiple metal sites in the framework. The prepa-
(Continued)

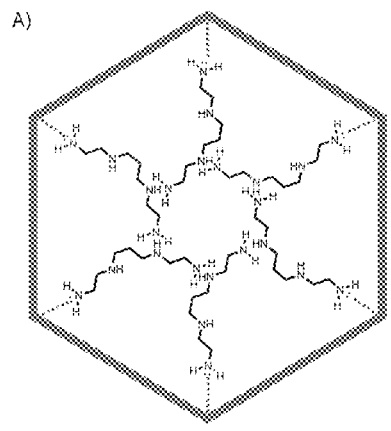

~200% Loading, As-Synthesized

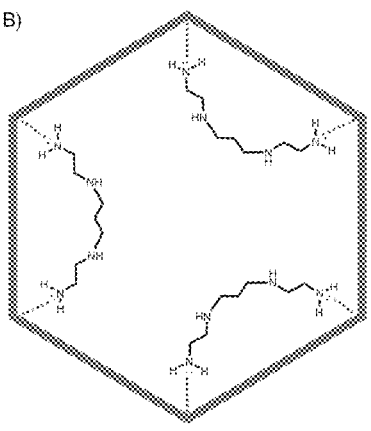

~100% Loading, Post-Activation ration of these adsorbents as well as their characterization are provided.

62 Claims, 49 Drawing Sheets

(51) Int. Cl.
*B01J 20/34* (2006.01)
*B01D 53/04* (2006.01)
*B01D 53/02* (2006.01)
*B01J 20/32* (2006.01)

(52) U.S. Cl.
CPC ....... *B01J 20/3085* (2013.01); *B01J 20/3206* (2013.01); *B01J 20/3248* (2013.01); *B01J 20/3425* (2013.01); *B01J 20/3433* (2013.01); *B01J 20/3466* (2013.01); *B01J 20/3483* (2013.01); *B01J 20/3491* (2013.01); *B01D 2253/202* (2013.01); *B01D 2253/204* (2013.01); *B01D 2253/25* (2013.01); *B01D 2257/504* (2013.01); *B01D 2258/0283* (2013.01); *B01D 2258/05* (2013.01); *B01D 2259/40086* (2013.01)

(58) Field of Classification Search
CPC ............... B01J 20/3491; B01J 20/3085; B01J 20/3466; B01J 20/3425; B01D 53/02; B01D 53/04; B01D 2258/05; B01D 2253/202; B01D 2253/25; B01D 2258/0283; B01D 2259/40086; B01D 2253/204; B01D 2257/504; Y02E 50/30; Y02C 20/40
See application file for complete search history.

(56) References Cited

FOREIGN PATENT DOCUMENTS

| WO | WO 2013/059527 A1 | 4/2013 |
|---|---|---|
| WO | WO 2015/164543 A1 | 10/2015 |
| WO | WO 2017/059130 A2 | 4/2017 |

OTHER PUBLICATIONS

Siegelman et al.; "Controlling Cooperative CO2 Adsorption in Diamine-Appended Mg2(dobpdc) Metal-Organic Frameworks", J. Am. Chem. Soc. 2017, 139, 10526-10538; (Year: 2017).*
U.S. Appl. No. 16/045,616, filed Jul. 25, 2018.
U.S. Appl. No. 16/054,800, filed Aug. 3, 2018.
International Search Report and Written Opinion for International Application No. PCT/US2018/058287 dated Feb. 21, 2019, 16 pages.
Cao, Y. et al., "Capture of carbon dioxide from flue gas on TEPA-grafted metal-organic framework Mg2 (dobdc)", Oct. 1, 2013, J. Environ. Sci. vol. 25, No. 10, pp. 2081-2087.
Su, X. et al., "Postsynthetic Fubctionalization of Mg-MOF-74 with Tetraethylenepentamine: Structural Characterization and Enhanced CO 1 Adsorption", Mar. 15, 2017, ACS Applied Materials & Interfaces, vol. 9, No. 12, pp. 11299-11306.
"CO2 Emissions from Fuel Combustion Highlights," 2016 Edition, International Energy Agency, Paris, France.
Bacsik et al., 2011, Langmuir 27, p. 11118.
Bhown and Freeman, 2011, Environ. Sci. Technol. 45, p. 8624.
Boot-Handford et al., 2014, Energy Environ. Sci. 7, p. 13.
Cabal et al., 2009, J Hazard Matter 166, p. 1289.
Choi et al., 2009, ChemSusChem, 2, p. 796.
Chu, 2009, Science 325, p. 1599.
D'Alessandro et al., 2010, Angew. Chem. Int. Ed., 49, p. 6058.
Darunte et al., 2016, ACS Sustain. Chem. Eng. 4, p. 5761.
Didas et al., 2014, J. Phys. Chem. Lett. 5, 23, p. 4194.
Drage, 2012, J. Mater. Chem. 22, p. 2815.
Drisdell et al., 2015, Phys Chem Chem Phys 17, p. 21448.
Eddaoudi et al., 2002, Science 295, p. 469.
Fracaroli et al., 2014, J. Am. Chem. Soc. 136, p. 8863.
Franchi et al., 2005, Ind. Eng. Chem. Res. 44, 21, p. 8007-8013.
Fredriksen and Jens, 2013, Energy Procedia 37, p. 1770.
Furukawa et al., 2013, Science 341, p. 123044.
Gouedard et al., 2012, Int. J. Greenhouse Gas Control, 10, p. 244.
Haszeldine, 2009, Science 325. p. 1647.
Jo et al., 2017, ChemSusChem 10, p. 541.
Kim et al., 2016, Energy Environ. Sci. 9, p. 1803.
Lackner et al., 2012, PNAS 109(33), p. 13156.
Lee and Park, 2015, Ind. Eng. Chem. 23, p. 1.
Lee et al., 2014, Energy Environ. Sci. 7, p. 744.
Lee et al., 2015, Chem. Sci. 6, p. 3697.
Li et al., 2011, Coord. Chem. Rev. 255, p. 1791.
Li et al., 2016, ChemSusChem 9, p. 2832.
Liao et al., 2016, Chem. Sci. 7, p. 6528.
Lin et al., 2013, Sci. Rep.3, 1859.
Lin et al., 2016, RSC Adv. 6, p. 32598.
Liu et al., 2012, Chem. Soc. Rev. 41, p. 2308.
Liu et al., 2012, Greenhouse Gases Sci. Technol. 2, p. 239.
Mason et al., 2015, J. Am. Chem. Soc. 137, p. 4787.
McDonald et al., 2015, Nature 519, p. 303.
McDonald et al., 2012, J. Am. Chem. Soc. 134, p. 7056.
Milner et al., 2017, J. Am. Chem. Soc. 139, p. 13541.
Milner, P. et al., "Overcoming double-step CO2 adsorption and minimizing water co-adsorption in bulky diamine-appended variants of Mg 2 (dobpdc)", Chemical Science, vol. 9, No. 1, Jan. 1, 2018, pp. 160-174.
Montoro et al., 2012, J. Mater. Chem. 22, p. 10155.
Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014.
Planas et al., 2013, "The Mechanism of Carbon Dioxide Adsorption in an Alkylamine-Functionalized Metal-Organic Framework," J. Am. Chem. Soc. 135, pp. 7402-7405.
Qiao et al., 2016, Chem. Commun. 52, p. 974.
Rochelle, 2009 Science 325, p. 1652.
Sabouni et al., 2014, Environ. Sci. Pollut. Res. 21, p. 5427.
Samanta et al., 2012, Ind. Eng. Chem. Res. 51, p. 1438.
Sayari and Belmabkhout, 2010 J. Am. Chem. Soc. 132, p. 6312.
Serna-Guerrero et al., 2008, Ind. Eng. Chem. Res. 47, 9406.
Shah et al., 2013, Chem Sci Trans. 2, p. 1078.
Siegelman, R. et al., "Controlling Cooperative CO2 Adsorption in Diamine-Appended Mg 2 (dobpdc) Metal-Organic Frameworks," Journal of the American Chemical Society, vol. 139, No. 30, Jul. 19, 2017, pp. 10526-10538.
Sumida et al., 2012, Chem. Rev. 112, p. 724.
Ünveren et al., 2017, Petroleum 3, p. 37.
Veneman et al., 2014, Energy Procedia 63, p. 2336.
Wang and LeVan, 2010, J. Chem. Eng. Data 55, p. 3189.
Woerner, et al., 2016, J. Phys. Chem. C 120, p. 360.
Xu et al., 2005, Ind. Eng. Chem. Res. 44, p. 8113.
Yan et al., 2013, Chem. Commun. 49, p. 6873.
Yu et al., 2017, Chem. Rev., (DOI: 10.1021/acs.chemrev.6b0062).
Zhou et al., 2012, Chem. Rev. 112, p. 673.

* cited by examiner

POLYAMINE-APPENDED METAL-ORGANIC FRAMEWORKS FOR CARBON DIOXIDE SEPARATIONS

CROSS REFERENCE TO RELATED APPLICATION

This application claims priority to U.S. Provisional Patent Application No. 62/579,717, entitled "Polyamine-Appended Metal-Organic Frameworks for Carbon Dioxide Separations," filed Oct. 31, 2017, which is hereby incorporated by reference.

FIELD OF THE PRESENT DISCLOSURE

The present application relates to absorbents comprising polyamine ligands grafted onto metal-organic frameworks for $CO_2$ capture applications.

BACKGROUND

Carbon dioxide ($CO_2$) generated from burning fossil fuels at thermoelectric power plants is likely a major contributor to global climate change. See, Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014. Accordingly, point-source post-combustion capture of $CO_2$ from the flue gas streams of fossil fuel-fired power plants, in which the $CO_2$ is separated from the other constituents of flue gas (primarily $N_2$, $O_2$, and $H_2O$) before it is released into the atmosphere, and sequestration (CCS), has been proposed as a key strategy to minimize global $CO_2$ emissions. See, Pachauri and Meyer, Ibid., Chu, 2009, Science 325, p. 1599, and Haszeldine, 2009, Science 325. p. 1647. Moreover, researchers in the field have predicted that point-source CCS may need to be supplemented with air capture techniques in which excess $CO_2$ in the atmosphere is reduced in order to address $CO_2$ contribution from mobile sources such as automobile and airplane emissions. See Lackner et al., 2012, PNAS 109(33), p. 13156.

As such, there is a need for adsorbents that are specific to $CO_2$. This need has led to significant research in the field of adsorption. Many researchers around the world are engaged in research for developing highly specific and high performance adsorbents. To be used on a large scale and over long periods of time, it is important to develop high performance adsorbents with minimal regeneration energies. Many methods of regeneration are currently being researched. Such methods include thermal regeneration, steam regeneration, pressure swing regeneration, vacuum regeneration, micro wave regeneration, ultrasound regeneration, chemical regeneration, oxidative regeneration, and bio-regeneration. Apart from these regeneration methods, combined effects of these methods have been also explored such as thermo chemical regeneration, electro-chemical etc. See, Cabal et al., 2009, J Hazard Matter 166, p. 1289. As used herein the term "regeneration" is used to refer to desorption.

In the regeneration process the following factors influence the effectiveness of the installation performance: the degree of purification, the separation of a mixture into the components, adsorbent stability, the degree of recovery of adsorbed components and energy consumption. As such, what is sought in suitable regeneration methods is (i) a high degree of desorption of the adsorbed compound(s), (ii) the least possible erosion or mechanical destruction of used adsorbent, (iii) easy access and the ecological safety of used regeneration agent, and (iv) ease of separation of recovered or removed compounds from desorbate. See Shah et al., 2013, Chem Sci Trans. 2, p. 1078. With these considerations in mind, steam regeneration is widely popular and cheap in many regeneration processes because most industrial setups already have steam operation and maintenance units as part of their manufacturing process. Consequently, such steam resources can be tapped into for regeneration.

The most technology-ready materials for CCS applications are aqueous amine solutions due to their low costs, effective performance under humid conditions, and high selectivity for $CO_2$ over $N_2$. For instance, in some such instances, the exhaust from power plants is passed through a fluidized bed of aqueous amine solution. See, Boot-Handford et al., 2014, Energy Environ. Sci. 7, p. 130; Bhown and Freeman, 2011, Environ. Sci. Technol. 45, p. 8624; and Rochelle, 2009, Science 325, p. 1652. However, these sorbents suffer from a number of drawbacks, including low working capacities (~2 wt %), corrosiveness, and thermal degradation upon regeneration of the amine solution. See Boot-Handford, 2014, Fennell, Energy Environ. Sci. 7, p. 130; and Fredriksen and Jens, 2013, Energy Procedia 37, p. 1770; and Gouedard et al., 2012, Int. J. Greenhouse Gas Control, 10, p. 244. In particular, at least on the high volume scale needed for industrial regeneration of $CO_2$ absorbents, aqueous amines to date have been unsatisfactory because of such thermal degradation.

Porous solid adsorbents are also of interest for $CO_2$ adsorbent applications because of their increased stability compared to aqueous amine solutions and potentially lower regeneration energies. See, Drage, 2012, J. Mater. Chem. 22, p. 2815. These favorable properties have led to their investigation as adsorbents for CCS. For selected reviews, see: Lee and Park, 2015, Ind. Eng. Chem. 23, p. 1; Samanta et al., 2012, Ind. Eng. Chem. Res. 51, p. 1438; and Choi et al., 2009, ChemSusChem 2, p. 796. Unfortunately, $CO_2$ adsorption in most of these materials is impaired by the water present in flue gas, which passivates the $CO_2$ binding sites and/or degrades the material. See, Woerner et al., 2016, J. Phys. Chem. C 120, p. 360; Kim et al., 2016, Energy Environ. Sci. 9, p. 1803; Mason et al., 2015, J. Am. Chem. Soc. 137, p. 4787; and Wang and LeVan, 2010, J. Chem. Eng. Data 55, p. 3189.

Amine-functionalized porous solids, such as amine-appended silicas, combine the best of both classes of materials while maintaining high $CO_2/N_2$ selectivities under humid conditions. See, Lee and Park., 2015, Ind. Eng. Chem. 23, p. 1; Samanta et al., 2012, Ind. Eng. Chem. Res. 51, p. 1438; Choi et al., 2009, ChemSusChem 2, p. 796; Kim et al., 2016, Energy Environ. Sci. 9, p. 1803; Mason et al., 2015, J. Am. Chem. Soc. 137, p. 4787; Unveren et al., 2017, Petroleum 3, p. 37; Didas et al., 2014, J. Phys. Chem. Lett. 5, p. 4194; Bacsik et al., 2011, Langmuir 27, p. 11118; Sayari and Belmabkhout, 2010, J. Am. Chem. Soc. 132, p. 6312; Serna-Guerrero et al., 2008, Ind. Eng. Chem. Res. 47, p. 9406. However, one often overlooked drawback of many of these adsorbents is the significant co-adsorption of $H_2O$ upon $CO_2$ adsorption, contributing to parasitic energy costs upon regeneration as water is desorbed from the bed with $CO_2$. See, Mason et al., 2015, J. Am. Chem. Soc. 137, p. 4787; Veneman et al., 2014, Energy Procedia 63, p. 2336; Xu et al., 2005, Ind. Eng. Chem. Res. 44, p. 8113; and Franchi et al., 2005, Ind. Eng. Chem. Res. 44, p. 8007.

Metal-organic frameworks are a class of porous solids consisting of metal nodes connected by polytopic organic linkers that allow for precise control over pore architecture and thus fine-tuning of adsorbent properties. See, Zhou et al., 2012, Chem. Rev. 112, p. 673; Furukawa et al., 2013, Science 341, p. 123044; and Eddaoudi et al., 2002, Science 295, p. 469. Many metal-organic frameworks have been evaluated for CCS. For selected reviews, see: Yu et al., 2017, Chem. Rev., (DOI: 10.1021/acs.chemrev.6b0062); Sabouni et al., 2014, Environ. Sci. Pollut. Res. 21, p. 5427; Sumida et al., 2012, Chem. Rev. 112, p. 724; Liu et al., 2012, Greenhouse Gasses Sci. Technol. 2, p. 239; Li et al., 2011, Coord. Chem. Rev. 255, p. 1791; and D'Alessandro et al., 2010, Angew. Chem. Int. Ed., 49, p. 6058.

In particular, amine-functionalized (Sumida et al., 2012, Chem. Rev. 112, p. 724; Lin et al., 2016, RSC Adv. 6, p. 32598; Qiao et al., 2016, Chem. Commun. 52, p. 974; Liao et al., 2016, Chem. Sci. 7, p. 6528; Fracaroli et al., 2014, J. Am. Chem. Soc. 136, p. 8863; Cao et al., 2013, J. Environ. Sci. 25, p. 2081; Montoro et al., 2012, J. Mater. Chem. 22, p. 10155; Liu et al., 2012, Chem. Soc. Rev. 41, p. 2308) metal-organic frameworks are promising for these applications due to their ability to capture $CO_2$ in the presence of water while potentially minimizing water co-adsorption.

A promising approach is to graft amine-based ligands to metal-organic frameworks. For instance, alkylethylenediamine-appended variants of the metal-organic framework $Mg_2$(dobpdc) (dobpdc$^{4-}$=4,4'-dioxidobiphenyl-3,3'-dicarboxylate, FIG. 1) are promising owing to their unique step-shaped $CO_2$ adsorption isotherms (FIG. 2). See, McDonald et al., 2012, J. Am. Chem. Soc. 134, p. 7056; Long et al., "Alkylamine functionalized metal-organic frameworks for composite gas separations," International Publication No. WO2013059527 A1, published Apr. 25, 2013; and McDonald et al., 2015, Nature 519, p. 303. These step-shaped isotherms enable high working capacities to be achieved (>3 mmol/g) with minimal temperature swings (~50° C.). Extensive mechanistic studies revealed that the unique step-shaped $CO_2$ adsorption steps of this material (and those of the Mn, Fe, Co, and Zn congeners) result from the cooperative formation of ammonium carbamate chains along the pores of the framework. See McDonald et al., 2015, Nature 519, p. 303. Based on this work, several other alkylethylenediamine-appended variants of $Mg_2$(dobpdc) have been described and studied, although few of these diamine-appended materials possess the requisite stability to adsorption/desorption cycling for carbon capture applications, likely due to the fact that each diamine is tethered to the material through a single M-N bond. See, Jo et al., ChemSusChem, 10, p. 541; Lee et al., 2015, Chem Sci. 6, p. 3697; Lee et al., 2014, Energy Environ. Sci. 7, p. 744; and Siegelman et al., 2017, J. Am. Chem. Soc. 2017, 139, p. 10526. For instance, one drawback generally associated with diamine-appended materials is the amine volatility. See, Milner et al., 2018, Chem. Sci. 9, p. 160.

Moreover, although the grafting of polyamines larger than diamines to other metal-organic frameworks such as $Mg_2$(dobdc) (dobdc$^{4-}$=2,5-dioxidobenzene-1,4-dicarboxylate) has been reported, the coordination of individual amine-based ligands to multiple metal sites in these materials, particularly within an ordered arrangement, has not been reliably demonstrated. See Su et al., 2017, ACS Appl. Mater. Interfaces 9, p. 11299; Darunte et al., 2016, ACS Sustain. Chem. Eng. 4, p. 5761; Li et al., 2016, ChemSusChem 9, p. 2832; Lin et al., 2013, Sci. Rep. 3, 1859; Cao, 2013, J. Environ. Sci. 25, 2081; and Yan et al., 2013, Chem. Commun. 49, p. 6873. In addition, none of these previously described materials possess step-shaped $CO_2$ adsorption profiles. Moreover, to date, the data provided for these previously described polyamine charged metal-organic frameworks materials indicate that activation conditions that would make such materials well suited for steam based regeneration processes have yet to be elucidated.

Accordingly, what is needed in the art are polyamine metal-organic frameworks, in which the polyamines are grafted to the metal-organic framework through coordination to multiple metal sites, that exhibit step-shaped $CO_2$ adsorption profiles, and enable effective capture of $CO_2$ at low partial pressures (e.g., an approximately 40° C. or higher temperature step occurring at or below a $CO_2$ partial pressure of 15 mbar for $CO_2$ capture from coal flue gas, or at or below a $CO_2$ partial pressure of 4 mbar at a temperature of 40° C. or higher for $CO_2$ capture from natural gas flue gas, or at or below a $CO_2$ partial pressure of 400 ppm at 25° C. for carbon capture from air). Moreover, what is needed in the art are polyamine-functionalized metal-organic frameworks that are sufficiently stable to be used in steam based regeneration processes on an industrial scale.

SUMMARY

The present disclosure addresses the above-identified shortcomings by providing a procedure for grafting polyamines, such as triamines, tetramines and pentamines, to $Mg_2$(dobpdc) and related metal-organic frameworks through coordination to multiple metal sites, which greatly decreases amine volatilization. The resulting polyamine-appended frameworks adsorb $CO_2$ cooperatively, resulting in step-shaped $CO_2$ adsorption profiles. In addition, these materials maintain $CO_2$ adsorption steps in the presence of water vapor, and these polyamine materials are potentially stable to steam, making them highly promising for carbon capture from humid gas streams.

One aspect of the present disclosure provides activated absorbents comprising polyamine ligands grafted onto a metal-organic framework and exhibiting step-shaped $CO_2$ adsorption and desorption profiles. Such adsorbents have a wide range of technical applications, such as for $CO_2$ capture.

In some embodiments, the disclosed metal-organic frameworks are composed of polytopic organic linkers coordinated with metal cations such as Mg, Ca, Mn, Cr, Fe, Co, Ni, Cu, or Zn.

In some embodiments, the disclosed metal-organic frameworks are composed of polytopic organic linkers coordinated with metal cations such as Be, Mg, Ca, Ti, V, Cr, Mn, Fe, Co, Ni, Cu, Zn, Zr, Nb, Mo, Ru, Rh, Pd, Cd, or Hf.

In some embodiments the disclosed metal-organic frameworks include two or more different metal cations (e.g., Mg and Ca). In some embodiments the disclosed metal-organic frameworks include three or more different metal cations. In some embodiments the disclosed metal-organic frameworks a single type of metal cation. Examples of the polytopic organic linkers include 4,4'-dioxidobiphenyl-3,3'-dicarboxylate; 4,4"-dioxido-[1,1':4',1"-terphenyl]-3,3"-dicarboxylate; 2,5-dioxidobenzene-1,4-dicarboxylate; and 3,3-dioxidobiphenyl-4,4-dicarboxylate.

Another aspect of the present disclosure provides methods for charging the disclosed absorbents with polyamines. The disclosed charging methods include grafting polyamine ligands onto a metal-organic framework in an organic solvent to form unactivated adsorbent (having excess polyamines present in the pore), followed by subjecting the unactivated adsorbent to an inert stream of gas at elevated temperatures or by washing the unactivated adsorbent with a noncoordinating solvent such as toluene at 60-80° C., thereby activating the absorbent (obtaining a polyamine loading of one polyamine for every two metals present in the framework).

One aspect of the present disclosure provides an adsorption material comprising a metal-organic framework. The metal-organic framework comprises (i) a plurality of metal cations and (ii) a plurality of polytopic organic linkers. The adsorption material further comprises a plurality of polyamine ligands. In some non-limiting embodiments, the adsorption material has a polyamine ligand: metal-organic framework metal cation loading ratio of 0.3 or less to 1 (e.g. 0.25 to 1, meaning one polyamine ligand per four metal sites), 0.4 or less to 1 (e.g., 0.35 to 1), 0.5 or less to 1 (e.g. 0.45 to 1), 0.6 or less to 1 (e.g. 0.50 to 1 meaning one polyamine ligand per two metal sites), 0.7 or less to 1 (e.g. 0.6 to 1), 0.7 or less to 1 (e.g. 0.65 to 1), 0.8 or less to 1 (e.g. 0.75 to 1 meaning three polyamine ligands per four metal sites), or 0.9 or less to 1 (e.g. 0.85 to 1). In some non-limiting embodiments, the adsorption material has a polyamine ligand: metal-organic framework metal cation loading ratio of 0.3 or less to 1.5 (e.g. 0.25 to 1.5), 0.4 or less to 1.5 (e.g., 0.35 to 1.5), 0.5 or less to 1.5 (e.g. 0.45 to 1.5), 0.6 or less to 1.5 (e.g. 0.50 to 1.5), 0.7 or less to 1.5 (e.g. 0.6 to 1.5), 0.7 or less to 1.5 (e.g. 0.65 to 1.5), 0.8 or less to 1.5 (e.g. 0.75 to 1.5), or 0.9 or less to 1.5 (e.g. 0.85 to 1.5). In some embodiments, the polyamine ligand: metal-organic framework metal cation loading ratio is some other ratio not referenced above. Each respective polyamine ligand in the plurality of polyamine ligands comprises:

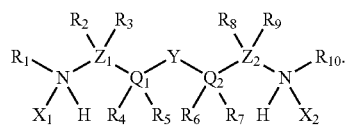

In this formula, $X_1$ and $X_2$ are respective first and second metal cations in the plurality of metal cations (e.g., Be, Mg, Ca, Ti, V, Cr, Fe, Co, Ni, Cu, Zn, Zr, Nb, Mo, Ru, Rh, Pd, Cd, or Hf). Further, Y is:

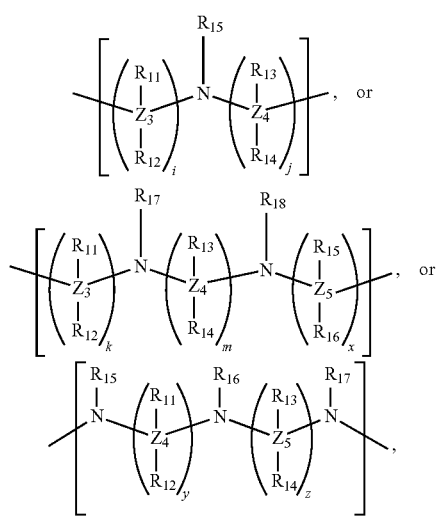

and
$Z_1$, $Z_2$, $Z_3$, $Z_4$, $Z_5$, $Q_1$ and $Q_2$ are each independently carbon, silicon, germanium, sulfur, or selenium. The values i, j, k, x, y, and z are each independently 0, 1, or 2, while m is 2, 3, or 4. Each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted arlyoxy, or substituted or unsubstituted heteroaryloxy.

Another aspect of the present disclosure provides a method for abating $CO_2$ from a flue gas in which the flue gas is contacted with any adsorption material of the present disclosure to reversibly adsorb $CO_2$ from the flue gas thereby generating an adsorption material enriched for $CO_2$ and then stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method for removing $CO_2$ from a biogas. The method comprises contacting the biogas with any adsorption material of the present disclosure to reversibly adsorb $CO_2$ from the biogas thereby generating an adsorption material enriched for $CO_2$ and a residual gas that is greater than 98 percent pure methane. In some such embodiments, the method further comprises stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method for removing $CO_2$ from a hydrocarbon reservoir. The method comprises contacting the hydrocarbon reservoir with any adsorption material of the present disclosure to reversibly adsorb $CO_2$ from the hydrocarbon reservoir thereby generating an adsorption material enriched for $CO_2$. In some such embodiments, the method further comprises stripping a major portion of the $CO_2$ from the adsorption material enriched for $CO_2$ using a temperature swing adsorption method, vacuum swing adsorption method, a pressure swing adsorption method, a concentration swing adsorption method, or a combination thereof.

Still another aspect of the present disclosure provides a method of sequestering carbon dioxide produced by a source. The method comprises exposing the carbon dioxide to an adsorption material of the present disclosure whereby the carbon dioxide is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Another aspect of the present disclosure provides a method of synthesizing an adsorption material in which a plurality of polyamine ligands is grafted onto a metal-organic framework. The metal-organic framework comprises a plurality of metal cations and a plurality of polytopic organic linkers. The grafting comprises exposing an amount of the metal-organic framework to a solution comprising the polyamine ligand diluted with a solvent thereby forming an unactivated adsorption material. Each polyamine ligand has the formula:

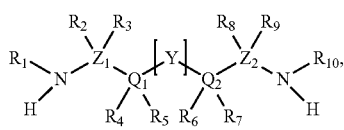

and where Y is:

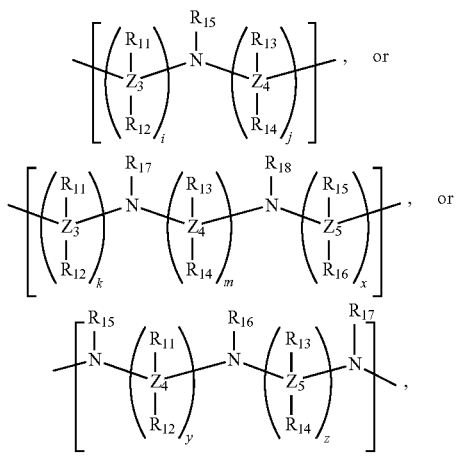

$Z_1$, $Z_2$, $Z_3$, $Z_4$, $Z_5$, $Q_1$ and $Q_2$ are each independently carbon, silicon, germanium, sulfur, or selenium, i, j, k, x, y, and z are each independently 0, 1, or 2, and m is 2, 3, or 4. Further, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted arlyoxy, or substituted or unsubstituted heteroaryloxy. In some embodiments, the unactivated (e.g., having excess polyamines present in the pore) adsorption material is subjected to an inert stream of gas at elevated temperatures (e.g., at a temperature of at least 165° C., at least 190° C., at least 210° C., or between 190° C. and 250° C., thereby activating (e.g., obtaining a polyamine loading of one polyamine for every two metals, one polyamine for every three metals in the framework, or one polyamine for every four metals in the framework) the adsorption material. In some embodiments, the unactivated adsorption material is washed with a weakly coordinating or non-coordinating solvent at a temperature of between 60° C. and 180° C. thereby activating the adsorption material. Representative and non-limiting examples of weakly coordinating or non-coordinating solvents can include toluene, chlorobenzene, paraffins, halogenated paraffins, and the like, as well as combinations thereof. In some embodiments, the unactivated adsorption material is placed under a vacuum at a temperature of greater than 60° C. thereby activating the adsorption material. In some embodiments, the unactivated adsorption material is subjected to one or more cycles of (i) an inert stream of gas at elevated temperatures (e.g., a temperature of at least 165° C.) followed by (ii) placement under a vacuum at a temperature of greater than 60° C. thereby activating the adsorption material. In some embodiments, the unactivated adsorption material is subjected to a plurality of evacuate-refill cycles, in which an inert gas such as argon or nitrogen, or mixtures thereof is used in the refill cycle. In some embodiments, the unactivated adsorption material is subjected to a plurality of evacuate-refill cycles under elevated temperatures, such as greater than 60° C., in which an inert gas such as argon or nitrogen, or mixtures thereof is used in the refill cycle. In some embodiments, the adsorption material is characterized as activated when it has a polyamine ligand loading of 120 percent or less, where a loading of 100% corresponds to one polyamine ligand per two metal sites.

Referring back to the synthesis of the adsorption material, in some embodiments, the solvent is toluene. In some embodiments, the solvent is toluene, water, methanol, dichloromethane, tetrahydrofuran, cyclohexane, pentane, 2-butanone, trichloroethylene, methyl-t-butyl ether, heptane, diethyl ether, or a mixture thereof. In some embodiments, the inert stream of gas is nitrogen gas, argon gas, or a mixture thereof.

In some embodiments, the activated adsorption material has a polyamine ligand loading of 110 percent or less.

In some embodiments, each metal cation in the plurality of metal cations is Mg, Ca, Mn, Cr, Fe, Co, Ni, Cu, or Zn.

Another aspect of the present disclosure provides a method for removing $CO_2$ from a multi-component gas mixture comprising $CO_2$ and at least one of $N_2$, $H_2O$, and $O_2$, the method comprising contacting the multi-component gas mixture with the adsorption material of any one of claims 1-33 to reversibly adsorb $CO_2$ from the multi-component gas mixture thereby generating an adsorption material enriched for $CO_2$ and a residual gas that is depleted of $CO_2$ (e.g., less than 10% v/v $CO_2$ remaining in the multi-component gas mixture, less than 5% v/v $CO_2$ remaining in the multi-component gas mixture, less than 2% v/v $CO_2$ remaining in the multi-component gas mixture, less than 1000 ppm at 25° C. in the multi-component gas mixture, less than 500 ppm at 25° C. in the multi-component gas mixture, etc. upon depletion).

DETAILED DESCRIPTION OF THE INVENTION

I. Introduction

Figure 1:
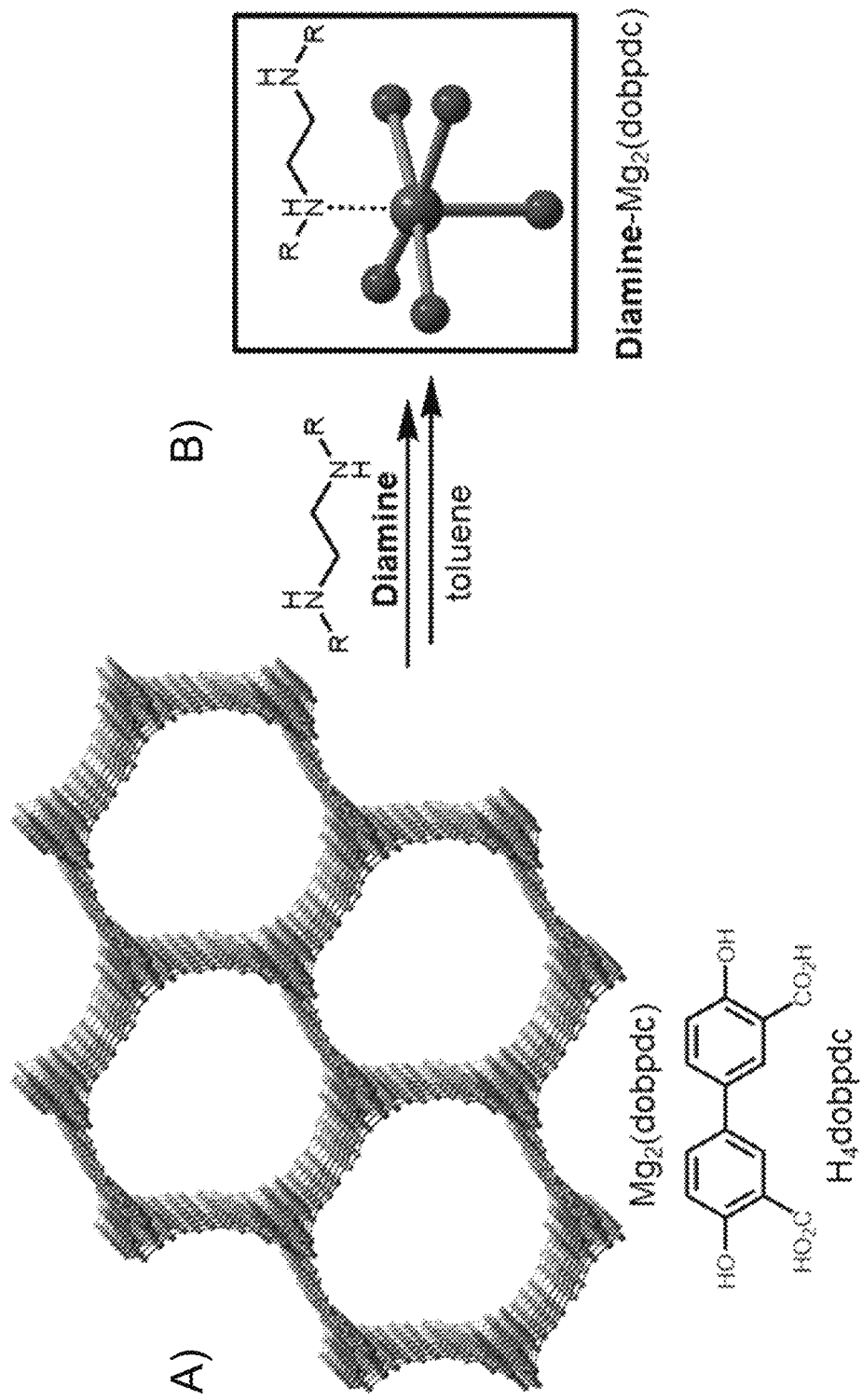
FIG. 1 illustrates a structure of the metal-organic framework $Mg_2$(dobpdc) (dobpdc$^{4-}$=4,4'-dioxidobiphenyl-3,3'-dicarboxylate) (panel A) and appending alkylethylenediamines to the open Mg' sites of the framework (panel B) to yield adsorbents displaying step-shaped adsorption of $CO_2$.
Figure 2:
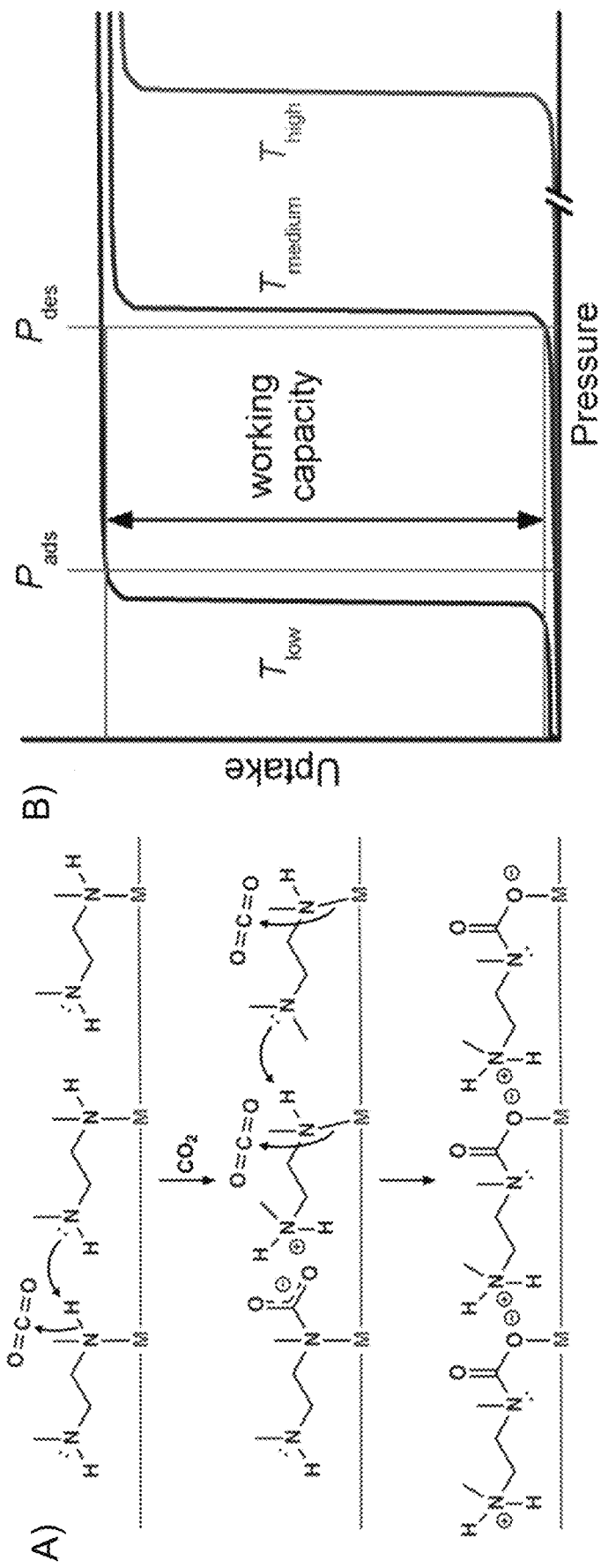
FIG. 2 illustrates cooperative formation of ammonium carbamate chains in alkylethylenediamine-appended variants of $Mg_2$(dobpdc) that lead to step-shaped adsorption isotherms (panel A) that enable high working capacities to be achieved (panel B) in accordance with the present disclosure.

Recently, a new class of diamine-appended metal-organic frameworks has been evaluated that is prepared by post-synthetically appending alkylethylenediamines and 1,3-diaminopropanes to the open Mg$^{2+}$ sites of Mg$_2$(dobpdc) (dobpdc$^{4-}$=4,4'-dioxidobiphenyl-3,3'-dicarboxylate), a metal-organic framework possessing 1-dimensional hexagonal channels lined with Mg$^{2+}$ sites as illustrated in FIG. 1, Panel A. See, McDonald et al., 2015, Nature 519, p. 303; Drisdell et al., 2015, Phys Chem Chem Phys 17, p. 2144; McDonald, 2012, J. Am. Chem. Soc. 134, p. 7056; Jo et al., 2017, ChemSusChem 10, p. 541; Lee et al., 2015, Chem. Sci. 6, p. 3697; Lee et al., 2014, Energy Environ. Sci. 7, p. 744; and Milner et al., 2017, J. Am. Chem. Soc. 139, p. 13541. FIG. 1, panel B, illustrates diamine functionalization of these materials.

Herein, a procedure for grafting polyamines (specifically triamines, tetramines and pentamines) to Mg$_2$(dobpdc) and related metal-organic frameworks through coordination to multiple metal sites, thereby greatly decreasing amine volatilization, is provided. These polyamines are grafted to the framework and then heated at a critical temperature thereby enabling the formation of the desired adducts possessing polyamines that are coordinated to multiple metal sites in the framework. The resulting polyamine-appended frameworks adsorb CO$_2$ cooperatively, likely via formation of ammonium carbamate chains, resulting in step-shaped CO$_2$ adsorption profiles. In addition, these materials maintain CO$_2$ adsorption steps in the presence of water vapor and these polyamine materials are potentially stable to steam, making them highly promising for carbon capture from humid gas streams.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —CH$_2$O— is intended to also optionally recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. C$_1$-C$_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated C$_{9-10}$, oleoyl chain or the diunsaturated C$_{9-10, 12-13}$ linoeyl chain.

The term "alkylene" by itself or as part of another substituent means a metal radical derived from an alkane, as exemplified, but not limited, by —CH$_2$CH$_2$CH$_2$CH$_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a metal radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R"', —OC(O)R', —C(O)R', —CO$_2$R', —CONR'R", —OC(O)NR'R", —NR"C(O)R', —NR'C(O)NR"R"', —NR"C(O)$_2$R', —NR—C(NR'R"R"')=NR"", —NR C(NR'R")=NR"', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents," which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, OR', =O, =NR', =N—OR', —NR'R", —SR', -halogen, —SiR'R"R"', —OC(O)R', —C(O)R', CO$_2$R', —CONR'R", —OC(O)NR'R", —NR"C(O)R', —NR'C(O)NR"R"', —NR"C(O)$_2$R', —NR—C(NR'R"R"')=NR"", —NR C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"' are preferably independently selected from hydrogen or substituted or unsubstituted ($C_1$-

$C_6$) alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

"—COOH" as this term is used is meant to optionally include —C(O)O$^-$ and —C(O)O$^-$X$^+$, where X$^+$ is a cationic counter-ion. Likewise, a substituent having the formula—N(R)(R) is meant to optionally include —N$^+$H(R)(R) and —N$^+$H(R)(R)Y$^-$, where Y$^-$ represents an anionic counter-ion. Exemplary polymers of the invention include a protonated carboxylic moiety (COOH). Exemplary polymers of the invention include a deprotonated carboxylic moiety (COO$^-$). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides an adsorption material comprising a metal-organic framework. The metal-organic framework comprises (i) a plurality of metal cations and (ii) a plurality of polytopic organic linkers. The adsorption material further comprises a plurality of polyamine ligands. In some embodiments, the adsorption material has a polyamine ligand: metal-organic framework metal cation loading ratio of 0.3 or less to 1 (e.g. 0.25 to 1, meaning one polyamine ligand per four metal sites), 0.4 or less to 1 (e.g., 0.35 to 1), 0.5 or less to 1 (e.g. 0.45 to 1), 0.6 or less to 1 (e.g. 0.50 to 1 meaning one polyamine ligand per two metal sites), (0.7 or less to 1 (e.g. 0.6 to 1), 0.7 or less to 1 (e.g. 0.65 to 1), (0.8 or less to 1 (e.g. 0.75 to 1 meaning three polyamine ligands per four metal sites), or (0.9 or less to 1 (e.g. 0.85 to 1). In some embodiments, the polyamine ligand: metal-organic framework metal cation loading ratio is some other ratio not referenced above. Each respective polyamine ligand in the plurality of polyamine ligands comprises:

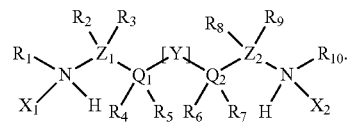

In this formula, $X_1$ and $X_2$ are respective first and second metal cations in the plurality of metal cations (e.g., Mg, Ca, Mn, Cr, Fe, Co, Ni, Cu, or Zn). Further, Y is:

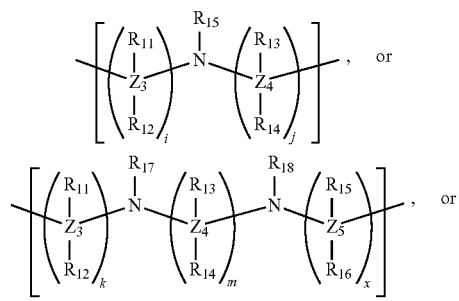

-continued

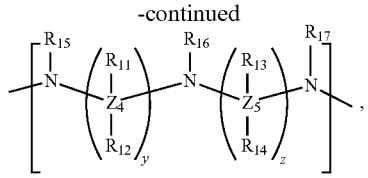

and
$Z_1, Z_2, Z_3, Z_4, Z_5, Q_1$ and $Q_2$ are each independently carbon, silicon, germanium, sulfur, or selenium. The values i, j, k, x, y, and z are each independently 0, 1, or 2, while m is 2, 3, or 4. Each instance of each $R_1, R_2, R_3, R_4, R_5, R_6, R_7, R_8, R_9, R_{10}, R_{11}, R_{12}, R_{13}, R_{14}, R_{15}, R_{16}, R_{17}$, and $R_{18}$ is independently H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, substituted or unsubstituted alkoxy, substituted or unsubstituted arlyoxy, or substituted or unsubstituted heteroaryloxy.

In some embodiments, at least twenty percent, in at least forty percent, in at least sixty percent, in at least eighty percent, or at least ninety-eight percent of the plurality of polyamine ligands are each (i) amine appended by a first amine of the respective polyamine ligand to a first metal cation in the plurality of metal cations and (ii) amine appended by a second amine of the respective polyamine ligand to a second metal cation in the plurality of metal cations of the metal-organic framework.

In some embodiments, Y is:

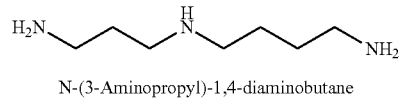

and
(a) i and j are each zero, (b) i is one and j is zero, (c) i is one and j is one, or (d) i is one and j is two.

An example of such embodiments where i and j are each zero is:

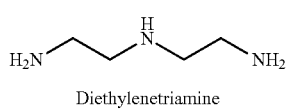

Diethylenetriamine

In the case of diethylenetriamine, $Z_1, Z_2, Q_1$ and $Q_2$ are each carbon, i is zero, j is zero and $R_1, R_2, R_3, R_4, R_5, R_6, R_7, R_8, R_9$, and $R_{10}$, are each hydrogen.

An example of such embodiments where i is one and j is zero is:

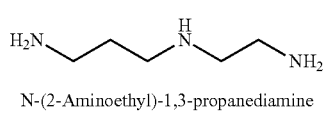

N-(2-Aminoethyl)-1,3-propanediamine

In the case of N-(2-Aminoethyl)-1,3-propanediamine, $Z_1, Z_2, Z_3, Q_1$ and $Q_2$ are each carbon, i is one, j is zero, and $R_1, R_2, R_3, R_4, R_5, R_6, R_7, R_8, R_9, R_{10}, R_{11}$ and $R_{12}$ are each hydrogen.

An example of such embodiments where i is one and j is one is:

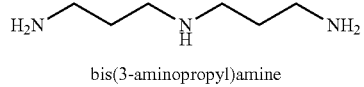

bis(3-aminopropyl)amine

In the case of bis(3-aminopropyl)amine, $Z_1, Z_2, Z_3, Z_4, Q_1$ and $Q_2$ are each carbon, i is one, j is one, and $R_1, R_2, R_3, R_4, R_5, R_6, R_7, R_8, R_9, R_{10}, R_{11}, R_{12}, R_{13}$, and $R_{14}$ are each hydrogen.

An example of such embodiments where i is one and j is two is:

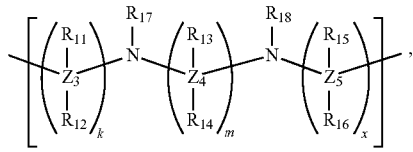

N-(3-Aminopropyl)-1,4-diaminobutane

In the case of N-(3-Aminopropyl)-1,4-diaminobutane, $Z_1, Z_2, Z_3, Z_4, Q_1$ and $Q_2$ are each carbon, i is one, j is two, $R_1, R_2, R_3, R_4, R_5, R_6, R_7, R_8, R_9, R_{10}, R_{11}$, and $R_{12}$ are each hydrogen, and each instance of the two instances of $R_{13}$ and $R_{14}$ is hydrogen.

Alternatively, in some embodiments, Y is:

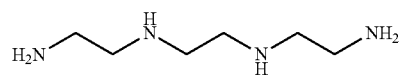

and k and x are zero, and m is two or three. An example of such embodiments is:

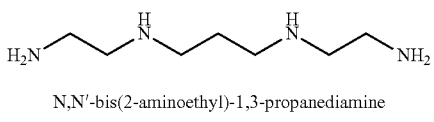 [SMILES: NCCNCCCNCCN]

Triethylenetetramine

In the case of triethylenetetramine, $Z_1, Z_2, Z_4, Q_1$ and $Q_2$ are each carbon, k is zero, x is zero, $R_1, R_2, R_3, R_4, R_5, R_6, R_7, R_8, R_9$, and $R_{10}$, are each hydrogen, each instance of the two instances of $R_{13}$ and $R_{14}$ is hydrogen, and m is two. Another example of such embodiments is:

N,N'-bis(2-aminoethyl)-1,3-propanediamine

In the case of N,N'-bis(2-aminoethyl)-1,3-propanediamine, $Z_1, Z_2, Z_4, Q_1$ and $Q_2$ are each carbon, k is zero, x is zero, m is three, $R_1, R_2, R_3, R_4, R_5, R_6, R_7, R_8, R_9$, and $R_{10}$ are each hydrogen, and each instance of the three instances of $R_{13}$, and $R_{14}$ is hydrogen.

Alternatively, in some embodiments, Y is:

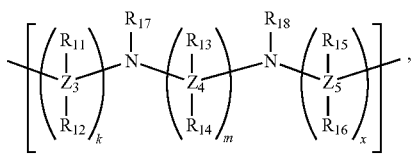

k and x are each one, and m is two, three or four. An example of such embodiments is:

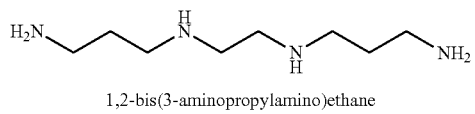 [SMILES: NCCCNCCNCCCN]
1,2-bis(3-aminopropylamino)ethane

In the case of 1,2-bis(3-aminopropylamino)ethane, $Z_1$, $Z_2$, $Z_3$, $Z_4$, $Z_5$, $Q_1$ and $Q_2$ are each carbon, k is one, x is one, $R_1$, $R_2$, $R_3$, $R_4$, $R_5$, $R_6$, $R_7$, $R_8$, $R_9$, $R_{10}$, $R_{11}$, $R_{12}$, $R_{15}$, $R_{16}$, $R_{17}$ and $R_{18}$ are each hydrogen, each instance of the two instances of $R_{13}$ and $R_{10}$ is hydrogen, and m is two. Another example of such embodiments is:

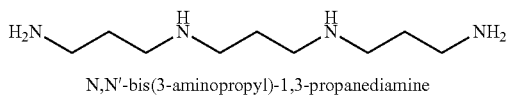 [SMILES: NCCCNCCCNCCCN]
N,N'-bis(3-aminopropyl)-1,3-propanediamine

In the case of N,N'-bis(3-aminopropyl)-1,3-propanediamine, $Z_1$, $Z_2$, $Z_3$, $Z_4$, $Z_5$, $Q_1$ and $Q_2$ are each carbon, k is one, x is one, $R_1$, $R_2$, $R_3$, $R_4$, $R_5$, $R_6$, $R_7$, $R_8$, $R_9$, $R_{10}$, $R_{11}$, $R_{12}$, $R_{15}$, $R_{16}$, $R_{17}$ and $R_{18}$ are each hydrogen, each instance of the three instances of $R_{13}$ and $R_{14}$ is hydrogen, and m is three. Another example of such embodiments is:

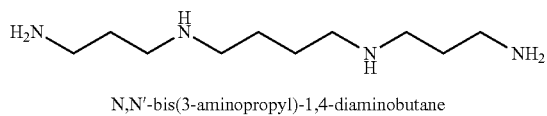 [SMILES: NCCCNCCCCNCCCN]
N,N'-bis(3-aminopropyl)-1,4-diaminobutane

In the case of N,N'-bis(3-aminopropyl)-1,4-diaminobutane, $Z_1$, $Z_2$, $Z_3$, $Z_4$, $Z_5$, $Q_1$ and $Q_2$ are each carbon, k is one, x is one, $R_1$, $R_2$, $R_3$, $R_4$, $R_5$, $R_6$, $R_7$, $R_8$, $R_9$, $R_{10}$, $R_{11}$, $R_{12}$, $R_{15}$, $R_{16}$, $R_{17}$ and $R_{18}$ are each hydrogen, each instance of the four instances of $R_{13}$ and $R_{14}$ is hydrogen, and m is four.

Alternatively, in some embodiments, Y is:

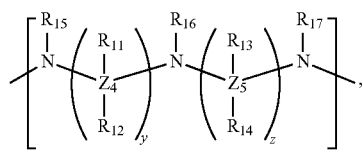

and
y and z are each two. An example of such embodiments is:

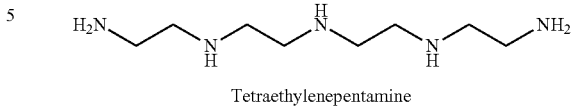
Tetraethylenepentamine

In the case of tetraethylenepentamine, $Z_1$, $Z_2$, $Z_4$, $Z_5$, $Q_1$ and $Q_2$ are each carbon, y is two, z is two, $R_1$, $R_2$, $R_3$, $R_4$, $R_5$, $R_6$, $R_7$, $R_8$, $R_9$, $R_{10}$, $R_{15}$, $R_{16}$, $R_{17}$ and $R_{18}$ are each hydrogen, and each instance of the two instances of $R_{11}$, $R_{12}$, $R_{13}$, and $R_{14}$, is hydrogen.

In some embodiments, $Z_1$, $Z_2$, $Z_3$, $Z_4$, $Z_5$, $Q_1$ and $Q_2$ are each independently carbon. In some embodiments, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and Rig is independently H, halogen, substituted or unsubstituted n-alkyl or a substituted or unsubstituted branched-chain alkyl. In some such embodiments, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$ and $R_{18}$ is H.

In some embodiments, the polytopic organic linker is 4,4'-dioxidobiphenyl-3,3'-dicarboxylate (dobpdc$^{4-}$), 4,4''-dioxido-[1,1':4',1''-terphenyl]-3,3''-dicarboxylate (dotpdc$^{4-}$), 2,5-dioxidobenzene-1,4-dicarboxylate (dobdc$^{4-}$), or 3,3' dioxide-biphenyl-4,4'-dicarboxylate (para-carboxylate-dobpdc$^{4-}$).

In some embodiments, each polyamine ligand in the plurality of polyamine ligands is: diethylenetriamine, N-(2-aminoethyl)-1,3-propanediamine, bis(3-aminopropyl) amine, N-(3-Aminopropyl)-1,4-diaminobutane, triethylenetetramine, N,N'-bis(2-aminoethyl)-1,3-propanediamine, 1,2-bis(3-aminopropylamino)ethane, N,N'-bis(3-aminopropyl)-1,3-propanediamine, N,N'-bis(3-aminopropyl)-1,4-diaminobutane, or tetraethylenepentamine.

In some embodiments, the loading of the plurality of polyamine ligands to the metal-organic framework is between 5 percent and 500 percent, 20 percent and 250 percent, 25 percent and 200 percent, 80 percent and 120 percent, between 90 percent and 110 percent, between 95 percent and 105 percent, or between 98 percent and 102 percent. As used herein a loading of 100 percent represents one polyamine molecule per two metals in the framework.

In some embodiments, the adsorption material exhibits a step-shaped $CO_2$ adsorption profile. In some embodiments, the adsorption material exhibits a step-shaped $CO_2$ desorption profile. In some embodiments, the adsorption material exhibits a single step-shaped $CO_2$ adsorption profile. In some embodiments, the adsorption material exhibits a single step-shaped $CO_2$ desorption profile.

In some embodiments, the adsorption material exhibits a step-shaped $CO_2$ adsorption profile at atmospheric pressure under pure $CO_2$. In some embodiments, the adsorption material exhibits a step-shaped $CO_2$ desorption profile at atmospheric pressure under pure $CO_2$. In some embodiments, the adsorption material exhibits a single step-shaped $CO_2$ adsorption profile at atmospheric pressure under pure $CO_2$. In some embodiments, the adsorption material exhibits a single step-shaped $CO_2$ desorption profile at atmospheric pressure under pure $CO_2$.

In some embodiments, the adsorption material exhibits a step-shaped $CO_2$ adsorption profile across a wide range of total atmospheric pressures (e.g., 0.1 atm to 10 atm) under a wide range of $CO_2$ partial pressures (e.g, in which $CO_2$ is the only gas or is part of a mixture of gases). In some embodiments, the adsorption material exhibits a step-shaped $CO_2$ desorption profile across a wide range of total atmospheric pressures (e.g., 0.1 atm to 10 atm) under a wide range of $CO_2$ partial pressures (e.g, in which $CO_2$ is the only gas or is part of a mixture of gases). In some embodiments, the adsorption material exhibits a single step-shaped $CO_2$ adsorption profile across a wide range of total atmospheric pressures (e.g., 0.1 atm to 10 atm) under a wide range of $CO_2$ partial pressures (e.g, in which $CO_2$ is the only gas or is part of a mixture of gases). In some embodiments, the adsorption material exhibits a single step-shaped $CO_2$ desorption profile across a wide range of total atmospheric pressures (e.g., 0.1 atm to 10 atm) under a wide range of $CO_2$ partial pressures (e.g, in which $CO_2$ is the only gas or is part of a mixture of gases).

In some embodiments, the adsorption material exhibits a $CO_2$ adsorption profile that includes a $CO_2$ adsorption step above 140° C. In some embodiments, the adsorption material exhibits a $CO_2$ adsorption profile that includes a $CO_2$ adsorption step above 160° C.

In some embodiments, the polytopic organic linker is an analog of (dobpde$^{4-}$), having the formula:

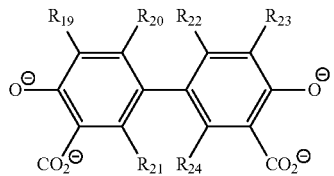

where $R_{19}$, $R_{20}$, $R_{21}$, $R_{22}$, $R_{23}$, and $R_{24}$, are each independently selected from H, halogen, hydroxyl, methyl, and halogen substituted methyl.

In some embodiments, the polytopic organic linker is an analog of (dotpdc$^{4-}$) having the formula:

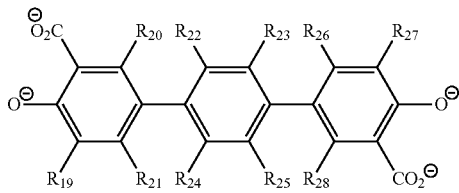

where $R_{19}$, $R_{20}$, $R_{21}$, $R_{22}$, $R_{23}$, $R_{24}$, $R_{25}$, $R_{26}$, R, and $R_{28}$ are each independently selected from H, halogen, hydroxyl, methyl, and halogen substituted methyl.

In some embodiments, the polytopic organic linker is an analog of (pc-dobpdc$^{4-}$) having the formula:

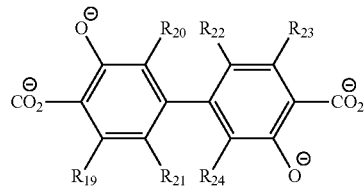

where $R_{19}$, $R_{20}$, $R_{21}$, $R_{22}$, $R_{23}$, and $R_{24}$, are each independently selected from H, halogen, hydroxyl, methyl, and halogen substituted methyl.

In some embodiments, the polytopic organic linker has the formula:

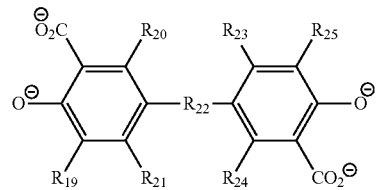

where $R_{19}$, $R_{20}$, $R_{21}$, $R_{23}$, $R_{24}$, and $R_{25}$ are each independently selected from H, halogen, hydroxyl, methyl, and halogen substituted methyl, and $R_{22}$ is selected from substituted or unsubstituted aryl, and substituted or unsubstituted heteroaryl.

IV. Synthetic Methods

Another aspect of the present disclosure provides a method of synthesizing an adsorption material in which a plurality of polyamine ligands is grafted onto a metal-organic framework. The metal-organic framework comprises a plurality of metal cations and a plurality of polytopic organic linkers. The grafting comprises exposing an amount of the metal-organic framework to a solution comprising the polyamine ligand diluted with a solvent thereby forming an unactivated adsorption material.

In some embodiments, adsorption material is prepared by a method in which the metal-organic framework is optionally first heated (e.g. at 160° C. under vacuum condition or under flowing $N_2$ or Ar for 12 hours), removing adsorbed water and coordinated water or other coordinating solvents. Then the metal-organic framework is dissolved in a solution comprising anhydrous organic solvent charged with the polyamine thereby forming unactivated adsorption material. In some embodiments, the solution is 20% (v/v) polyamine to anhydrous organic solvent. In some embodiments, the solution is between 10% (v/v) and 40% (v/v) polyamine to anhydrous organic solvent. In some embodiments the polyamine is dissolved into the anhydrous organic solvent on an equivalent (w/v) basis rather than a (v/v) basis. In some embodiments, the resulting product is dried for three hours or more under nitrogen protection.

In some embodiments, each polyamine ligand has the formula:

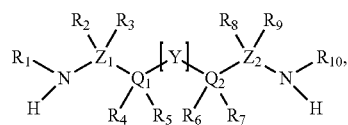

and
where Y is:

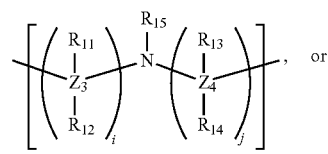

-continued

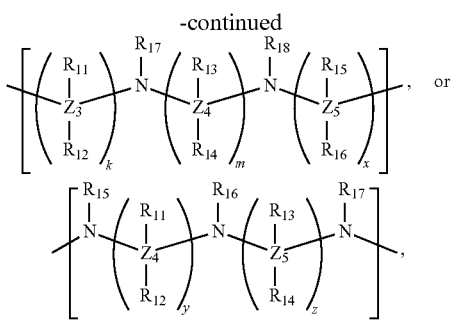

$Z_1$, $Z_2$, $Z_3$, $Z_4$, $Z_5$, $Q_1$ and $Q_2$ are each independently carbon, silicon, germanium, sulfur, or selenium, i, j, k, x, y, and z are each independently 0, 1, or 2, and m is 2, 3, or 4. Further, each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted arlyoxy, or substituted or unsubstituted heteroaryloxy.

In some embodiments, the unactivated adsorption material is subjected to an inert stream of gas at a temperature of at least 165° C. thereby activating the adsorption material.

In some alternative embodiments, the unactivated adsorption material is washed with a weakly coordinating or non-coordinating solvent at a temperature of between 60° C. and 80° C. at least 165° C. thereby activating the adsorption material. Representative and non-limiting examples of weakly coordinating or non-coordinating solvents can include toluene, chlorobenzene, paraffins, halogenated paraffins, and the like, as well as combinations thereof.

In some alternative embodiments, the unactivated adsorption material is placed under a vacuum at a temperature of greater than 60° C. thereby activating the adsorption material.

In some alternative embodiments, the unactivated adsorption material is subjected to one or more cycles of (i) an inert stream of gas at a temperature of at least 165° C. followed by (ii) placement under a vacuum at a temperature of greater than 60° C. thereby activating the adsorption material.

In some alternative embodiments, the unactivated adsorption material is subjected to a plurality of evacuate-refill cycles, in which an inert gas such as argon or nitrogen, or mixtures thereof is used in the refill cycle, thereby activating the adsorption material.

In some alternative embodiments, the unactivated adsorption material is subjected to a plurality of evacuate-refill cycles under elevated temperatures, such as greater than 60° C., in which an inert gas such as argon or nitrogen, or mixtures thereof is used in the refill cycle thereby activating the adsorption material.

In some embodiments, the adsorption material is characterized as activated when it has a polyamine ligand loading of 120 percent or less. In some embodiments, each metal cation in the plurality of metal cations is Mg, Ca, Mn, Cr, Fe, Co, Ni, Cu, or Zn.

In some embodiments, the solvent is anhydrous. In some embodiments, the solvent is toluene. In some embodiments, the solvent is toluene, methanol, dichloromethane, tetrahydrofuran, cyclohexane, pentane, 2-butanone, trichloroethylene, methyl-t-butyl ether, heptane, diethyl ether, or a mixture thereof. In some embodiments, the inert stream of gas is an argon or nitrogen gas, or a mixture thereof.

In the disclosed methods, the unactivated adsorption material from the solvation impregnation method is then subjected to an inert environment at a temperature of at least 165° C. thereby activating the adsorption material. In some such embodiments, the activated adsorption material has a polyamine ligand loading of 120 percent or less. As used herein a loading of 100 percent represents one polyamine molecule per two metals in the framework. In some embodiments, the activated adsorption material has a polyamine ligand loading of 110 percent or less. In some embodiments, the unactivated adsorption material from the wet impregnation method is subjected to an inert environment at a temperature of at least 190° C., at least 210° C., or between 190° C. and 250° C.

In some embodiments, the unactivated adsorption material is subjected to the inert environment at the temperature of at least 165° C. for at least four hours, for at least six hours, for at least eight hours, or for at least twelve hours, thereby activating the adsorption material.

V. Technical Applications

In one aspect of the present disclosure, there is provided a number of technical applications for the disclosed adsorption materials.

One such application is carbon capture from powerplant exhaust, such as coal flue gas. The increasing atmospheric levels of carbon dioxide ($CO_2$), which are likely contributing to global climate change, warrant new strategies for reducing $CO_2$ emissions from point sources such as power plants. In particular, coal-fueled power plants are responsible for 46% of global anthropogenic energy supply $CO_2$ emissions. See, "$CO_2$ Emissions from Fuel Combustion Highlights," 2016 Edition, International Energy Agency, Paris, France, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, $NO_x$) at ambient pressure and 40° C. See, Planas et al., 2013, "The Mechanism of Carbon Dioxide Adsorption in an Alkylamine-Functionalized Metal-Organic Framework," J. Am. Chem. Soc. 135, pp. 7402-7405, which is hereby incorporated by reference. In particular, for a temperature swing adsorption process, an adsorbent should possess the following properties: (a) a high working capacity with a minimal temperature swing, in order to minimize regeneration energy costs; (b) high selectivity for $CO_2$ over the other constituents of coal flue gas; (c) a high capture rate, optimally 90% capture of $CO_2$ under flue gas conditions; (d) effective performance under humid conditions; and (d) long-term stability to adsorption/desorption cycling under humid conditions.

Another such application is carbon capture from a biogas such as crude biogas, natural gas, or landfill gas. Biogas, for instance the $CO_2/CH_4$ mixtures produced by the breakdown of organic matter, is a renewable fuel source with the potential to replace traditional fossil fuel sources. Removal of $CO_2$ from crude biogas mixtures is one of the most challenging aspects of upgrading this promising fuel source to pipeline quality methane. Therefore, for example, the use of adsorbents to selectively remove $CO_2$ from high pressure $CO_2/CH_4$ mixtures with a high working capacity and minimal regeneration energy has the potential to greatly reduce the cost of using biogas in place of natural gas for applications in the energy sector. Some embodiments of the present disclosure provide a method that comprises contacting a biogas, natural gas, landfill gas, or non-renewable gas comprising $CO_2$ and $CH_4$ with any adsorption material of the present disclosure to reversibly adsorb $CO_2$ from the gas thereby generating an adsorption material enriched for $CO_2$ and a residual gas that is greater than 80 percent pure methane, 90 percent pure methane, or 98 percent pure methane. In some such embodiments, the method further comprises stripping a major portion of the $CO_2$ from the adsorption material enriched for $CO_2$ (e.g., at least fifty percent of the $CO_2$ bound to the adsorption material, at least sixty percent of the $CO_2$ bound to the adsorption material, at least seventy percent of the $CO_2$ bound to the adsorption material, at least eighty percent of the $CO_2$ bound to the adsorption material, at least ninety percent of the $CO_2$ bound to the adsorption material, at least ninety five percent of the $CO_2$ bound to the adsorption material, or at least 99 percent of the $CO_2$ bound to the adsorption material) using a temperature swing adsorption method, vacuum swing adsorption method, a pressure swing adsorption method, a concentration swing adsorption method, or a combination thereof.

The disclosed compositions (adsorption materials) can be used to strip a major portion of the $CO_2$ from the adsorption material enriched for $CO_2$ (e.g., at least fifty percent of the $CO_2$ bound to the adsorption material, at least sixty percent of the $CO_2$ bound to the adsorption material, at least seventy percent of the $CO_2$ bound to the adsorption material, at least eighty percent of the $CO_2$ bound to the adsorption material, at least ninety percent of the $CO_2$ bound to the adsorption material, at least ninety five percent of the $CO_2$ bound to the adsorption material, or at least 99 percent of the $CO_2$ bound to the adsorption material) using a temperature swing adsorption method or a vacuum swing adsorption method. Example temperature swing adsorption methods and vacuum swing adsorption methods are disclosed in International Publication Number WO2013/059527 A1, which is hereby incorporated by reference.

Another aspect of the present disclosure provides a method for abating $CO_2$ from a flue gas, such as natural gas flue gas. In such embodiments, the flue gas is contacted with any adsorption material of the present disclosure to reversibly adsorb $CO_2$ from the flue gas thereby generating an adsorption material enriched for $CO_2$ and then stripping a major portion of the $CO_2$ from the adsorption material enriched for $CO_2$ (e.g., at least fifty percent of the $CO_2$ bound to the adsorption material, at least sixty percent of the $CO_2$ bound to the adsorption material, at least seventy percent of the $CO_2$ bound to the adsorption material, at least eighty percent of the $CO_2$ bound to the adsorption material, at least ninety percent of the $CO_2$ bound to the adsorption material, at least ninety five percent of the $CO_2$ bound to the adsorption material, or at least 99 percent of the $CO_2$ bound to the adsorption material) using a temperature swing adsorption method, vacuum swing adsorption method, a pressure swing adsorption method, a concentration swing adsorption method, or a combination thereof.

Another other aspect of the present disclosure provides air capture methods in which excess $CO_2$ in the atmosphere is reduced in order to address $CO_2$ contribution from mobile sources such as automobile and airplane emissions for abating $CO_2$ from a flue gas, such as natural gas flue gas. In some such embodiments, atmospheric air is contacted with any adsorption material of the present disclosure to reversibly adsorb $CO_2$ from the air thereby generating an adsorption material enriched for $CO_2$ and then stripping a major portion of the $CO_2$ from the adsorption material enriched for $CO_2$ (e.g., at least fifty percent of the $CO_2$ bound to the adsorption material, at least sixty percent of the $CO_2$ bound to the adsorption material, at least seventy percent of the $CO_2$ bound to the adsorption material, at least eighty percent of the $CO_2$ bound to the adsorption material, at least ninety percent of the $CO_2$ bound to the adsorption material, at least ninety five percent of the $CO_2$ bound to the adsorption material, or at least 99 percent of the $CO_2$ bound to the adsorption material) using a temperature swing adsorption method, vacuum swing adsorption method, a pressure swing adsorption method, a concentration swing adsorption method, or a combination thereof.

Still another aspect of the present disclosure provides a method of sequestering carbon dioxide produced by a source. The method comprises exposing the carbon dioxide to an adsorption material of the present disclosure whereby the carbon dioxide is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

Still another aspect of the present disclosure provides a method of sequestering carbon dioxide from a multi-component gas mixture. In some such embodiments the multi-component gas mixture comprises $CO_2$ and at least one of $N_2$, $H_2O$, and $O_2$. The method comprises exposing the multi-component gas mixture to an adsorption material of the present disclosure whereby a least fifty percent, at least sixty percent, or at least eighty percent of the carbon dioxide within the multi-component gas mixture is reversibly sequestered into the adsorption material. In some such embodiments, the method further comprises regenerating the adsorption material enriched for $CO_2$ using a temperature swing adsorption method, vacuum swing adsorption method, a pressure swing adsorption method, a concentration swing adsorption method, or a combination thereof.

VI. Examples

In the present disclosure polyamines were grafted to a metal-organic framework in a controlled manner, allowing for an increase in thermal stability due to the presence of multiple M-N bonds while maintaining the structural regularity necessary for cooperative formation of ammonium carbamate chains. Following this strategy, the polyamines set forth in Table 1 were successfully grafted to the $Mg_2$(dobpdc) framework by soaking ~10 mg of the metal-organic framework in a 20 mL vial charged with 1 mL of the respective polyamine and 4 mL of toluene (resulting in the 20% v/v solution).

TABLE 1

Polyamines that have been successfully appended to Mg$_2$(dobpdc).

| Polyamine | Structure |
|---|---|
| Diethylenetriamine | H$_2$N–CH$_2$CH$_2$–NH–CH$_2$CH$_2$–NH$_2$ |
| N-(2-Aminoethyl)-1,3-propanediamine | H$_2$N–(CH$_2$)$_3$–NH–CH$_2$CH$_2$–NH$_2$ |
| bis(3-aminopropyl)amine | H$_2$N–(CH$_2$)$_3$–NH–(CH$_2$)$_3$–NH$_2$ |
| N-(3-Aminopropyl)-1,4-diaminobutane | H$_2$N–(CH$_2$)$_3$–NH–(CH$_2$)$_4$–NH$_2$ |
| Triethylenetetramine | H$_2$N–CH$_2$CH$_2$–NH–CH$_2$CH$_2$–NH–CH$_2$CH$_2$–NH$_2$ |
| N,N'-bis(2-aminoethyl)-1,3-propanediamine | H$_2$N–CH$_2$CH$_2$–NH–(CH$_2$)$_3$–NH–CH$_2$CH$_2$–NH$_2$ |
| 1,2-bis(3-aminopropylamino)ethane | H$_2$N–(CH$_2$)$_3$–NH–CH$_2$CH$_2$–NH–(CH$_2$)$_3$–NH$_2$ |
| N,N'-bis(3-aminopropyl)-1,3-propanediamine | H$_2$N–(CH$_2$)$_3$–NH–(CH$_2$)$_3$–NH–(CH$_2$)$_3$–NH$_2$ |
| N,N'-bis(3-aminopropyl)-1,4-diaminobutane | H$_2$N–(CH$_2$)$_3$–NH–(CH$_2$)$_4$–NH–(CH$_2$)$_3$–NH$_2$ |
| Tetraethylenepentamine | H$_2$N–CH$_2$CH$_2$–NH–CH$_2$CH$_2$–NH–CH$_2$CH$_2$–NH–CH$_2$CH$_2$–NH$_2$ |

Tetramine-appended samples were the primary focus because they could in principle capture two equivalents of CO$_2$ via ammonium carbamate formation, enabling higher CO$_2$ adsorption capacities, although many of the findings disclosed herein apply to pentamine and triamine-appended materials as well. Additionally, tests on other metal variants in the M$_2$(dobpdc) family as well as on other related frameworks, IRMOF74-II (M$_2$(pc-dobpdc) (pc-dobpdc$^{4-}$=3,3'-dioxido-biphenyl-4,4'-dicarboxylate)) and M$_2$(dotpdc) (dotpdc$^{4-}$=4,4''-dioxidoterphenyl-3,3''-dicarboxylate), show similar behavior, where M is Mg, Ca, Cr, Mn, Fe, Co, Ni, Cu, or Zn.

Table 2 summarizes initial analysis of a representative set of as-synthesized tetramine-appended Mg$_2$(dobpdc) samples showing that polyamine loadings varied from 148% to 284%.

TABLE 2

| Polyamine | Loading (As-Synthesized) | Activation Temperature (° C.) | Loading (Post-Activation) |
|---|---|---|---|
| Diethylenetriamine | 333% | 200 | 110% |
| N-(2-Aminoethyl)-1,3-propanediamine | 274% | 200 | 114% |
| bis(3-aminopropyl)amine | 238% | 200 | 104% |
| N-(3-Aminopropyl)-1,4-diaminobutane | 233% | 200 | 107% |

TABLE 2-continued

| Polyamine | Loading (As-Synthesized) | Activation Temperature (° C.) | Loading (Post-Activation) |
|---|---|---|---|
| Triethylenetetramine | 284% | 225 | 98% |
| N,N'-bis(2-aminoethyl)-1,3-propanediamine | 238% | 225 | 100% |
| 1,2-bis(3-aminopropylamino)ethane | 182% | 250 | 106% |
| N,N'-bis(3-aminopropyl)-1,3-propanediamine | 156% | 225 | 106% |
| N,N'-bis(3-aminopropyl)-1,4-diaminobutane | 148% | 240 | 94% |

Figure 3:
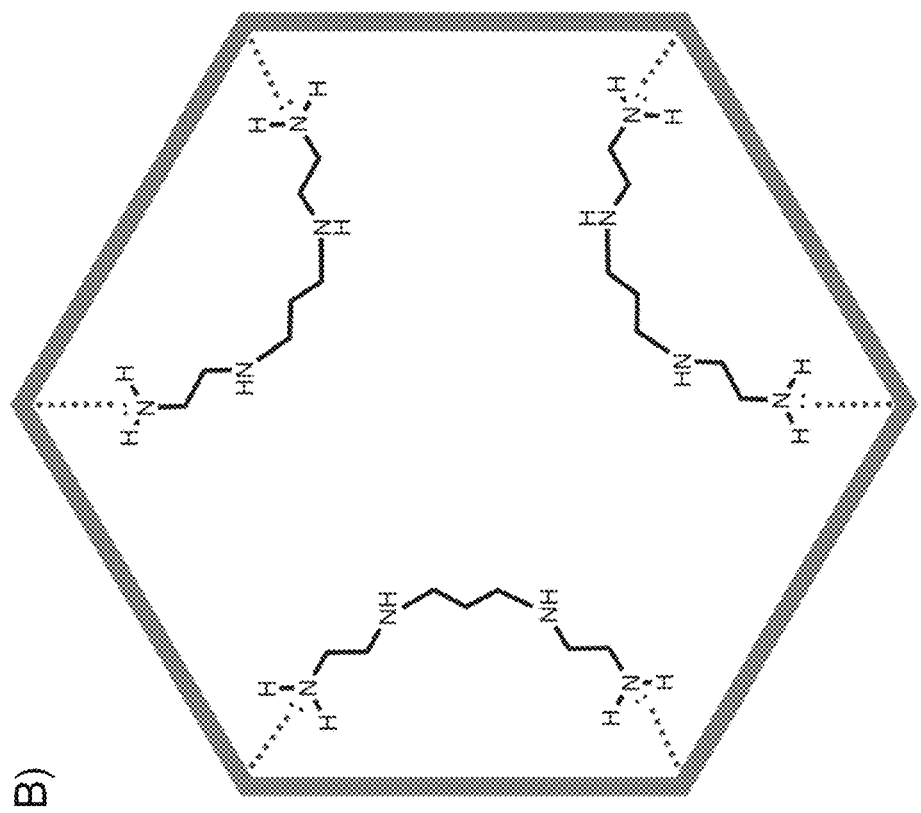
FIG. 3 illustrates a preliminary schematic of the polyamine loading "as-synthesized" (panel A) and "after-activation" (panel B) in accordance with the present disclosure. The hexagon represents a single pore of the metal-organic framework where the edges of the hexagon represent the organic linker and the vertices represent the metal sites. Dashed lines indicate coordination of an amine ligand to a metal site within the framework.
Figure 3:
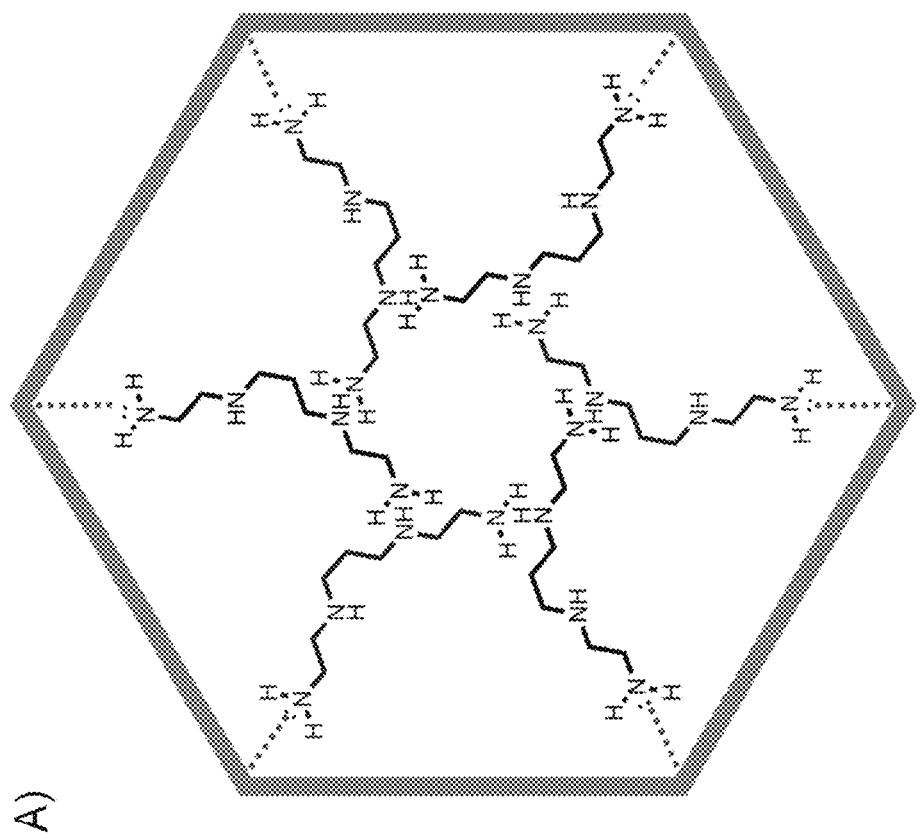
Figure 4:
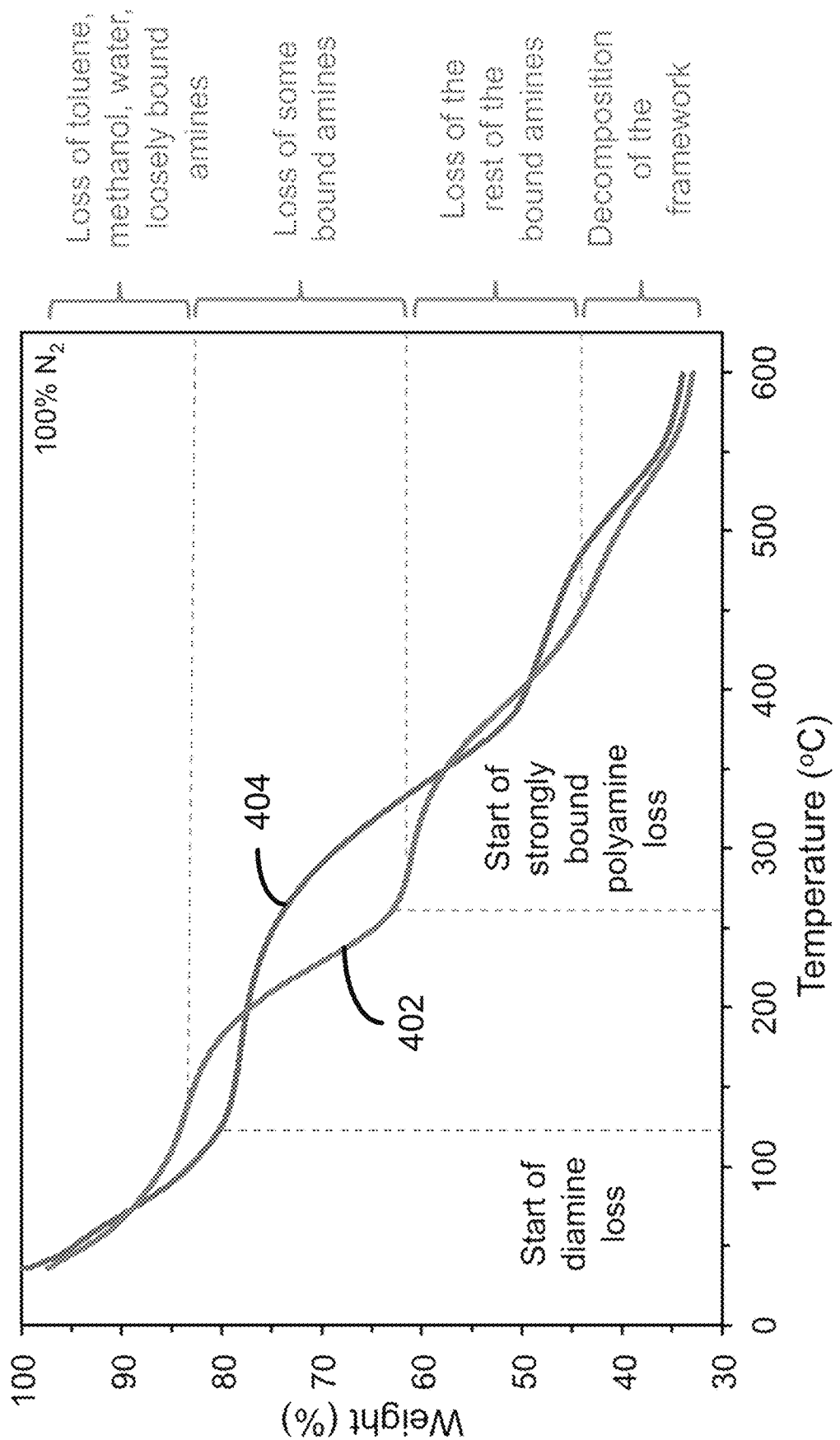
FIG. 4 illustrates representative dry $N_2$ decomposition profile of a polyamine-appended variant of $Mg_2$(dobpdc) (402), showing the thermal removal of excess polyamine leading to 100% loading (1 polyamine per 2 metal sites), and a decomposition profile for a representative diamine-appended $Mg_2$(dobpdc) framework (404) is included for comparison, in accordance with the present disclosure.

A loading of 200% suggests a 1:1 ratio of polyamines to open metal sites, as is the typical binding mode for alkyl-ethylenediamines. A loading of 100% is desired, as that would suggest one polyamine is present for every two metal sites, consistent with the envisioned coordination mode leading to increased thermal stability of the adsorbents (FIG. 3). Thus, the loading for the as-synthesized samples was higher than optimal. However, the desired loadings of 100% could be obtained by heating these as-synthesized samples under dry N$_2$ on a thermogravimetric analyzer (TGA) to sufficiently high temperatures to volatilize the weakly bound amines (FIG. 4). Without intending to be limited to any particular theory, we hypothesize that after reaching a certain temperature, half of the polyamines are removed by volatilization, and the other half coordinate two metal sites and require a higher temperature to be thermally removed.

Figure 5:
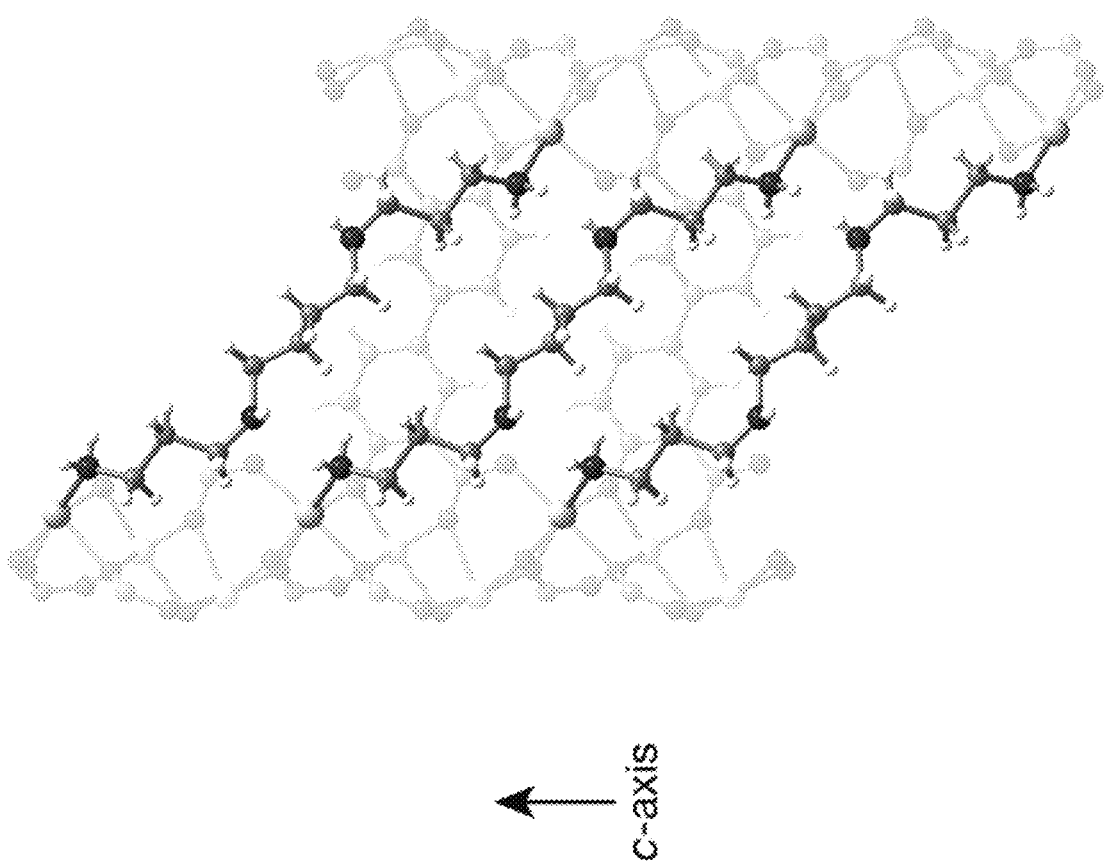
FIG. 5 illustrates the single-crystal structure of EMM-53 (Zn) (N,N'-bis(3-aminopropyl)-1,4-diaminobutane-$Zn_2$(dobpdc)). A view down the pore axis (c-axis) of the framework shows the polyamines coordinate adjacent metal sites, spanning 16.722 Å, in an ordered fashion. Light blue, red, gray, blue, and white spheres represent Zn, O, C, N, and H, respectively.
Figure 6:
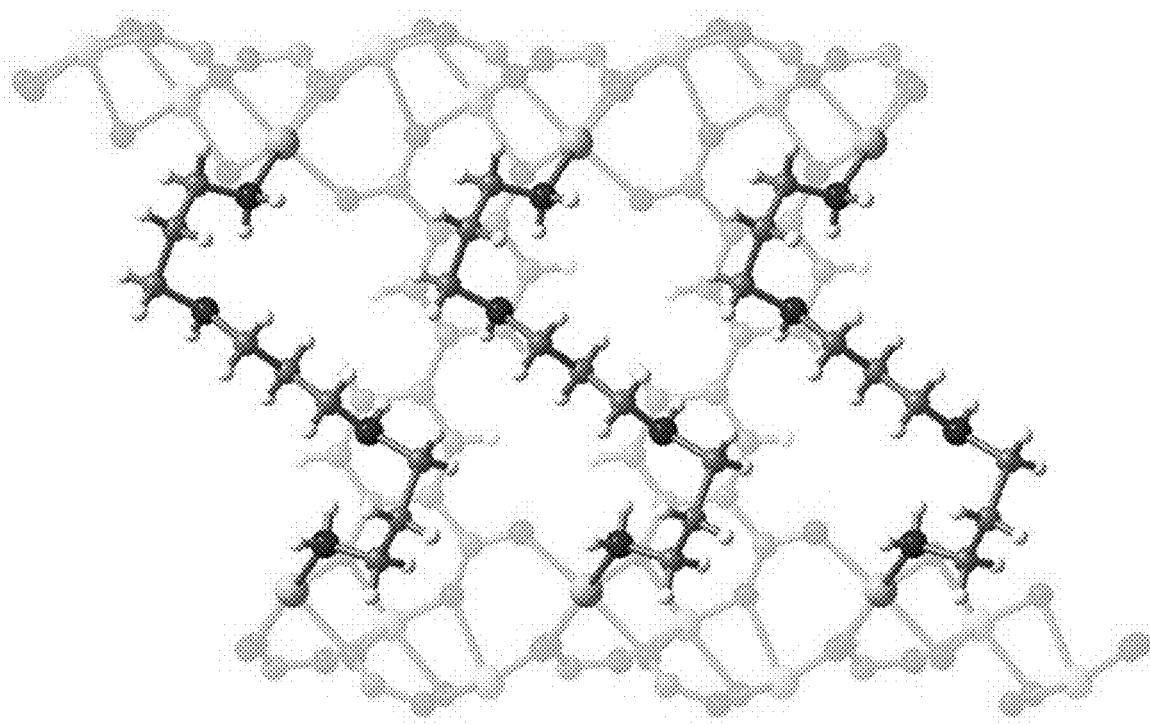
FIG. 6 illustrates the single-crystal structure of EMM-53 (3-3-3-Zn) (N,N'-bis(3-aminopropyl)-1,3-propanediamine-$Zn_2$(dobpdc)). A view down the pore axis (c-axis) of the framework shows the polyamines coordinate adjacent metal sites, spanning 10.481 Å, in an ordered fashion. Light blue, red, gray, blue, and white spheres represent Zn, O, C, N, and H, respectively.

Using the thermogravimetric analyzer data, specific activation temperatures were readily identified to achieve polyamine loadings of 100% for a number of triamine and tetramine-appended variants of $Mg_2$(dobpdc). Furthermore, single-crystal X-ray diffraction on the isostructural framework $Zn_2$(dobpdc) revealed that the polyamines coordinate to multiple metal sites in the ab-plane in EMM-53(Zn) (N,N'-bis(3-aminopropyl)-1,4-diaminobutane-$Zn_2$(dobpdc)) and EMM-53(3-3-3-Zn) (N,N'-bis(3-aminopropyl)-1,3-propanediamine-$Zn_2$(dobpdc)) (FIGS. 5 and 6), giving strong evidence to support the initially envisioned coordination mode.

Figure 7:
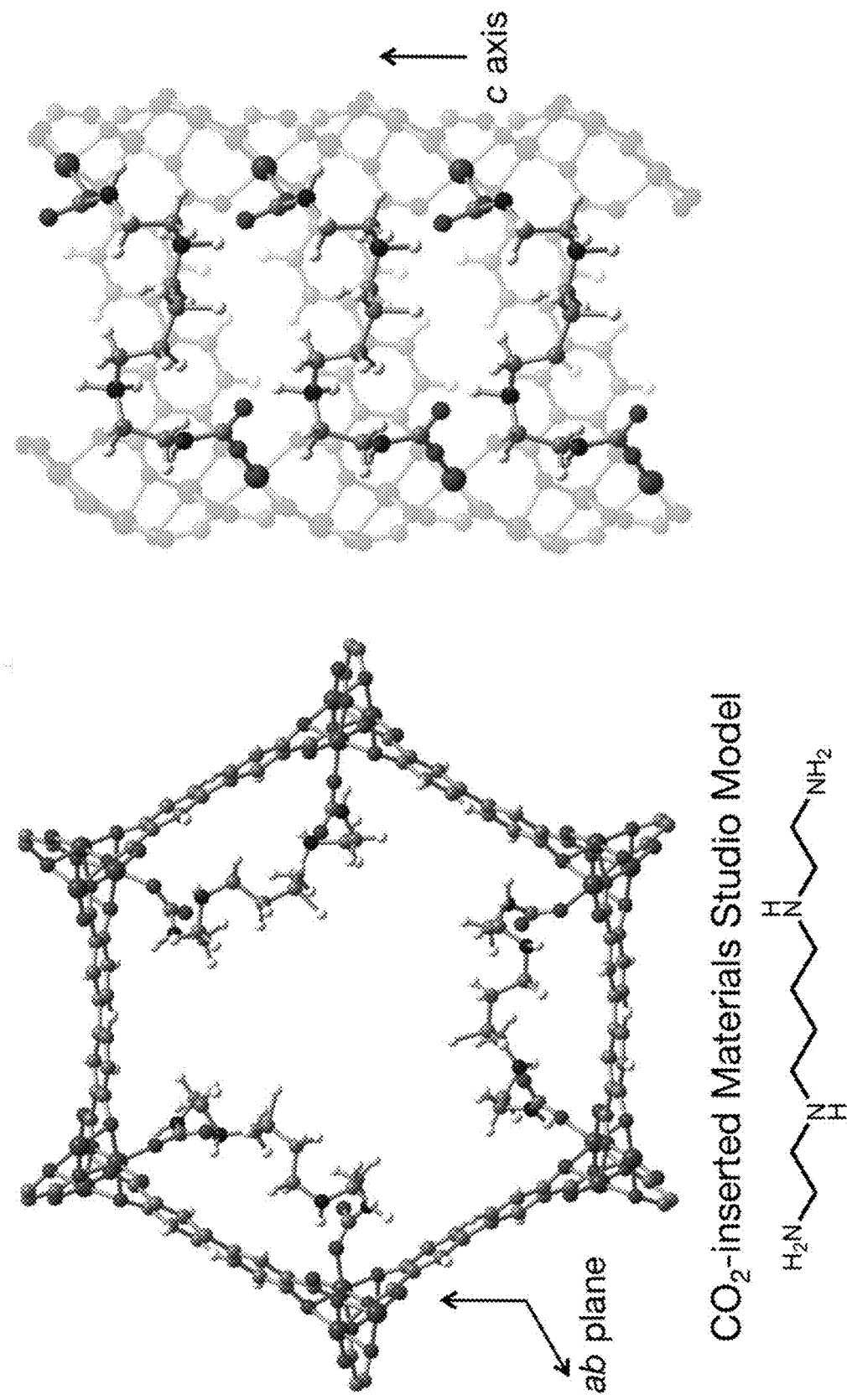
FIG. 7 illustrates an envisioned coordination mode for a tetramine after $CO_2$ adsorption in which each molecule of the tetramine captures two molecules of $CO_2$, forming ammonium carbamate chains along two corners of the hexagon-shaped channel, with the internal linker connecting the two chains, in accordance with an embodiment of the present disclosure.

The positions of individual atoms within the polyamine-appended frameworks described herein is important, as it should still enable the cooperative adsorption of $CO_2$ via formation of ammonium carbamate chains as with the corresponding alkylethylenediamines (FIG. 7). This should allow for the desirable step-shaped adsorption of $CO_2$ to occur in these materials while maintaining the high thermal stability required for the many types of adsorption/desorption processes. To this end, evaluation of the $CO_2$ isobars of polyamine-appended variants of $Mg_2$(dobpdc) by thermogravimetric analysis shows that step-shaped $CO_2$ adsorption/desorption is retained in a representative series of these adsorbents (FIGS. 8-12). Therefore, the strategy of grafting polyamines followed by activation at high temperatures is general to prepare $CO_2$ adsorbents possessing step-shaped adsorption/desorption profiles. This activation is likely an annealing process in which the polyamines rearrange into a preferred arrangement and such an annealing process could also be achieved through a high temperature solvent treatment.

Figure 8:
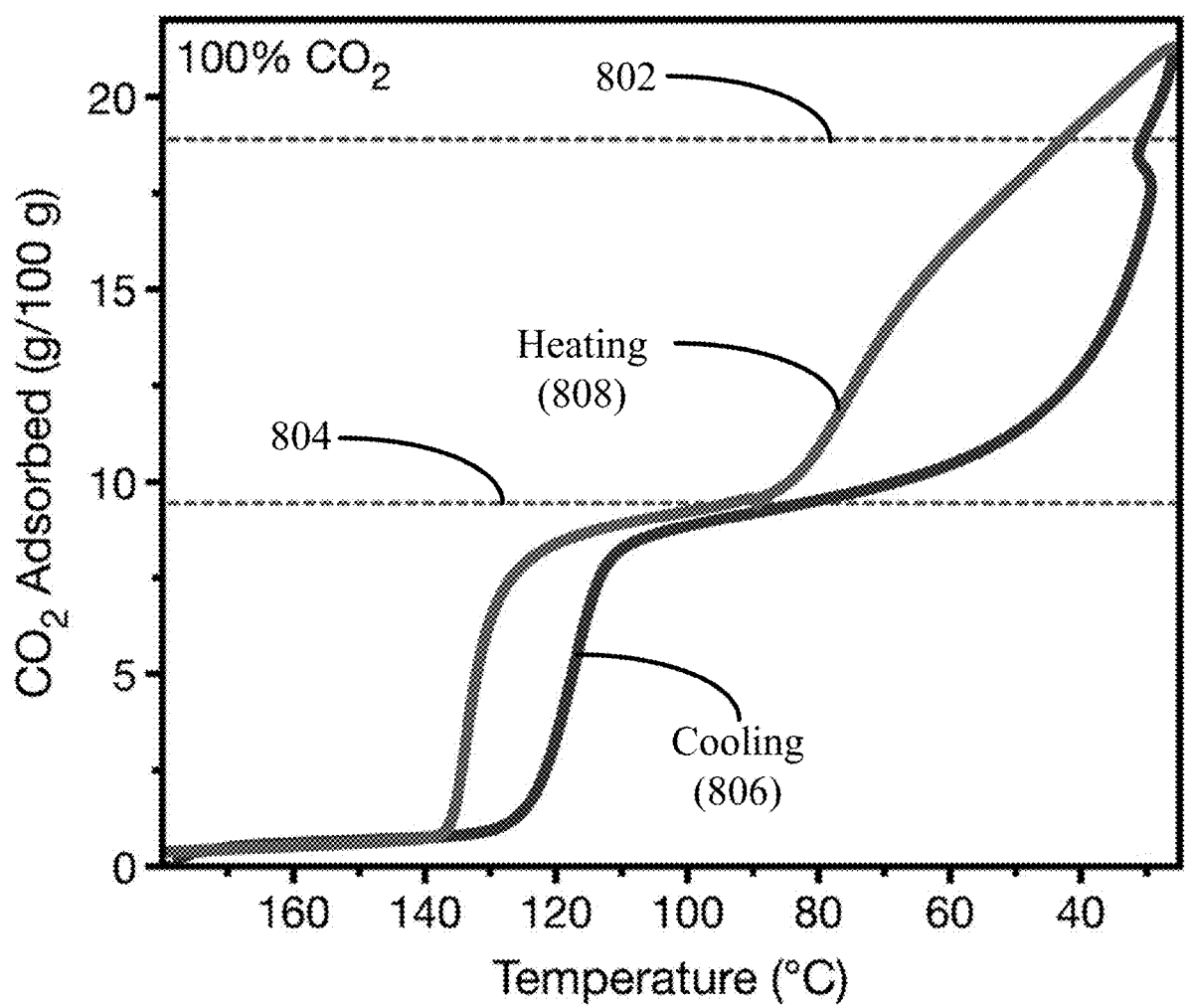
FIG. 8 illustrates thermogravimetric adsorption (cooling, 806) and desorption (heating, 808) isobars at atmospheric pressure under pure $CO_2$ for EMM-53(2-2-2) (triethylenetramine-$Mg_2$(dobpdc)). Adsorption proceeds through two-step $CO_2$ capture with moderate hysteresis. Lines 802 and 804, respectively, represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 9:
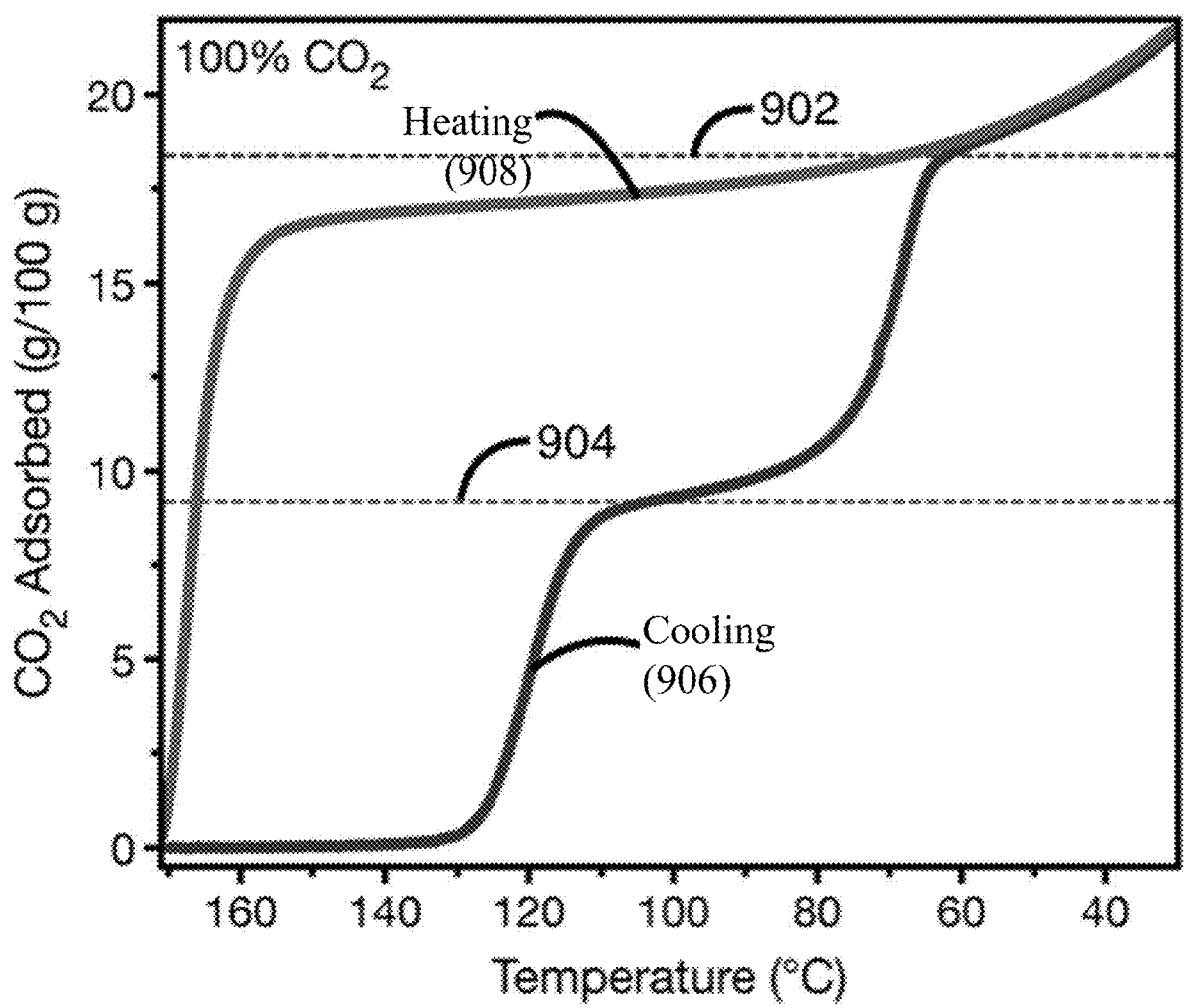
FIG. 9 illustrates thermogravimetric adsorption (cooling, 906) and desorption (heating, 908) isobars at atmospheric pressure under pure $CO_2$ for EMM-53(2-3-2) (N,N'-bis(2-aminoethyl)-1,3-propanediamine-$Mg_2$(dobpdc)) showing two-step $CO_2$ adsorption with more prominent hysteresis as compared to EMM-53(2-2-2) (triethylenetetramine-$Mg_2$(dobpdc)) in FIG. 8. Lines 902 and 904 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.

EMM-53(2-2-2) (triethylenetetramine-$Mg_2$(dobpdc)) was successfully prepared with nearly 100% tetramine loading and was tested for $CO_2$ capture under pure $CO_2$ (FIG. 8). This sample exhibits step-shaped $CO_2$ capture, suggestive of a cooperative mechanism. Interestingly, EMM-53(2-2-2) was found to have two distinct steps, with the higher temperature step being moderately sharp and occurring at around 130° C. The lower temperature step was broader and occurred at around 60° C. Considering that the loading of triethylenetetramine was 100% (as confirmed by analyzing the digested framework by nuclear magnetic resonance), the higher temperature step reached a $CO_2$ capture capacity of one $CO_2$ molecule per tetramine. After the lower temperature step, the sample reached a $CO_2$ capture capacity of two $CO_2$ molecules per tetramine. We hypothesize that these data indicate the formation of two sets of ammonium carbamate chains for a single tetramine forming at slightly different temperatures. Like EMM-53(2-2-2), EMM-53(2-3-2) (N,N'-bis(2-aminoethyl)-1,3-propanediamine-$Mg_2$(dobpdc)) also exhibits a two-step $CO_2$ adsorption profile (FIG. 9). The higher temperature step occurs at 130° C. and reaches a $CO_2$ loading capacity of one $CO_2$ molecule per tetramine. The lower temperature step occurred at 80° C., reaching a total $CO_2$ loading capacity of two $CO_2$ molecules per tetramine.

Figure 10:
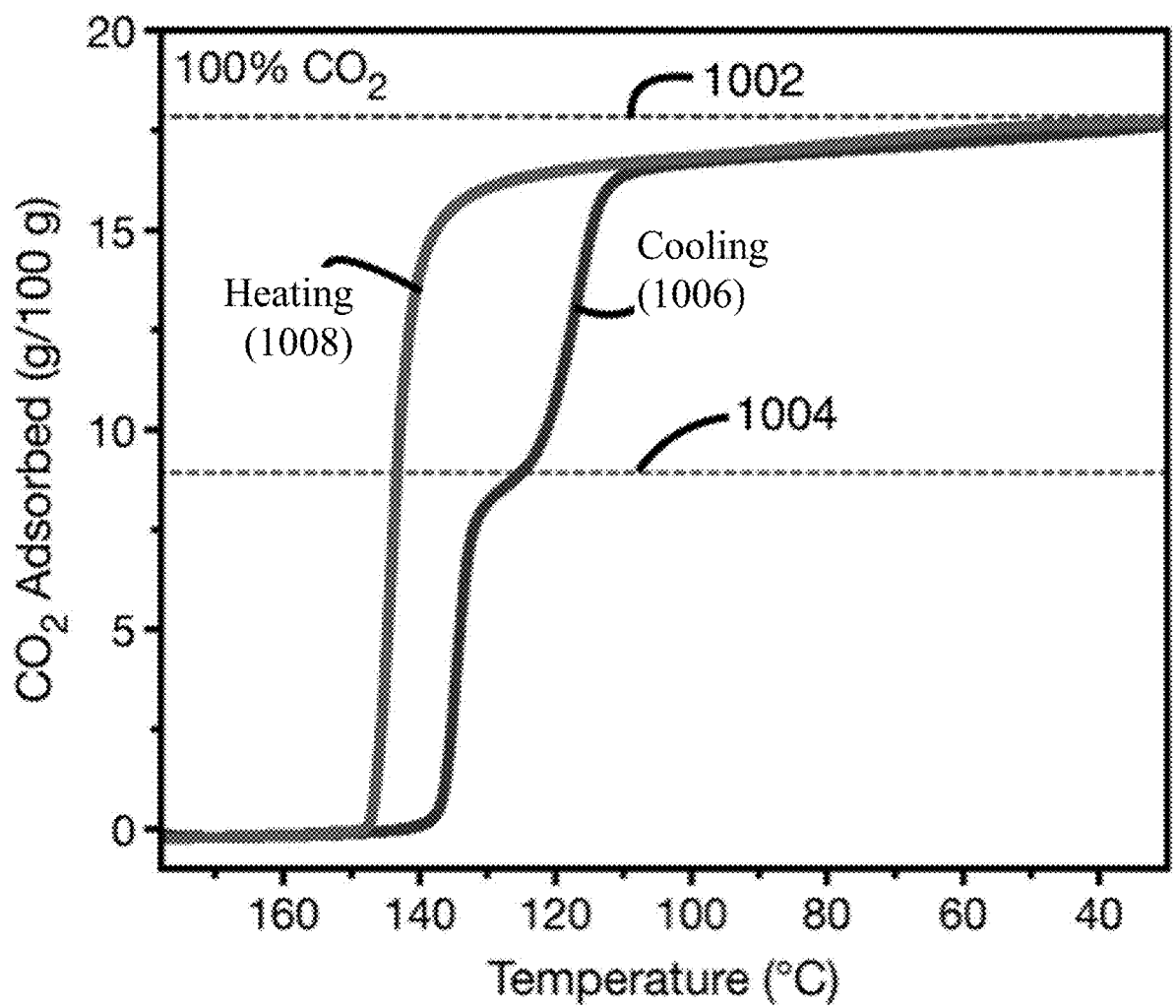
FIG. 10 illustrates thermogravimetric adsorption (cooling, 1006) and desorption (heating, 1008) isobars at atmospheric pressure under pure $CO_2$ for EMM-53(3-2-3) (N,N'-bis(3-aminopropyl)-1,2-ethylenediamine-$Mg_2$(dobpdc)). Lines 1002 and 1004 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 11:
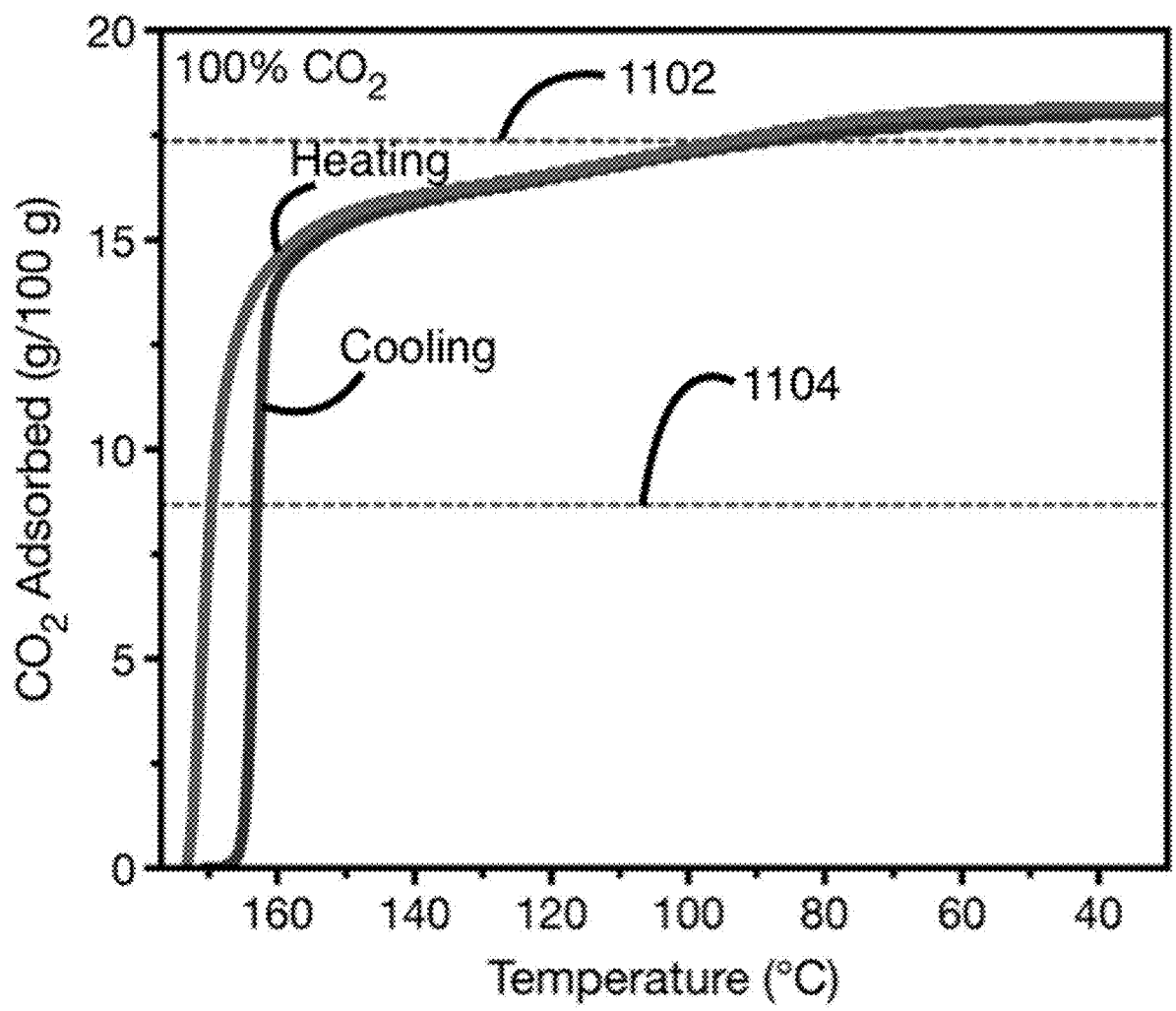
FIG. 11 thermogravimetric adsorption (cooling) and desorption (heating) isobars at atmospheric pressure under pure $CO_2$ for EMM-53(3-3-3) (N,N'-bis(3-aminopropyl)-1,3-propanediamine-$Mg_2$(dobpdc)). Lines 1102 and 1104 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.

The adsorbents EMM-53(3-2-3) (N,N'-bis(3-aminopropyl)-1,2-ethylenediamine-$Mg_2$(dobdpc)) and EMM-53 (3-3-3) (N,N'-bis(3-aminopropyl)-1,3-propanediamine-$Mg_2$(dobpdc)) were also evaluated for $CO_2$ capture under pure $CO_2$ (FIGS. 10 and 11). Both adsorbents display step-shaped $CO_2$ capture. The adsorbent EMM-53(3-2-3) exhibited two steps at 140° C. and 120° C. respectively. In addition, EMM-53(3-3-3) exhibits a single $CO_2$ adsorption step at 160° C., making it the tetramine with the highest step temperature observed thus far. This suggests that this material should be highly effective at removing low partial pressures of $CO_2$ from flue gas streams or air (as a high $CO_2$ adsorption step temperature corresponds to a low $CO_2$ adsorption step pressure).

Figure 12:
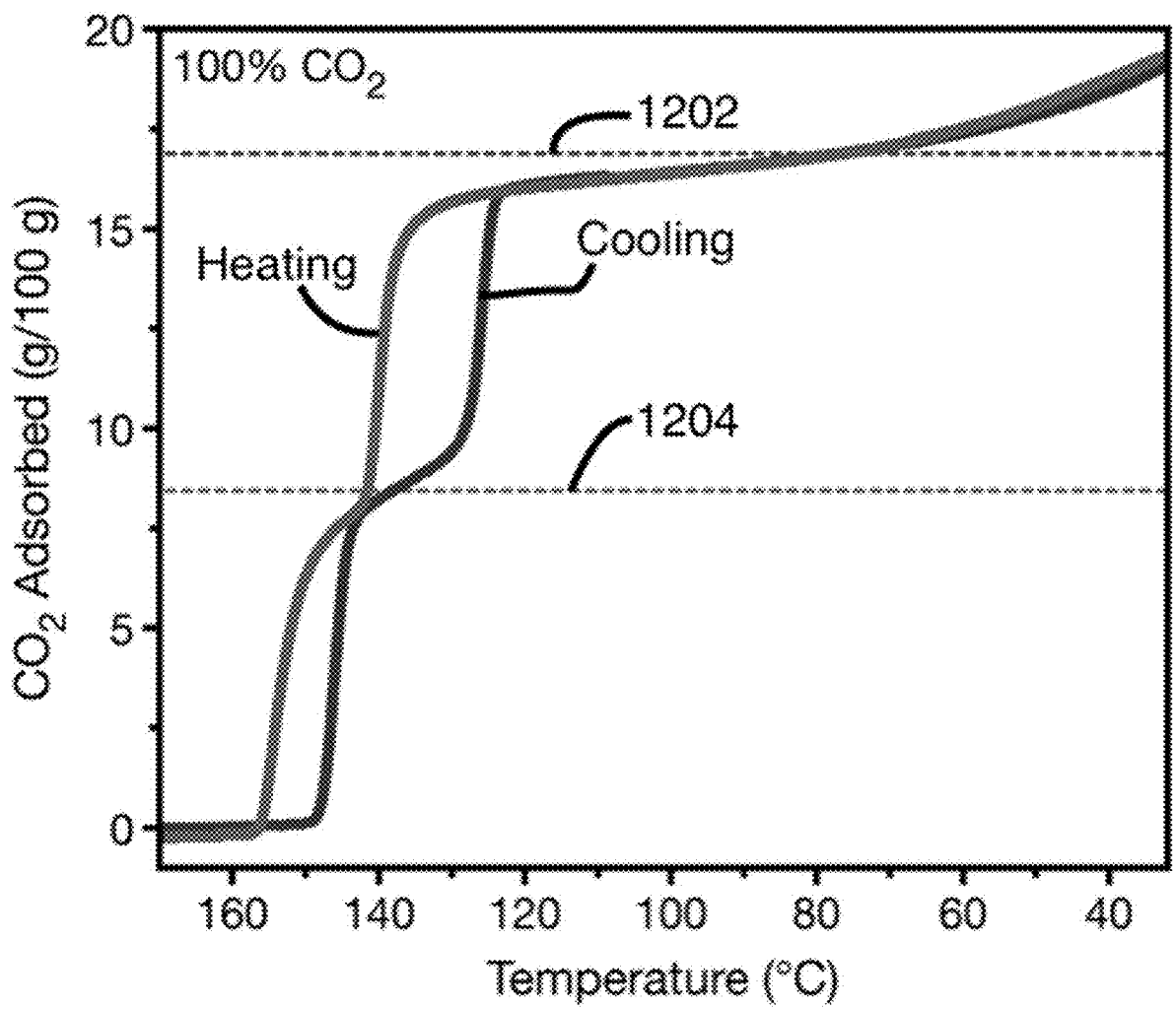
FIG. 12 illustrates thermogravimetric adsorption (cooling) and desorption (heating) isobars at atmospheric pressure under pure $CO_2$ for EMM-53 (N,N'-bis(3-aminopropyl)-1,4-diaminobutane-$Mg_2$(dobpdc)). This sample exhibits two $CO_2$ adsorption steps at high temperatures with a moderate $CO_2$ capture capacity. Lines 1202 and 1204 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 13:
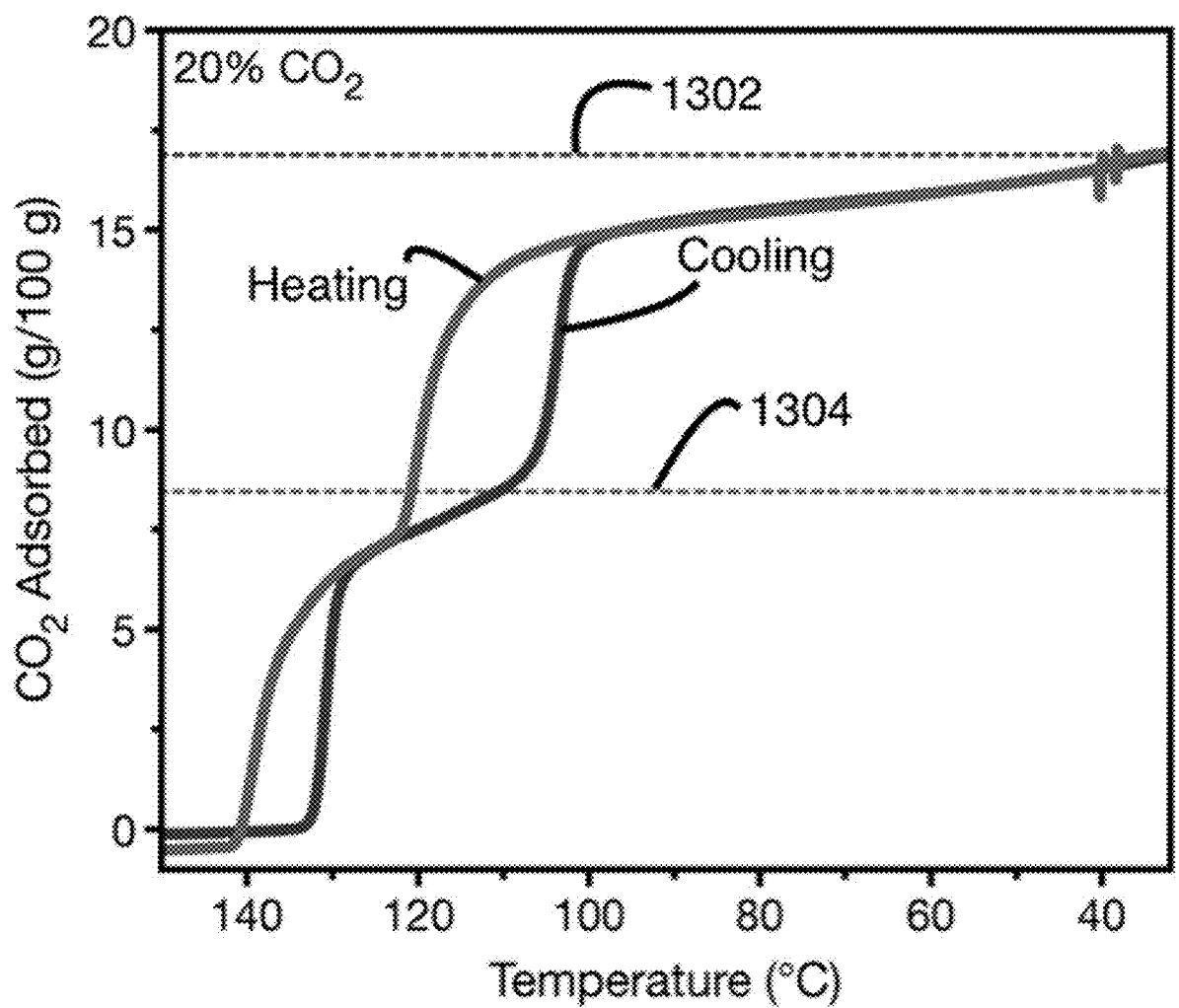
FIG. 13 illustrates thermogravimetric adsorption (cooling) and desorption (heating) isobars at atmospheric pressure under 20% $CO_2$ for EMM-53 (N,N'-bis(3-aminopropyl)-1,4-diaminobutane-$Mg_2$(dobpdc)). Lines 1302 and 1304 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 14:
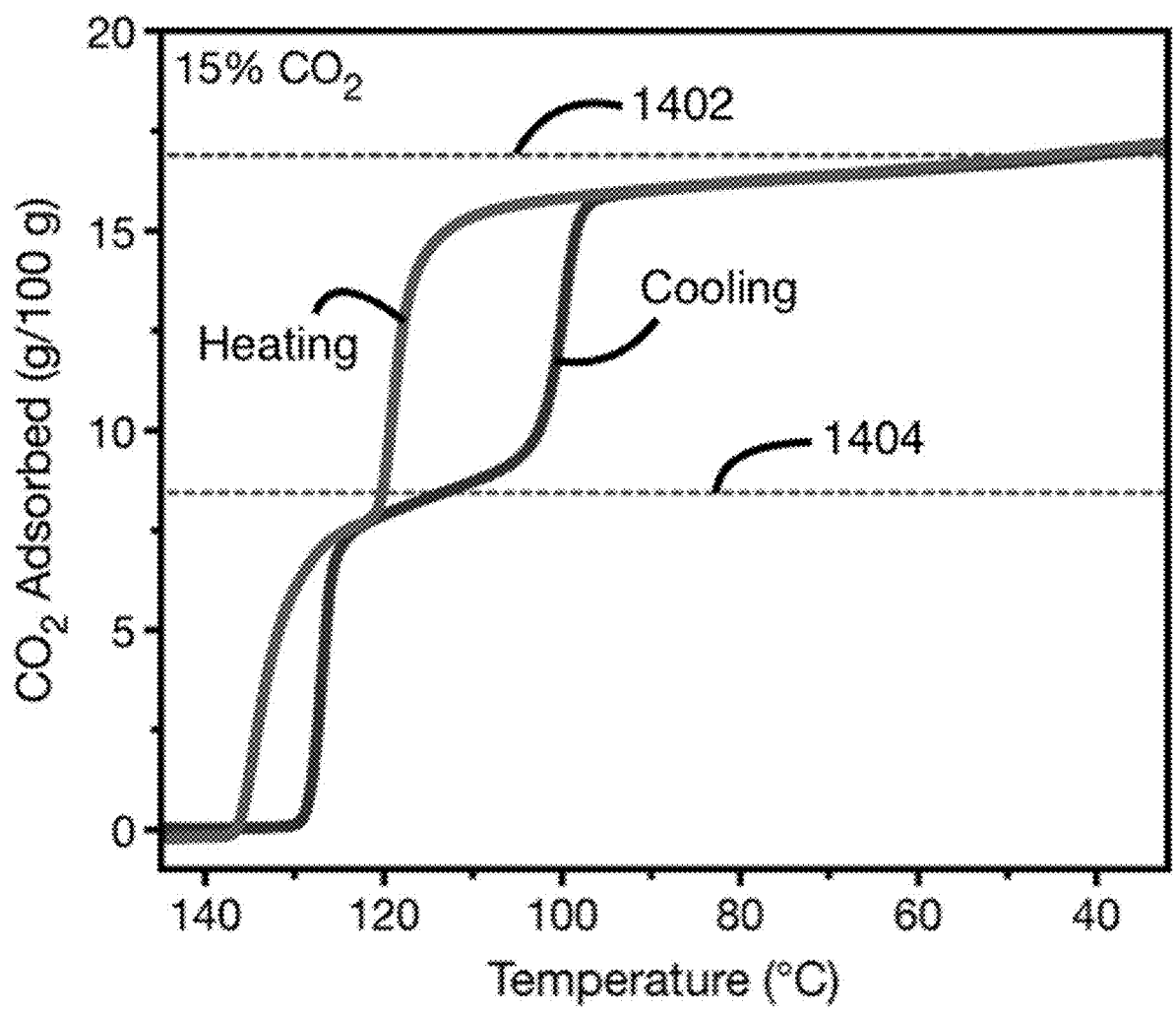
FIG. 14 illustrates thermogravimetric adsorption (cooling) and desorption (heating) isobars at atmospheric pressure under 15% $CO_2$ for EMM-53 (N,N'-bis(3-aminopropyl)-1,4-diaminobutane-$Mg_2$(dobpdc)). Lines 1402 and 1404 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 15:
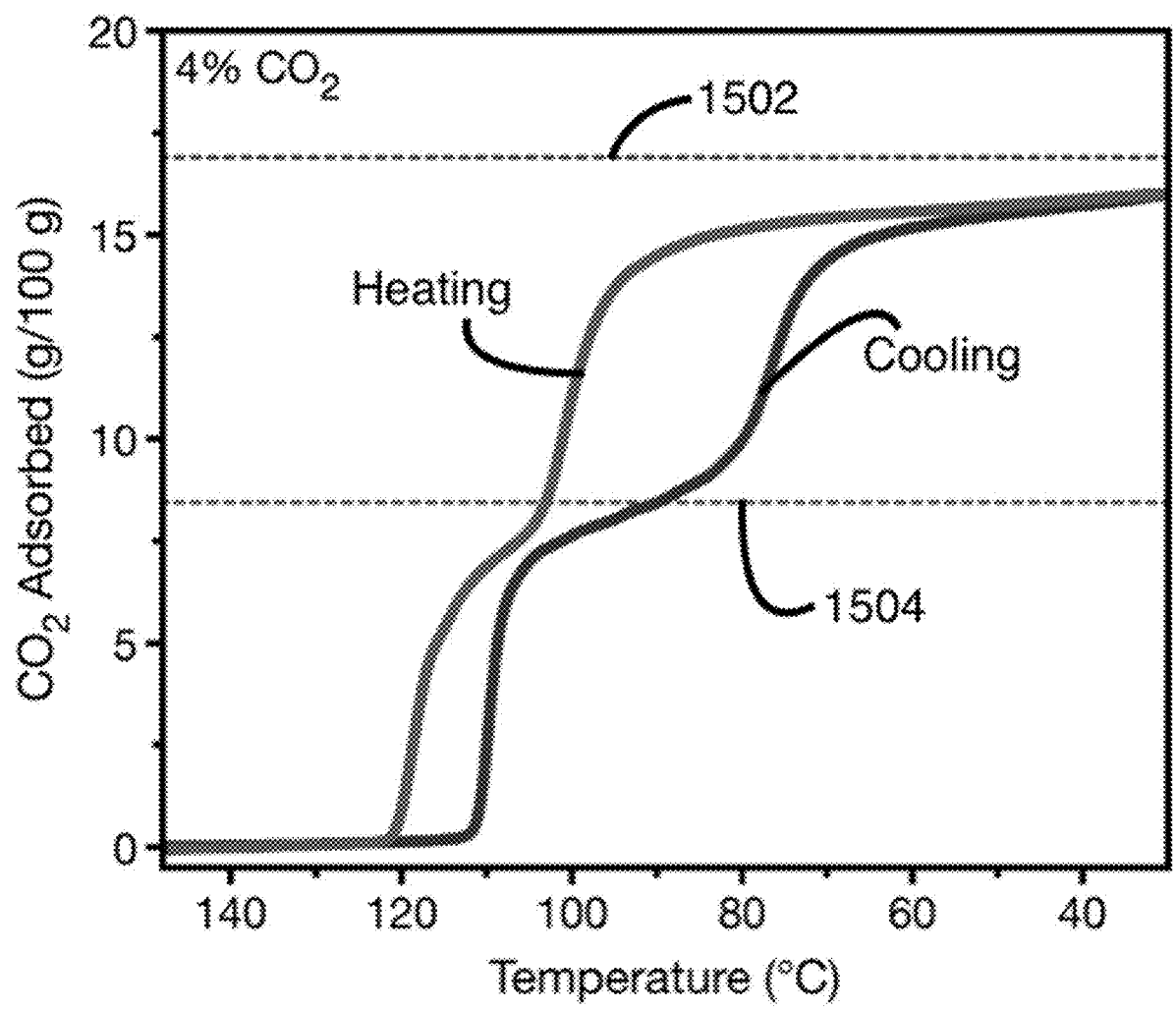
FIG. 15 illustrates thermogravimetric adsorption (cooling,) and desorption (heating) isobars at atmospheric pressure under 4% $CO_2$ for EMM-53 (N,N'-bis(3-aminopropyl)-1,4-diaminobutane-$Mg_2$(dobpdc)). Lines 1502 and 1504 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 16:
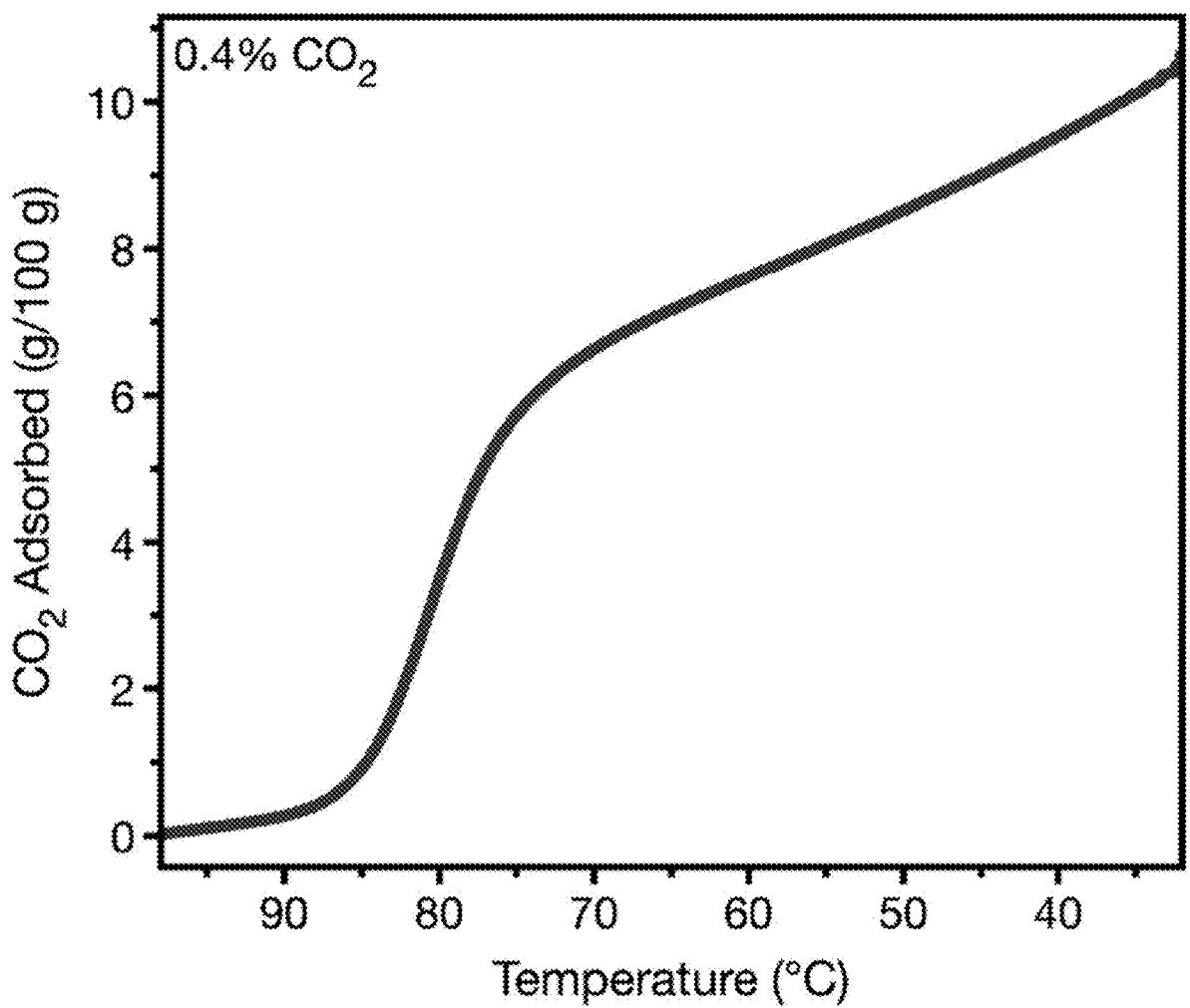
FIG. 16 illustrates thermogravimetric adsorption (cooling) and desorption (heating) isobars at atmospheric pressure under 0.4% $CO_2$ adsorption for EMM-53 (N,N'-bis(3-aminopropyl)-1,4-diaminobutane-$Mg_2$(dobpdc)). A temperature ramp rate of 0.1° C./minute was used.
Figure 17:
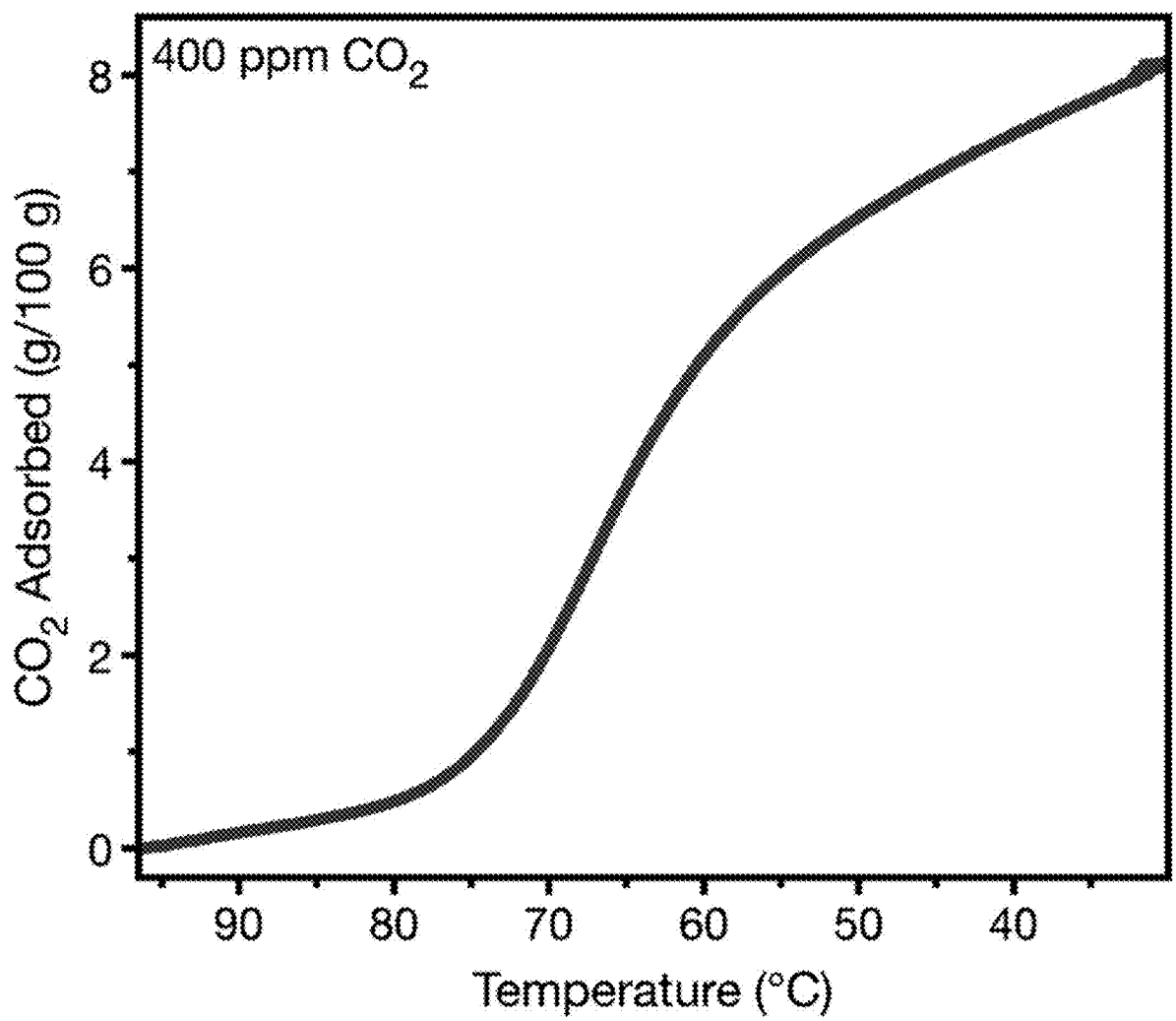
FIG. 17 illustrates a thermogravimetric adsorption isobar at atmospheric pressure under 400 ppm $CO_2$ for EMM-53 (N,N'-bis(3-aminopropyl)-1,4-diaminobutane-$Mg_2$(dobpdc)). A temperature ramp rate of 0.1° C./minute was used.

Additionally, EMM-53 (N,N'-bis(3-aminopropyl)-1,4-diaminobutane-$Mg_2$(dobpdc)) exhibits step-shaped $CO_2$ adsorption (FIG. 12). The higher temperature step occurs at a temperature of 150° C. and reaches a capacity of slightly less than one $CO_2$ per tetramine. The lower temperature step occurs at ~130° C., only slightly lower than the higher temperature step, and approaches the theoretical maximum $CO_2$ capacity considering two $CO_2$ molecules for each tetramine. Because EMM-53 shows sharp steps at high temperatures and high $CO_2$ capacity, it is a very promising adsorbent for removal of $CO_2$ from low partial pressure streams such as natural gas flue gas and air (see, FIGS. 13-17).

Figure 18:
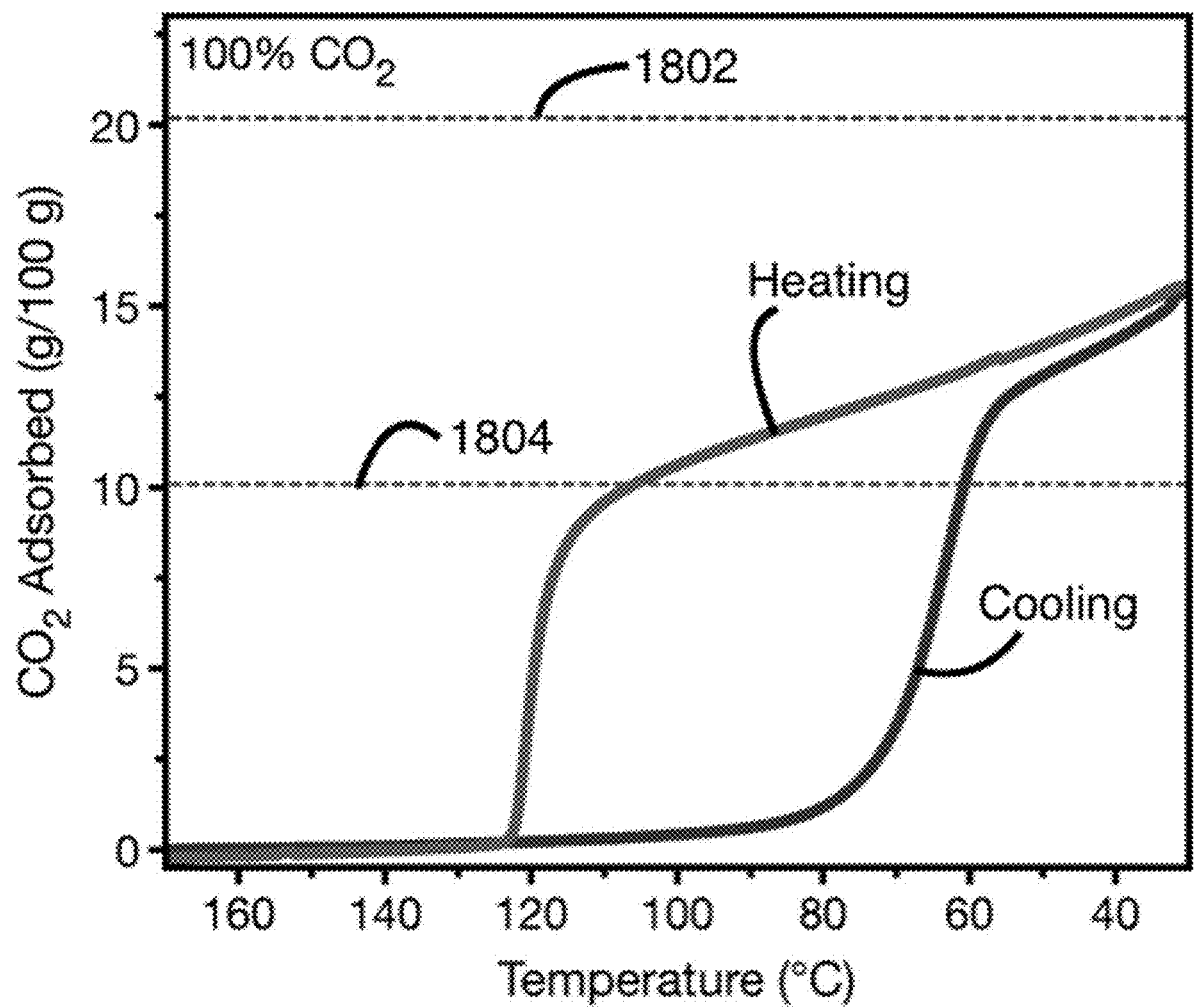
FIG. 18 illustrates thermogravimetric adsorption (cooling) and desorption (heating) isobars at atmospheric pressure under pure $CO_2$ for EMM-53(3-2) (N-(2-aminoethyl)-1,3-propanediamine-$Mg_2$(dobpdc)). Lines 1802 and 1804 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 19:
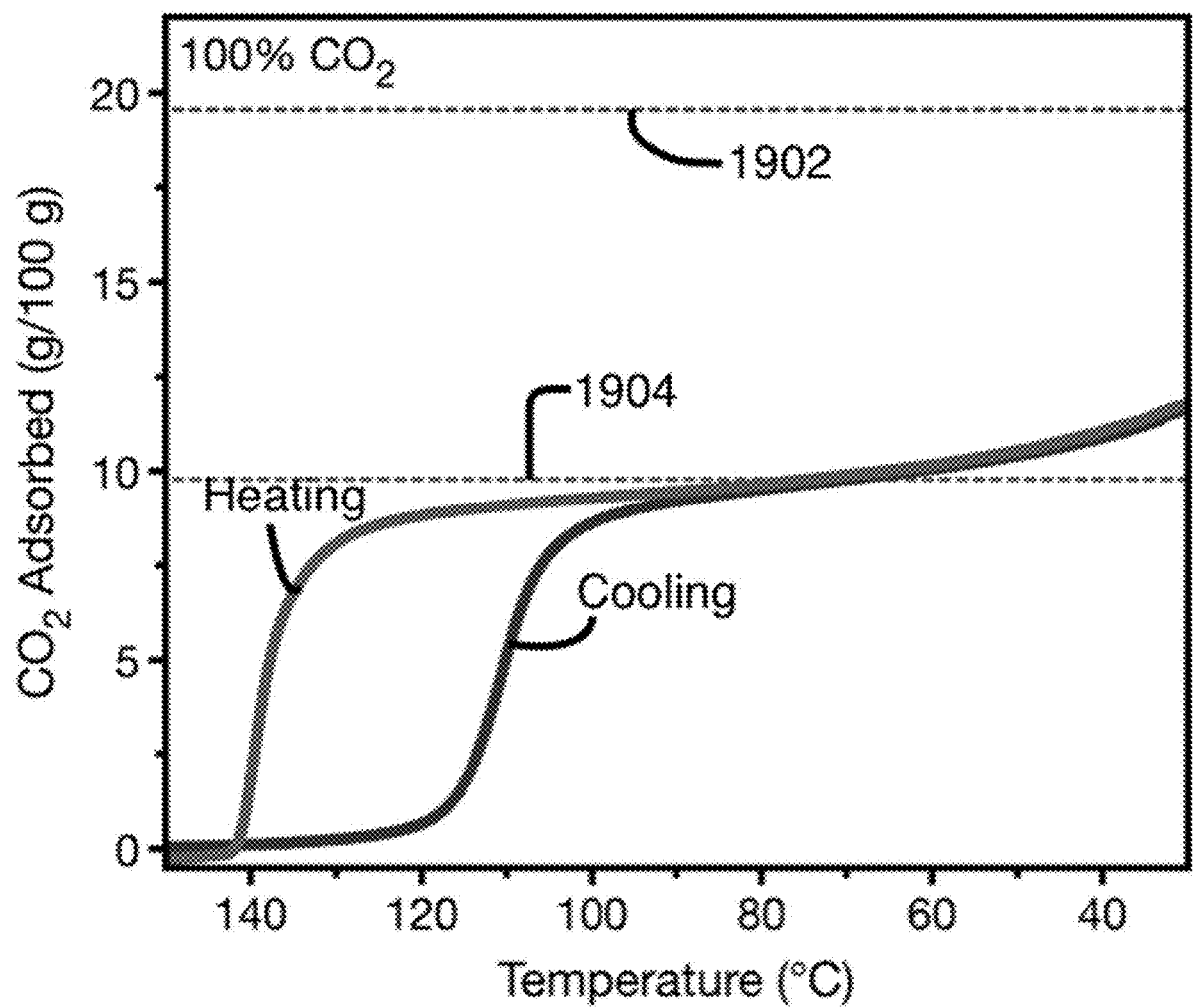
FIG. 19 illustrates thermogravimetric adsorption (cooling) and desorption (heating) isobars at atmospheric pressure under pure $CO_2$ for EMM-53(3-3) (Bis(3-aminopropyl)amine-$Mg_2$(dobpdc)). Lines 1902 and 1904 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 20:
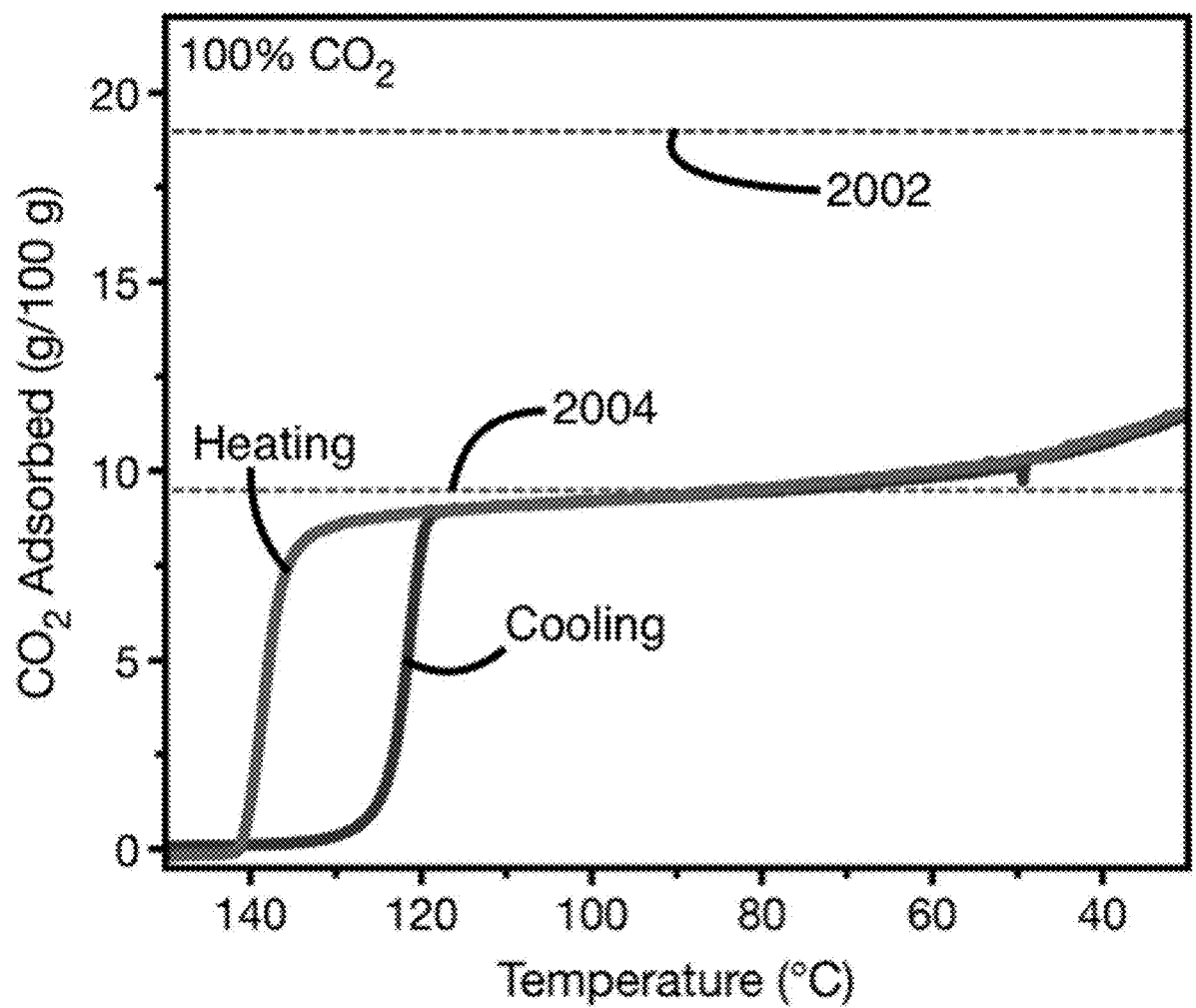
FIG. 20 illustrates thermogravimetric adsorption (cooling) and desorption (heating) isobars at atmospheric pressure under pure $CO_2$ for EMM-53(3-4) (N-(3-aminopropyl)-1,4-diaminobutane-$Mg_2$(dobpdc)). Lines 2002 and 2004 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 21:
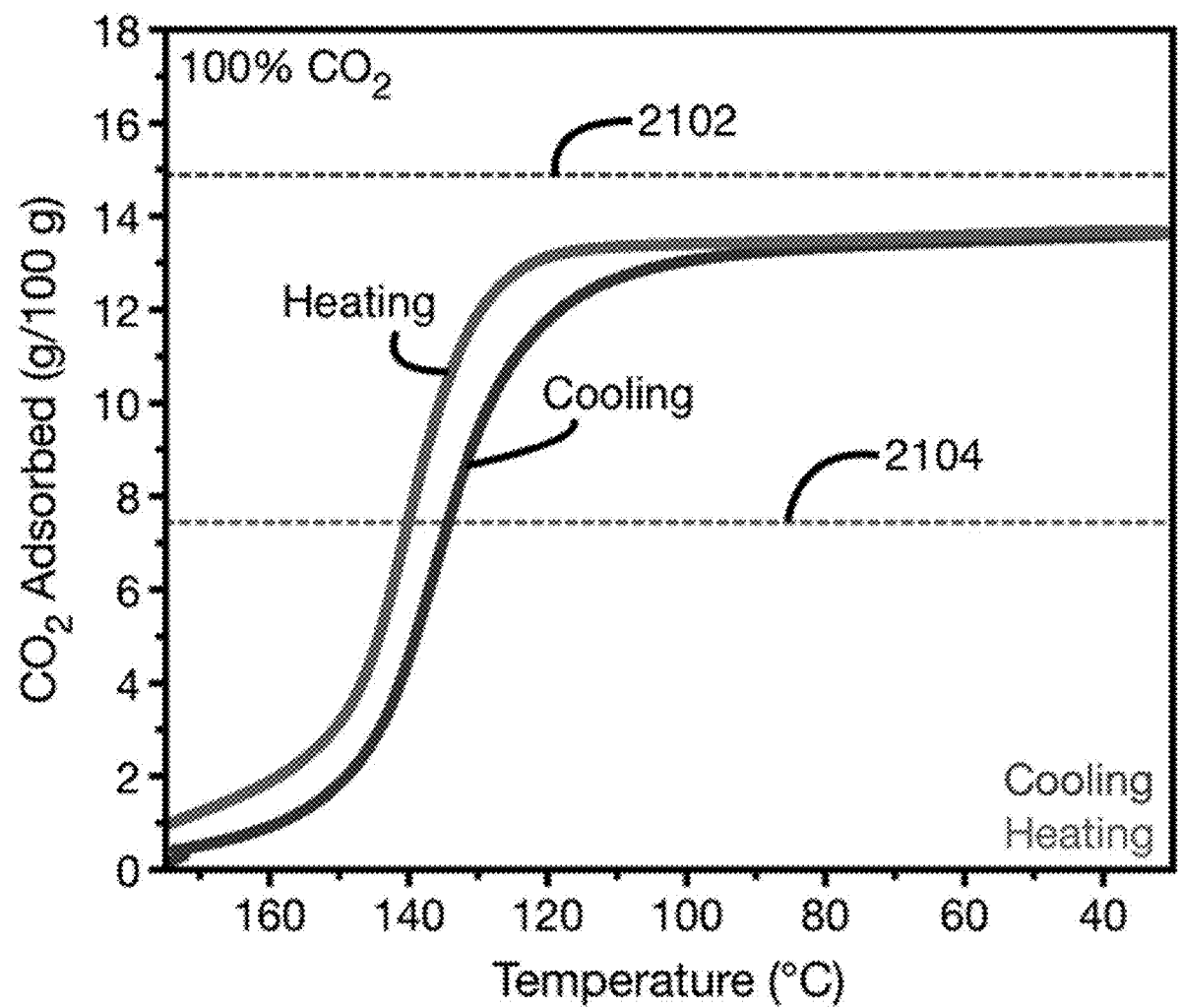
FIG. 21 illustrates thermogravimetric adsorption (cooling) and desorption (heating) isobars at atmospheric pressure under pure $CO_2$ for EMM-53(2-2-2-2) (tetraethylenepentamine-$Mg_2$(dobpdc)). The sample illustrated by FIG. 21 exhibits step-shaped $CO_2$ adsorption at a high temperature. Lines 2102 and 2104, respectively, represent the theoretical $CO_2$ uptake if each polyamine could capture (i) two $CO_2$ molecules and (ii) one $CO_2$ molecule, in accordance with an embodiment of the present disclosure.

Triamines, like N-(2-aminoethyl)-1,3-propanediamine, bis(3-aminopropyl)amine, and N-(3-aminopropyl)-1,4-diaminobutane, were appended to $Mg_2$(dobpdc) (EMM-53(3-2), EMM-53(3-3), and EMM-53(3-4)) and activated to a loading of ~100%. These representative triamines appended to $Mg_2$(dobpdc) show step-shaped $CO_2$ adsorption up to a capacity around one $CO_2$ molecule per triamine (FIGS. 18-20). This behavior is suspected to be due to the triamines only being able to form one set of ammonium carbamate chains per triamine in the framework. A pentamine, tetraethylenepentamine, was also successfully appended to $Mg_2$(dobpdc) (EMM-53(2-2-2-2)), and step-shaped $CO_2$ adsorption was observed to start at a high temperature of 150° C. up to a fairly high capacity (FIG. 21), suggesting it should be effective for the removal of $CO_2$ from low partial pressure streams.

Figure 22A:
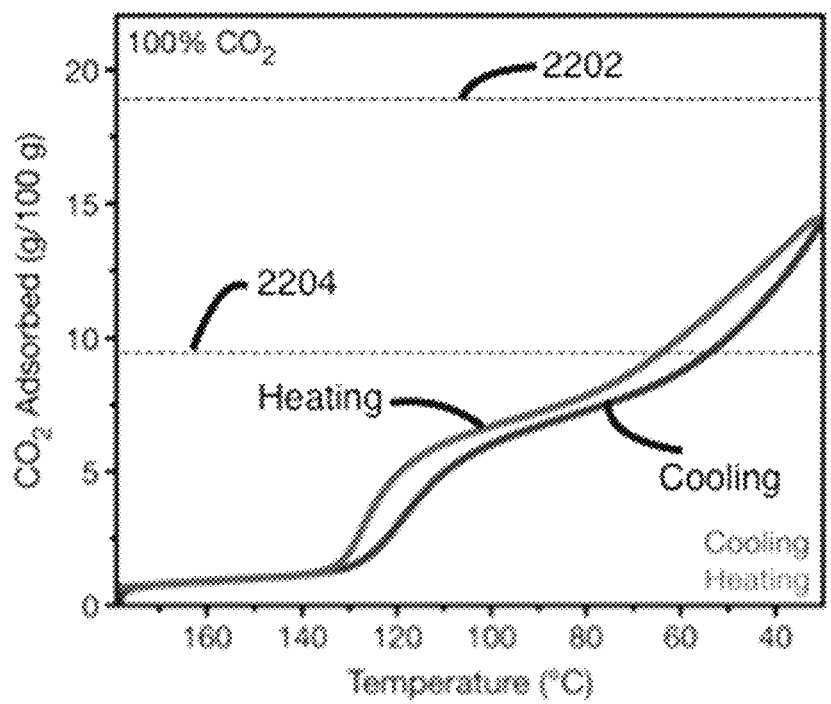
FIG. 22A, FIG. 22B, and FIG. 22C respectively illustrate thermogravimetric adsorption (cooling) and desorption (heating) isobars for EMM-55(2-2-2) (triethylenetetramine-$Mg_2$(pc-dobpdc), pc-dobpdc$^{4-}$=3,3'-dioxidobiphenyl-4,4'-dicarboxylate, pc=para-carboxylate) (Panel A), EMM-55(2-3-2) (N,N'-bis(2-aminoethyl)-1,3-propanediamine-$Mg_2$(pc-dobpdc)) (Panel B), and EMM-55 (N,N'-bis(3-aminopropyl)-1,4-diaminobutane-$Mg_2$(pc-dobpdc)) (Panel C) at atmospheric pressure under pure $CO_2$. Lines 2202 and 2204 respectively represent the theoretical $CO_2$ uptake if each polyamine could capture (i) two $CO_2$ molecules and (ii) one $CO_2$ molecule, in accordance with an embodiment of the present disclosure.
Figure 22B:
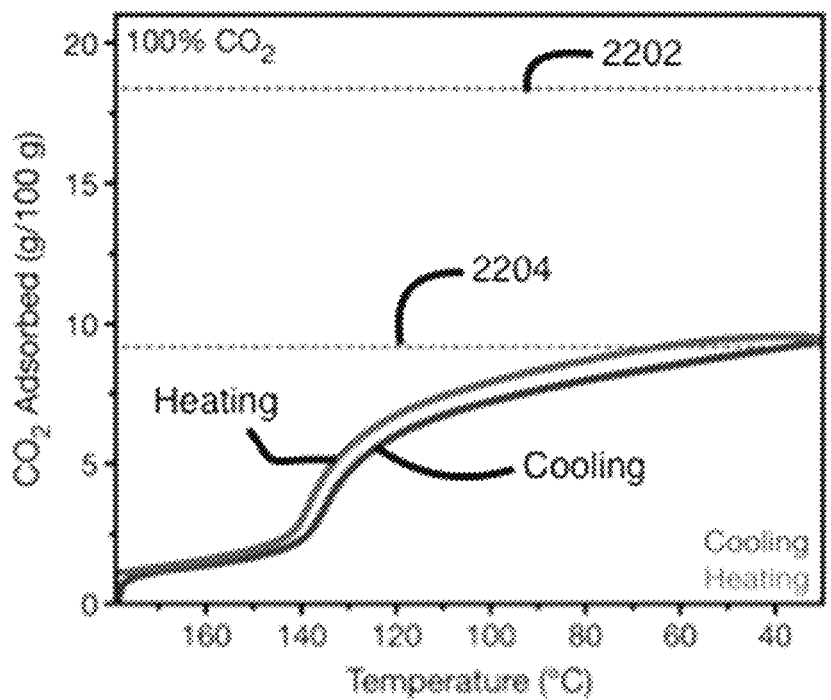
Figure 22C:
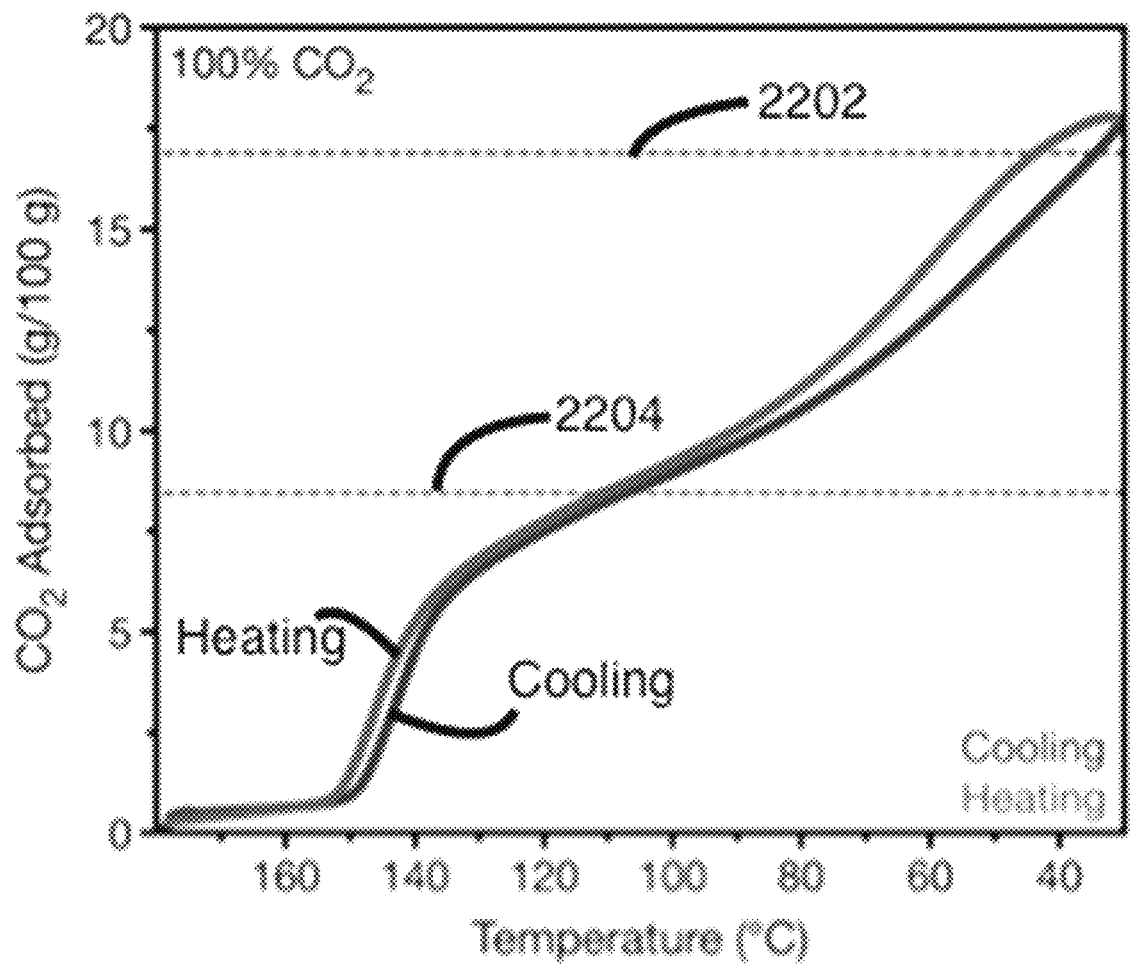
Figure 23:
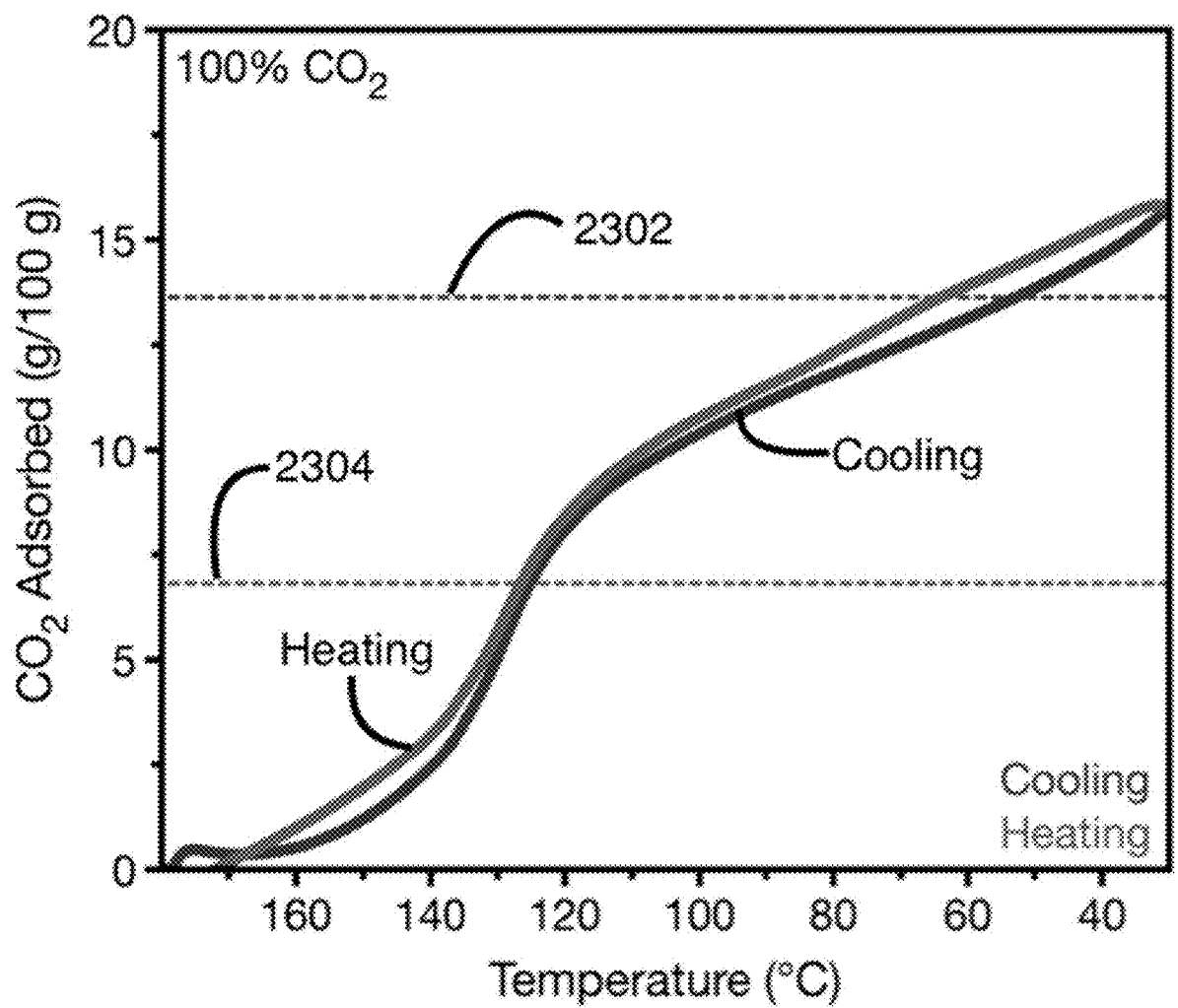
FIG. 23 illustrates thermogravimetric adsorption (cooling) and desorption (heating) isobars for EMM-54 (N,N'-bis(3-aminopropyl)-1,4-diaminobutane-$Mg_2$(dotpdc) (dotpdc$^{4-}$=4,4"-dioxido-[1':4',1"-terphenyl]-3,3"-dicarboxylate)) at atmospheric pressure under pure $CO_2$. Step-shaped $CO_2$ adsorption is still observed in this polyamine-appended framework. Lines 2302 and 2304 respectively represent the theoretical $CO_2$ uptake if each polyamine could capture (i) two $CO_2$ molecules and (ii) one $CO_2$ molecule, in accordance with an embodiment of the present disclosure.
Figure 24:
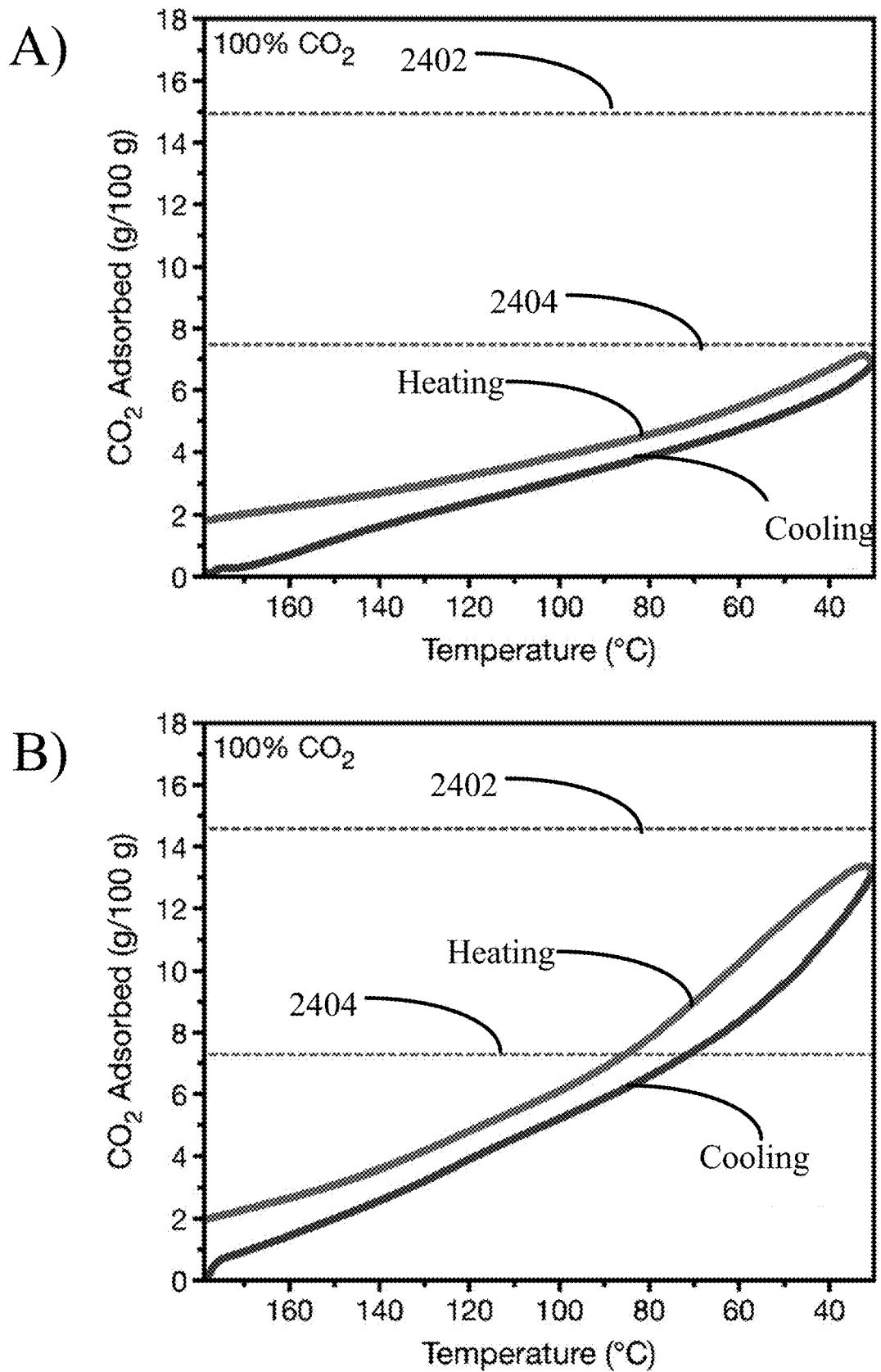
FIG. 24 illustrates thermogravimetric adsorption (cooling) and desorption (heating) isobars for EMM-54(2-2-2) (triethylenetetramine-$Mg_2$(dotpdc)) (panel A) and EMM-54 (2-3-2) (N,N'-bis(2-aminoethyl)-1,3-propanediamine-$Mg_2$(dotpdc)) (panel B) at atmospheric pressure under pure $CO_2$. Lines 2402 and 2404 represent the theoretical $CO_2$ uptake if each polyamine could capture (i) two $CO_2$ molecules and (ii) one $CO_2$ molecule, respectively in accordance with an embodiment of the present disclosure.
Figure 25A:
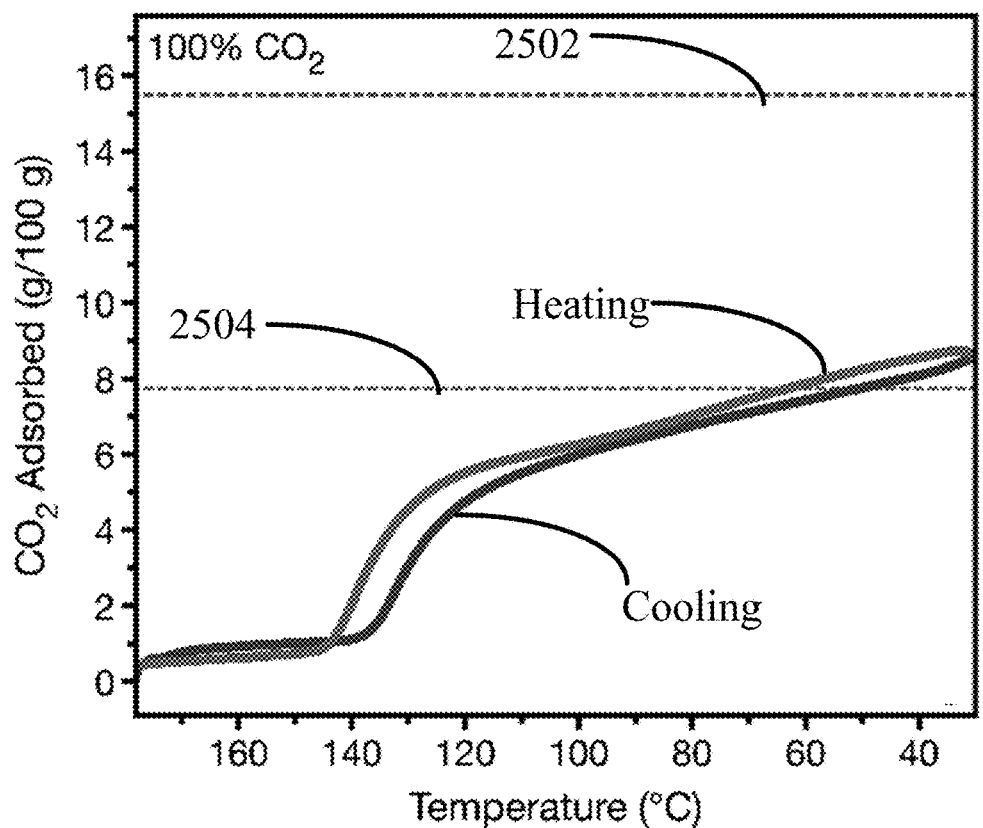
FIGS. 25A and 25B respectively illustrate thermogravimetric adsorption (cooling) and desorption (heating) isobars for EMM-53(3-3-3-Mn) (N,N'-bis(3-aminopropyl)-1,3-propanediamine-$Mn_2$(dobpdc)) (Panel A) and EMM-53(Mn) (N,N'-bis(3-aminopropyl)-1,4-diaminobutane-$Mn_2$ (dobpdc)) (Panel B) at atmospheric pressure under pure $CO_2$. Step-shaped $CO_2$ adsorption is observed in this polyamine-appended framework. Lines 2502 and 2504 respectively represent the theoretical $CO_2$ uptake if each polyamine could capture (i) two $CO_2$ molecules and (ii) one $CO_2$ molecule, respectively, in accordance with an embodiment of the present disclosure.
Figure 25B:
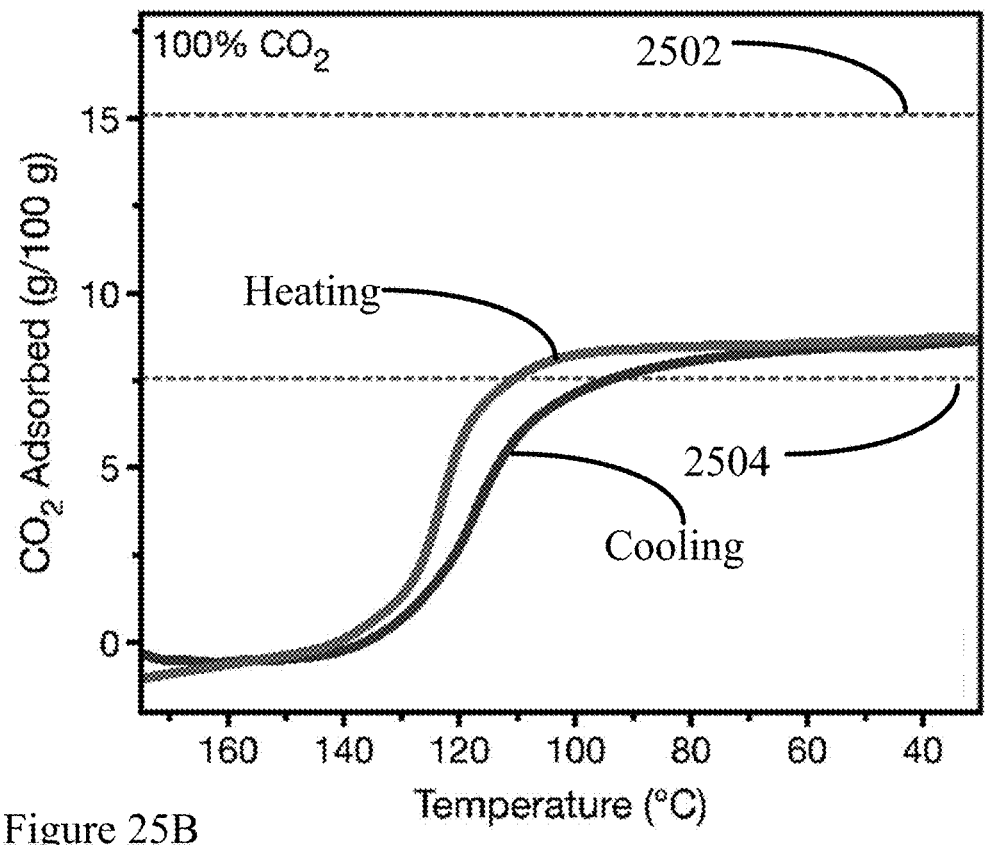

A set of representative tetramines, triethylenetetramine, N,N'-bis(2-aminoethyl)-1,3-propanediamine, and N,N'-bis (3-aminopropyl)-1,4-diaminobutane, were successfully appended to $Mg_2$(pc-dobpdc) (EMI-55(2-2-2), EMI-55(2-3-2), and EMM-55) and $Mg_2$(dotpdc) (EMI-54(2-2-2), EMI-54(2-3-2), and EMM-54). The decomposition profiles of the tetramines appended to these related frameworks suggested coordination modes similar to those on the $Mg_2$(dobpdc) framework. On the $Mg_2$(pc-dobpdc) framework, a loading of ~100% was obtained for all three representative tetramines, and step-shaped $CO_2$ adsorption was observed (FIG. 22). Although $Mg_2$(dotpdc) has a larger pore environment compared to $Mg_2$(dobpdc), tetramine loadings of ~100% were still achieved with all of the representative tetramines, and step-shaped $CO_2$ capture was observed on EMM-54 (FIG. 23). Triethylenetetramine and N,N'-bis(2-aminoethyl)-1,3-propanediamine did not show step-shaped $CO_2$ capture on this framework likely due to the larger pore environment and short polyamine length restricting $CO_2$ insertion to form ammonium carbamate chains (FIG. 24). To test polyamine-behavior in other metal variants in the $M_2$(dobpdc) family, N,N'-bis(3-aminopropyl)-1,3-propanediamine and N,N'-bis(3-aminopropyl)-1,4-diaminobutane were appended to $Mn_2$(dobpdc) (EMM-53(3-3-3-Mn) and EMM-53(Mn)) and step-shaped $CO_2$ adsorption was observed (FIG. 25). These results suggest that polyamines can operate in other frameworks and show behavior similar to what is seen in the $Mg_2$(dobpdc) framework.

Figure 26:
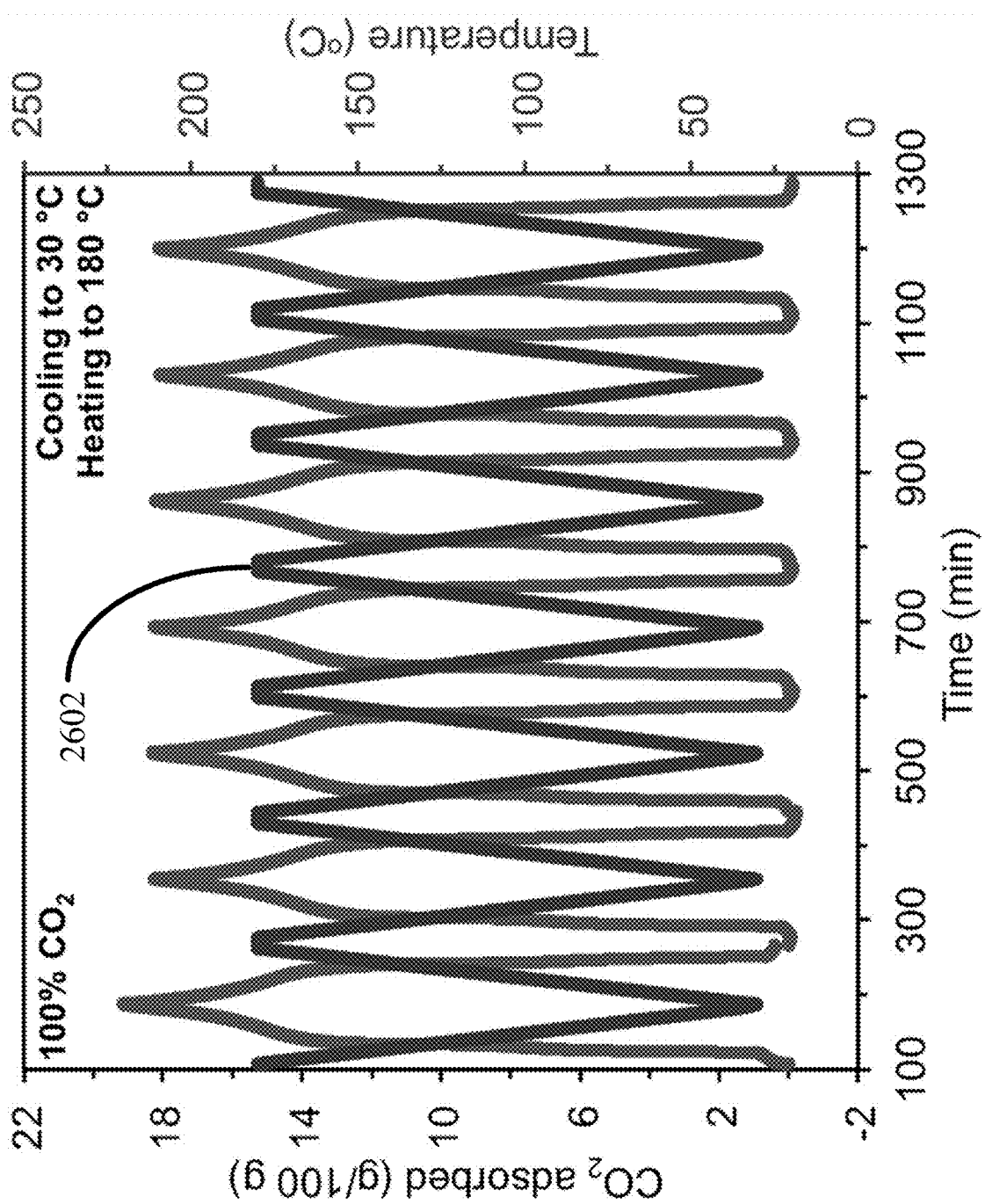
FIG. 26 illustrates adsorption/desorption cycling (temperature line 2602) under pure $CO_2$ for EMM-53 (N,N'-bis(3-aminopropyl)-1,4-diaminobutane-$Mg_2$(dobpdc)) with adsorption down to 30° C. for 75 minutes and desorption up to 180° C. for 75 minutes, in accordance with an embodiment of the present disclosure.
Figure 27:
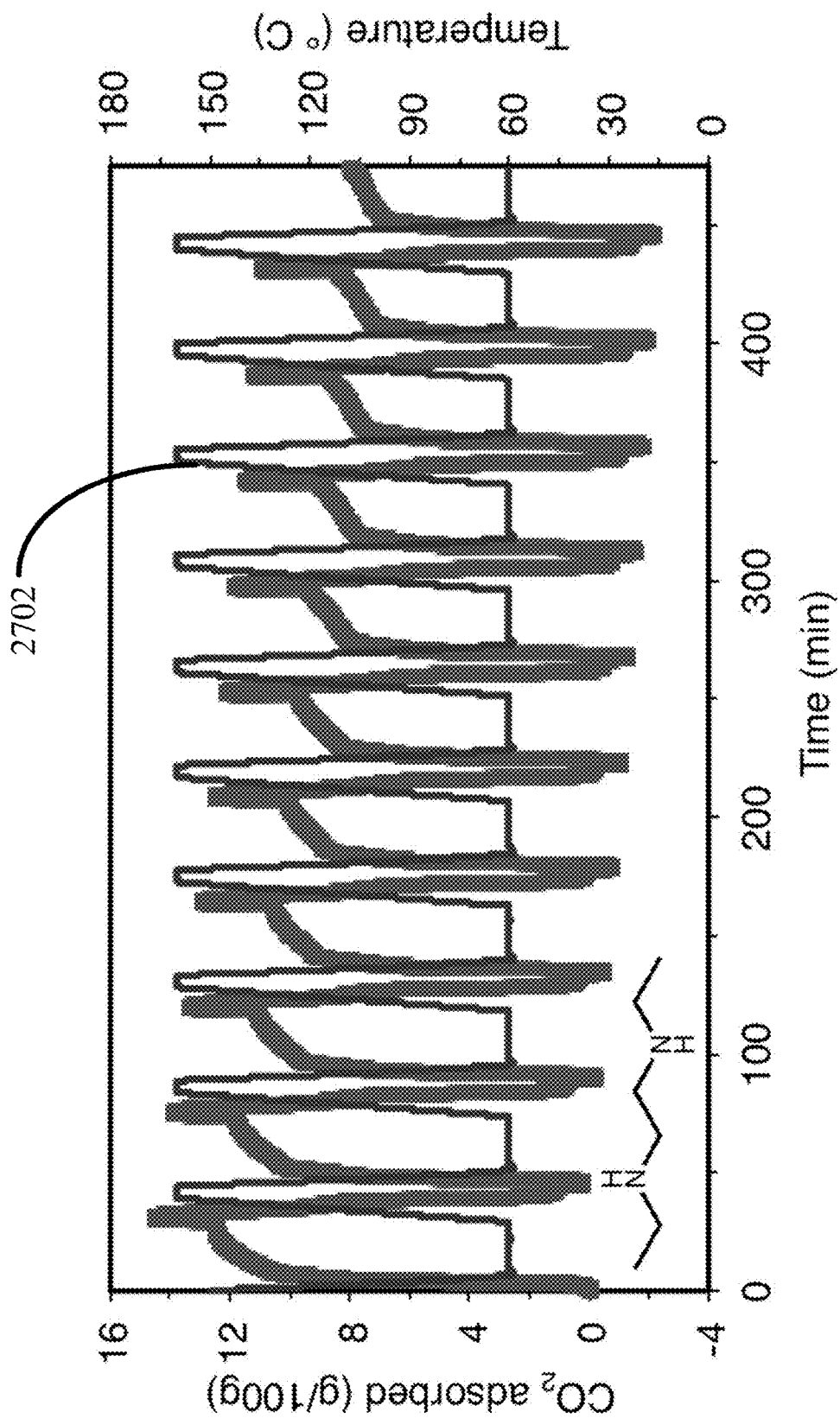
FIG. 27 illustrates cycling adsorption under 4% $CO_2$ at 60° C. for 15 minutes and desorption under pure $CO_2$ at 160° C. for 5 minutes (temperature line 2702) for a representative diamine-appended metal-organic framework, N,N'-diethyl-ethylenediamine-$Mg_2$(dobpdc).
Figure 28:
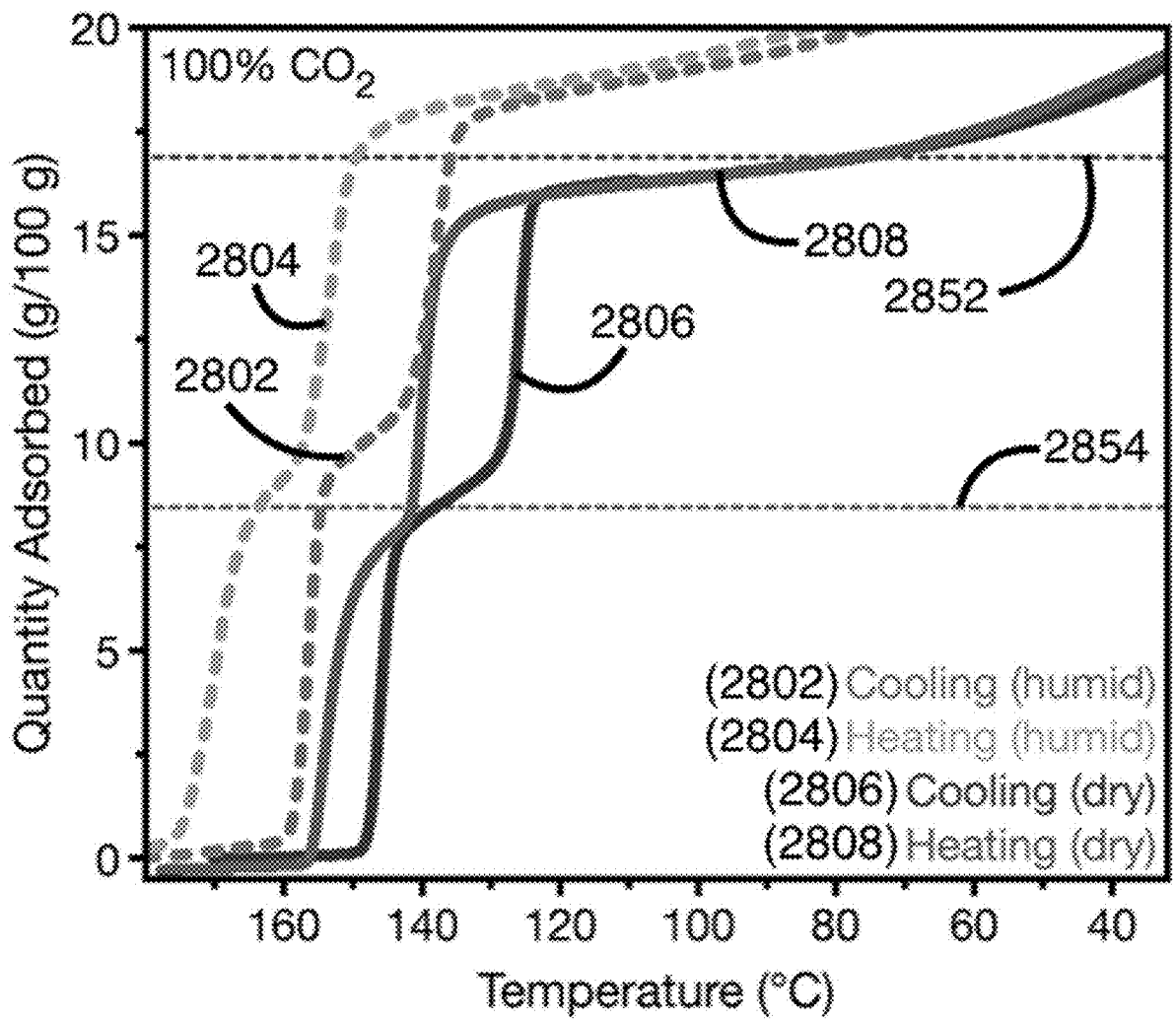
FIG. 28 illustrates comparison of the pure $CO_2$ isobars for EMM-53 (N,N'-bis(3-aminopropyl)-1,4-diaminobutane-$Mg_2$(dobpdc)) under dry and humid conditions. Lines 2852 and 2854 respectively represent the theoretical $CO_2$ uptake if each polyamine could capture (i) two $CO_2$ molecules and (ii) one $CO_2$ molecule, in accordance with an embodiment of the present disclosure. A temperature ramp rate of 1° C./minute was used.
Figure 29:
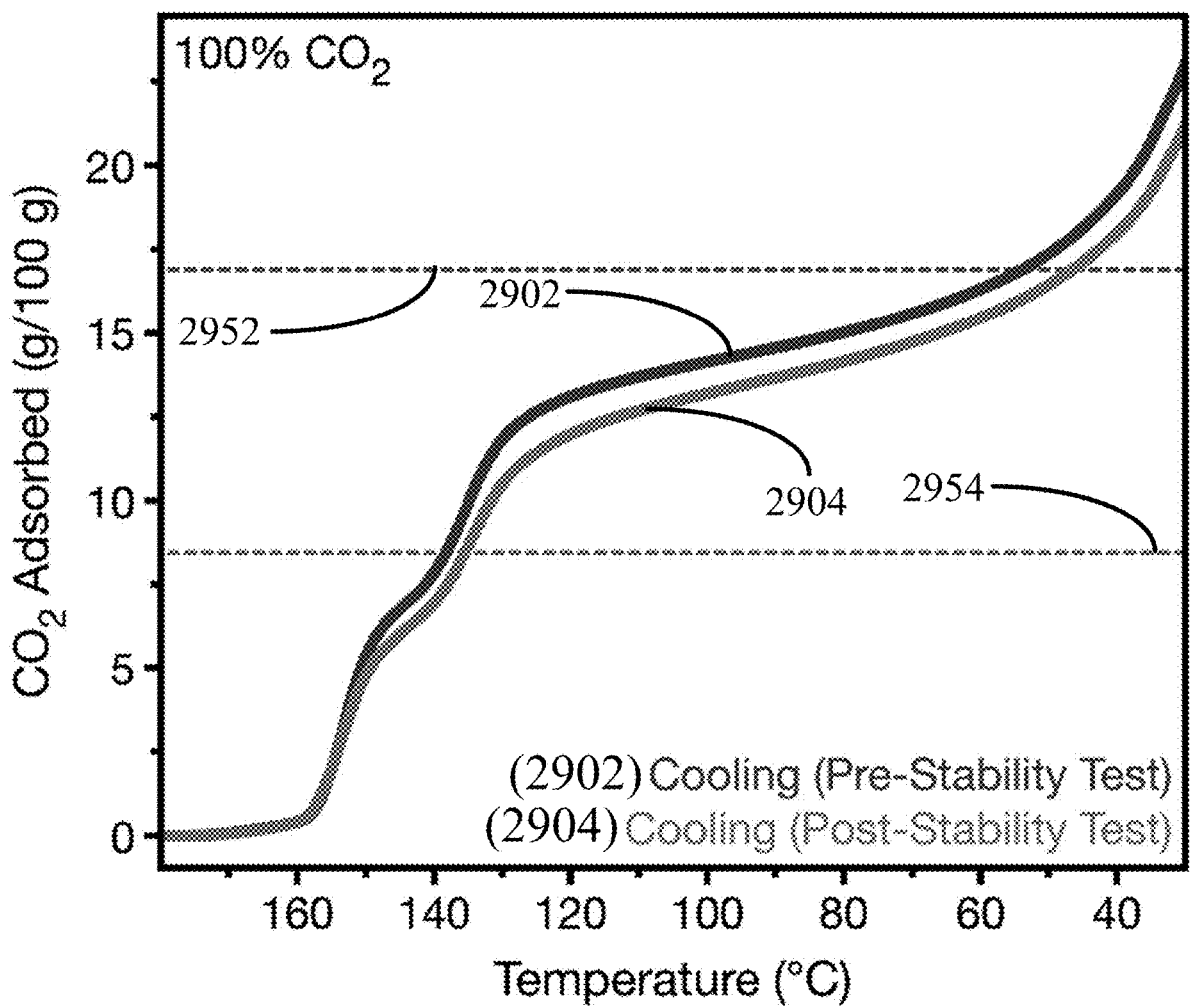
FIG. 29 illustrates pure $CO_2$ adsorption isobars for EMM-53 (N,N'-bis(3-aminopropyl)-1,4-diaminobutane-$Mg_2$ (dobpdc)) under humid conditions before (2902) and after (2904) being held under flowing humid $N_2$ at 180° C. for twelve hours. The dotted lines 2952 and 2954 respectively represent the theoretical $CO_2$ uptake if each polyamine could capture (i) two $CO_2$ molecules and (ii) one $CO_2$ molecule, in accordance with an embodiment of the present disclosure.
Figure 30:
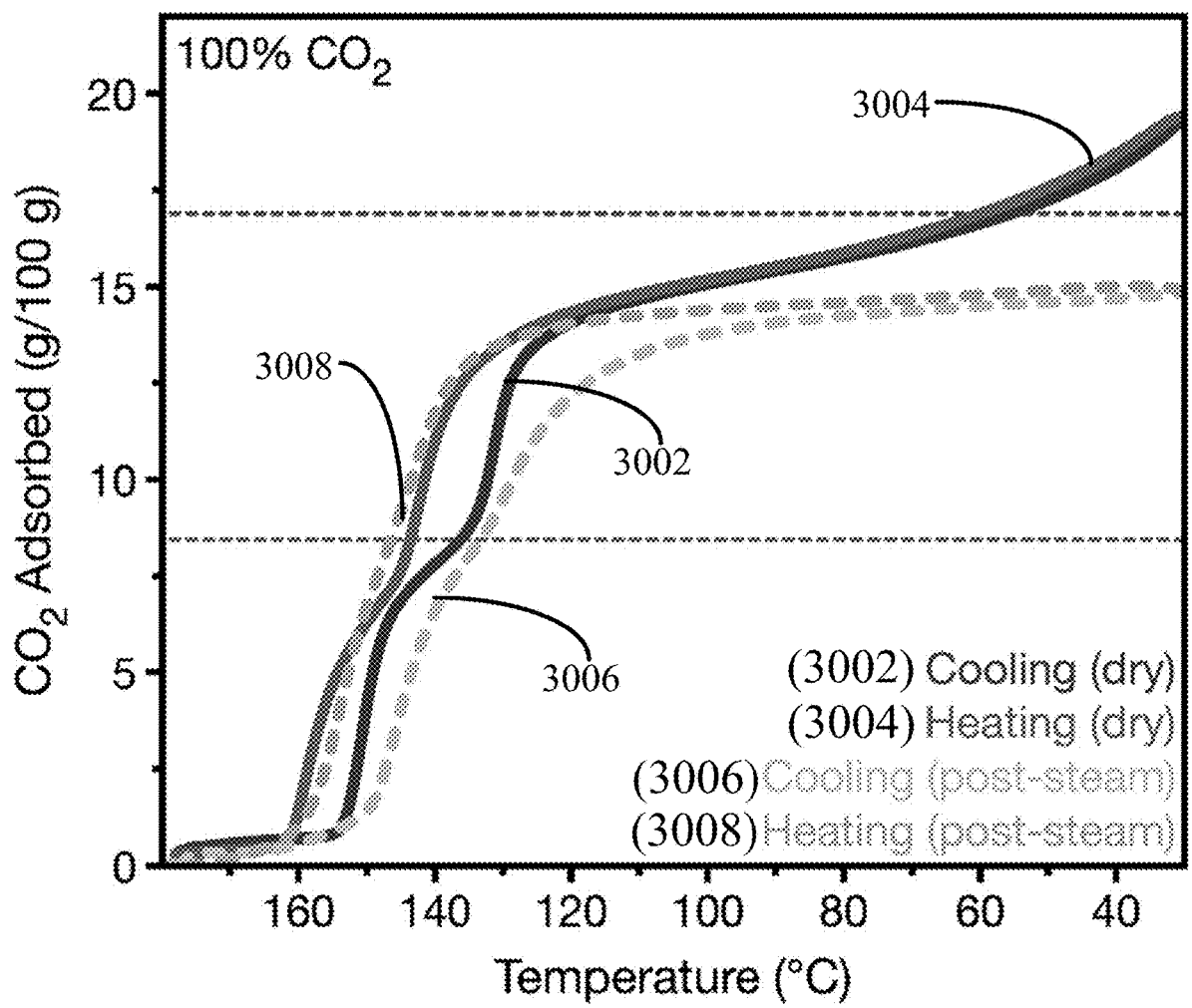
FIG. 30 illustrates pure $CO_2$ isobars for EMM-53 (N,N'-bis(3-aminopropyl)-1,4-diaminobutane-$Mg_2$(dobpdc)) taken after being held under 135° C. steam for three hours. The original pure $CO_2$ isobars for this material are shown for comparison. Lines 3002 and 3004 respectively represent the theoretical $CO_2$ uptake if each polyamine could capture (i) two $CO_2$ molecules and (ii) one $CO_2$ molecule, in accordance with an embodiment of the present disclosure.

To evaluate the stability of these polyamine-appended metal-organic frameworks, we performed cycling tests on EMM-53 (N,N'-bis(3-aminopropyl)-1,4-diaminobutane-$Mg_2$(dobpdc)). The cycling test was performed under pure $CO_2$ for both adsorption and desorption (FIG. 26). After initial activation under $N_2$, the sample was cooled to 30° C. and then heated to 180° C., followed by many repetitions of the cooling/heating cycle. Although the $CO_2$ capacity decreased slightly after the first cycle, the capacity stayed constant throughout the remaining six cycles, unlike the many diamine-appended metal-organic frameworks (FIG. 27). In addition, EMM-53 retains high $CO_2$ adsorption step temperatures under humid conditions (FIG. 28). This adsorbent exhibits no significant polyamine loss even when held at temperatures of 180° C. under flowing wet $CO_2$ for 12 hours (FIG. 29). Lastly, the $CO_2$ adsorption capabilities were retained on this material after being left under steam at 135° C. for 3 hours (FIG. 30). The stability of this tetramine-appended material under steam suggests the potential to use steam as an advantageous desorption method. Therefore, the enhanced stability engendered by the grafting of this tetramine to two separate metal sites makes it a highly promising adsorbent for temperature swing adsorption processes.

Figure 31:
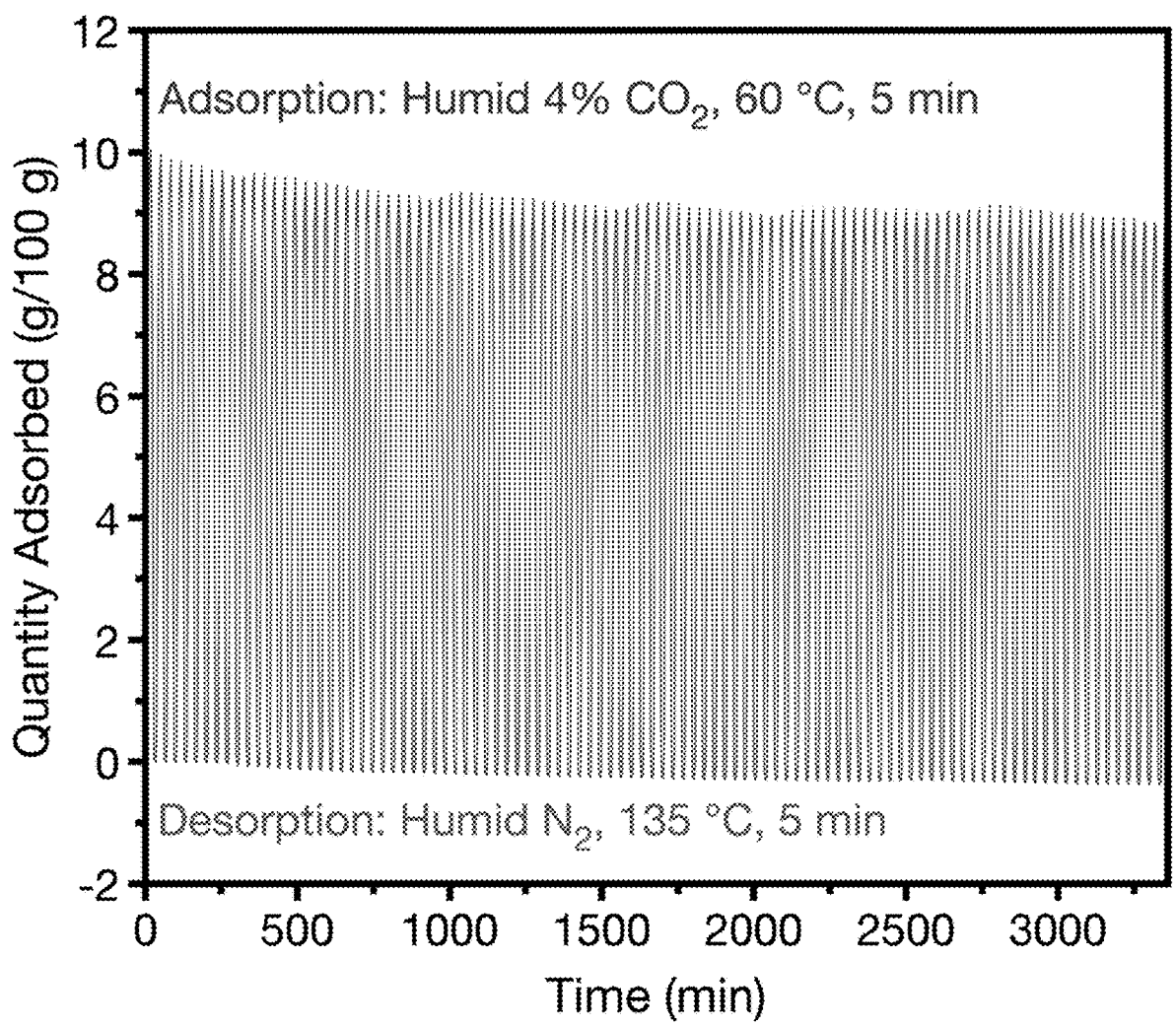
FIG. 31 illustrates humid cycling for EMM-53 (N,N'-Bis(3-aminopropyl)-1,4-diaminobutane-$Mg_2$(dobpdc)). Adsorption is under humid 4% $CO_2$ at 60° C. for ~8 minutes and desorption is under humid $N_2$ at 135° C. for ~8 minutes. The capacity for $CO_2$ was fairly stable throughout the cycling and the polyamine loading post-cycling was 100%.

FIG. 31 illustrates humid cycling for EMM-53 (N,N'-Bis (3-aminopropyl)-1,4-diaminobutane-$Mg_2$(dobpdc)) in which adsorption was at humid 4% $CO_2$ at 60° C. for ~8 minutes, desorption was at humid $N_2$ at 135° C. for ~8 minutes. The Figure illustrates that the capacity for $CO_2$ was fairly stable throughout the cycling and the polyamine loading post-cycling was 100%.

Figure 32:
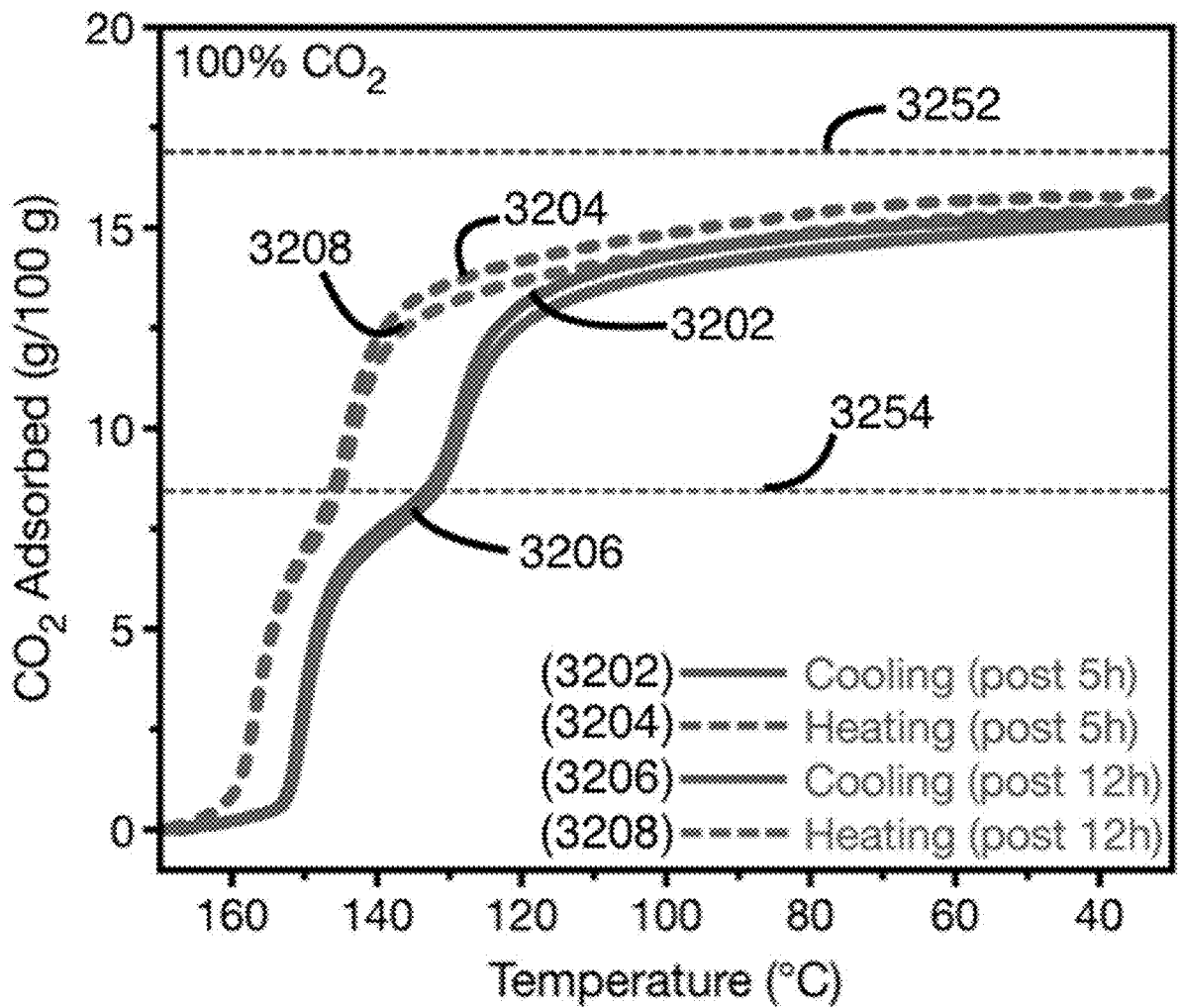
FIG. 32 illustrates pure isobars for EMM-53 (N,N'-Bis (3-aminopropyl)-1,4-diaminobutane-$Mg_2$(dobpdc)) taken after treatment under steam for 5 and 12 hours. The pure $CO_2$ isobars are shown with adsorption as solid lines and desorption as dotted lines. Lines 3252 and 3254 respectively represent the theoretical $CO_2$ uptake if each polyamine could capture (i) two $CO_2$ molecules and (ii) one $CO_2$ molecule, in accordance with an embodiment of the present disclosure.

FIG. 32 illustrates isobars for EMM-53 (N,N'-Bis(3-aminopropyl)-1,4-diaminobutane-$Mg_2$(dobpdc)) taken after treatment under steam for 5 and 12 hours. The pure $CO_2$ isobars are shown with adsorption as solid lines and desorption as dotted lines. The horizontal dotted line 3252 and dotted line 3254 respectively represent the theoretical $CO_2$ uptake if each polyamine could capture two $CO_2$ molecules and one $CO_2$ molecule.

Figure 33:
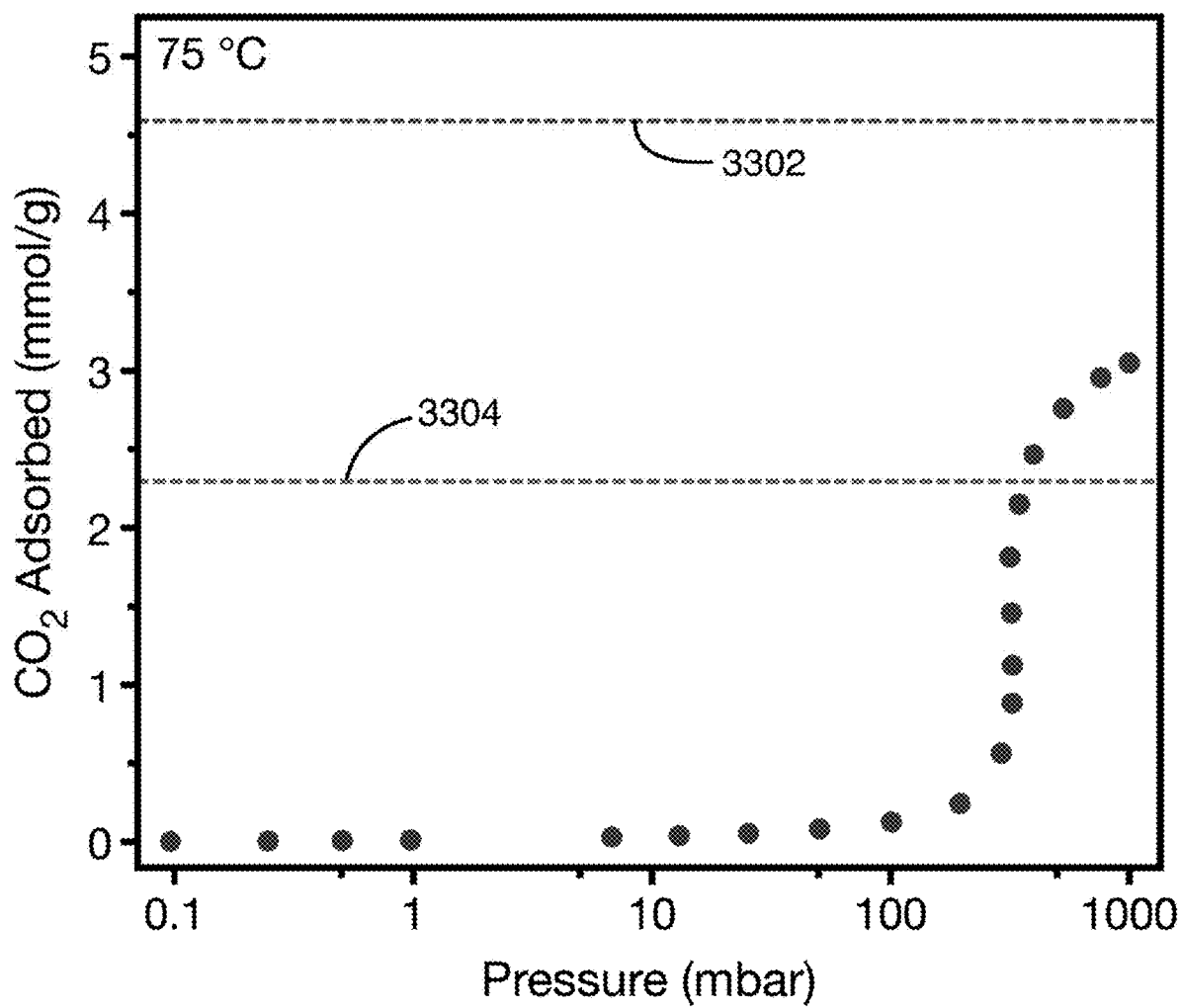
FIG. 33 illustrates the $CO_2$ adsorption isotherm of EMM-53(3-2) (N-(2-aminoethyl)-1,3-propanediamine-$Mg_2$ (dobpdc)) at 75° C. Lines 3302 and 3304 respectively represent the theoretical $CO_2$ uptake if each polyamine could capture (i) two $CO_2$ molecules and (ii) one $CO_2$ molecule, in accordance with an embodiment of the present disclosure.

FIG. 33 illustrates the $CO_2$ adsorption isotherm of EMM-53(3-2) (N-(2-aminoethyl)-1,3-propanediamine-$Mg_2$(dobpdc)) at 75° C. Lines 3302 and 3304 respectively represent the theoretical $CO_2$ uptake if each polyamine could capture two $CO_2$ molecules and one $CO_2$ molecule.

Figure 34:
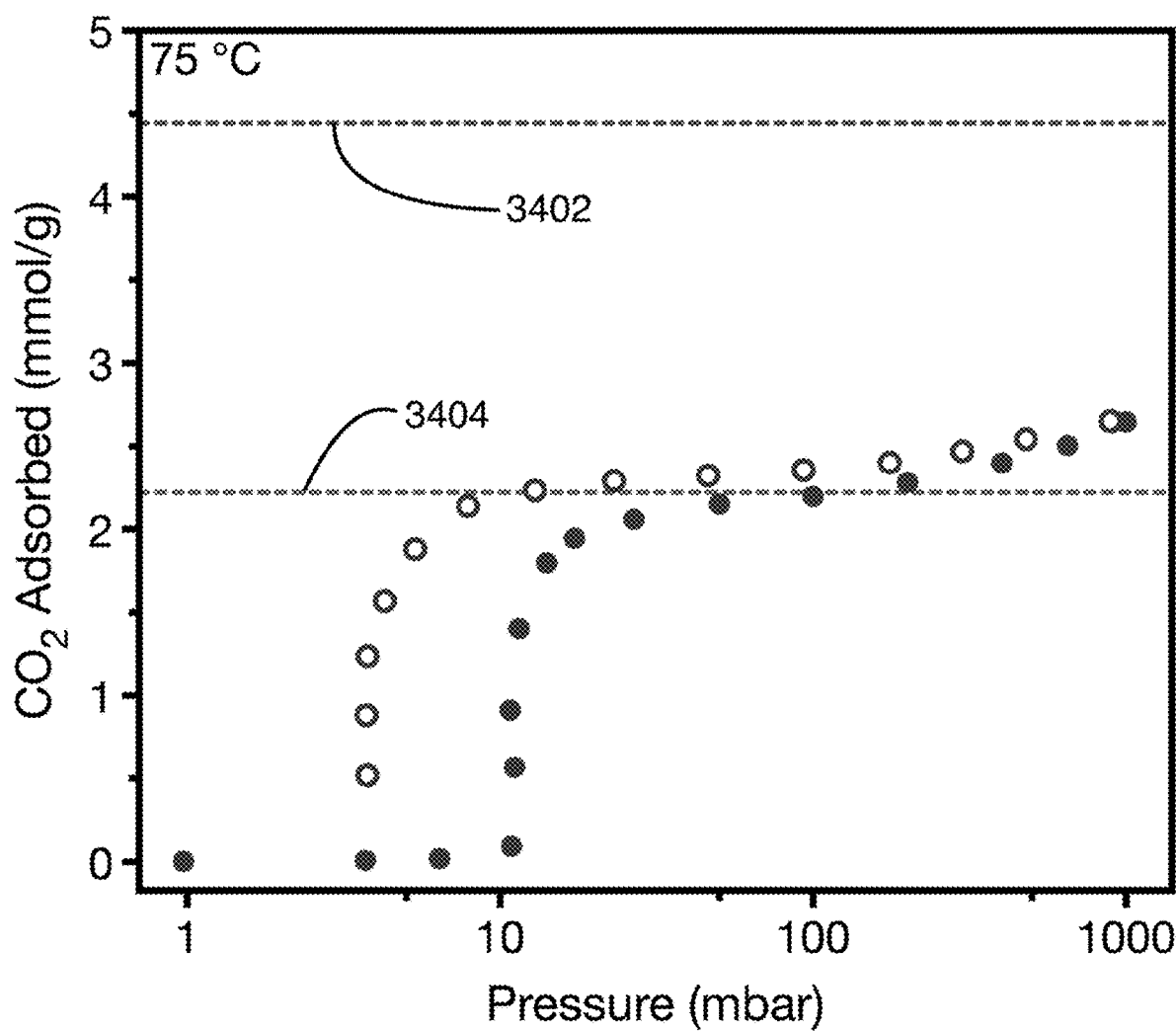
FIG. 34 illustrates the $CO_2$ adsorption (filled circles) and desorption (open circles) isotherms of EMM-53(3-3) (Bis (3-aminopropyl)amine-$Mg_2$(dobpdc)) at 75° C. Lines 3402 and 3404 respectively represent the theoretical $CO_2$ uptake if each polyamine could capture (i) two $CO_2$ molecules and (ii) one $CO_2$ molecule, in accordance with an embodiment of the present disclosure.

FIG. 34 illustrates the $CO_2$ adsorption (filled circles) and desorption (open circles) isotherms of EMM-53(3-3) (Bis (3-aminopropyl)amine-$Mg_2$(dobpdc)) at 75° C. Lines 3402 and 3404 respectively represent the theoretical $CO_2$ uptake if each polyamine could capture two $CO_2$ molecules and one $CO_2$ molecule.

Figure 35:
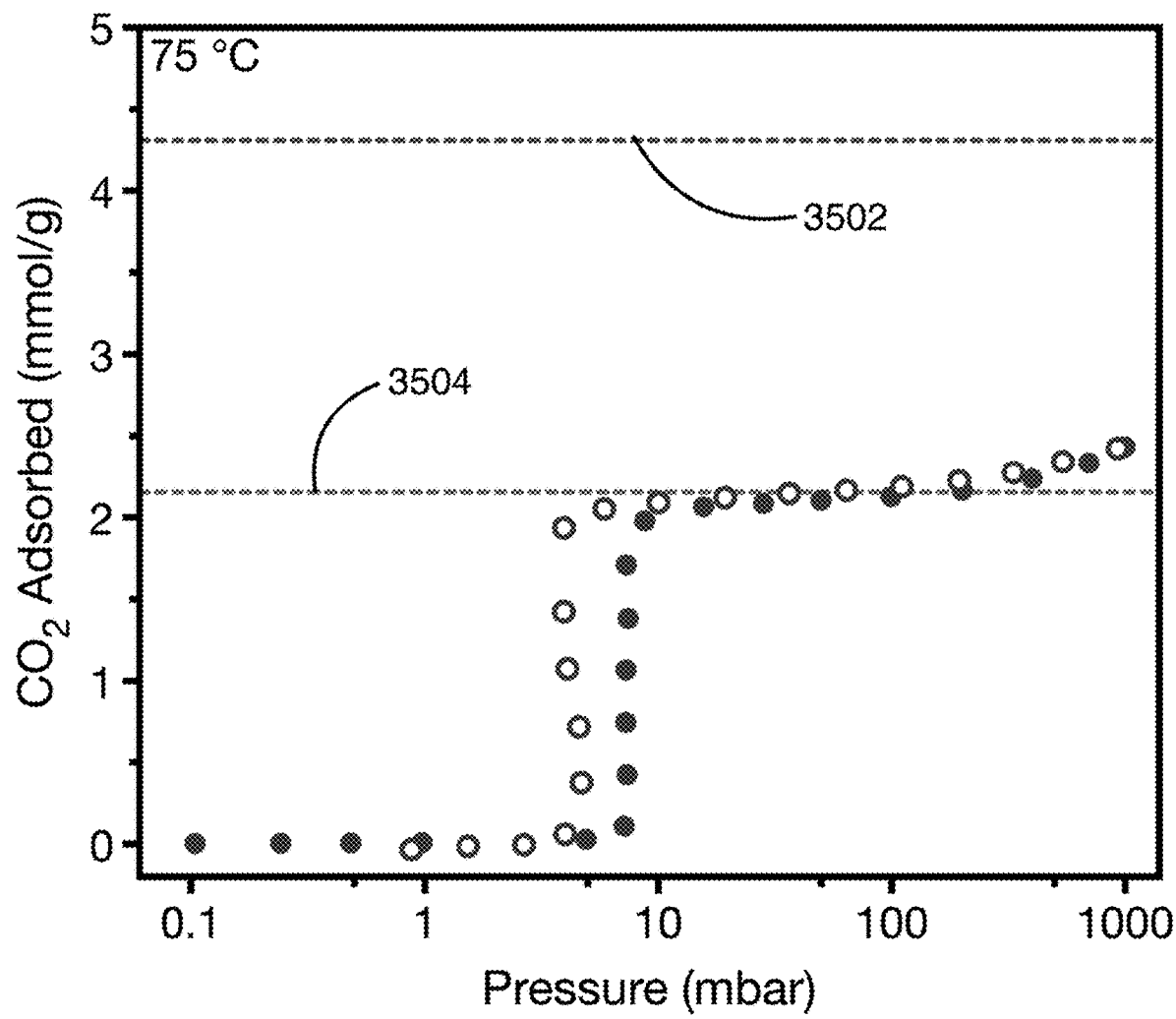
FIG. 35 illustrates the $CO_2$ adsorption (filled circles) and desorption (open circles) isotherms of EMM-53(3-4) (N-(3-aminopropyl)-1,4-diaminobutane-$Mg_2$(dobpdc)) at 75° C. Lines 3502 and 3504 respectively represent the theoretical $CO_2$ uptake if each polyamine could capture (i) two $CO_2$ molecules and (ii) one $CO_2$ molecule, in accordance with an embodiment of the present disclosure.

FIG. 35 illustrates the $CO_2$ adsorption (filled circles) and desorption (open circles) isotherms of EMM-53(3-4) (N-(3-aminopropyl)-1,4-diaminobutane-$Mg_2$(dobpdc)) at 75° C. Lines 3502 and 3504 represent the theoretical $CO_2$ uptake if each polyamine could capture two $CO_2$ molecules and one $CO_2$ molecule, respectively.

Figure 36:
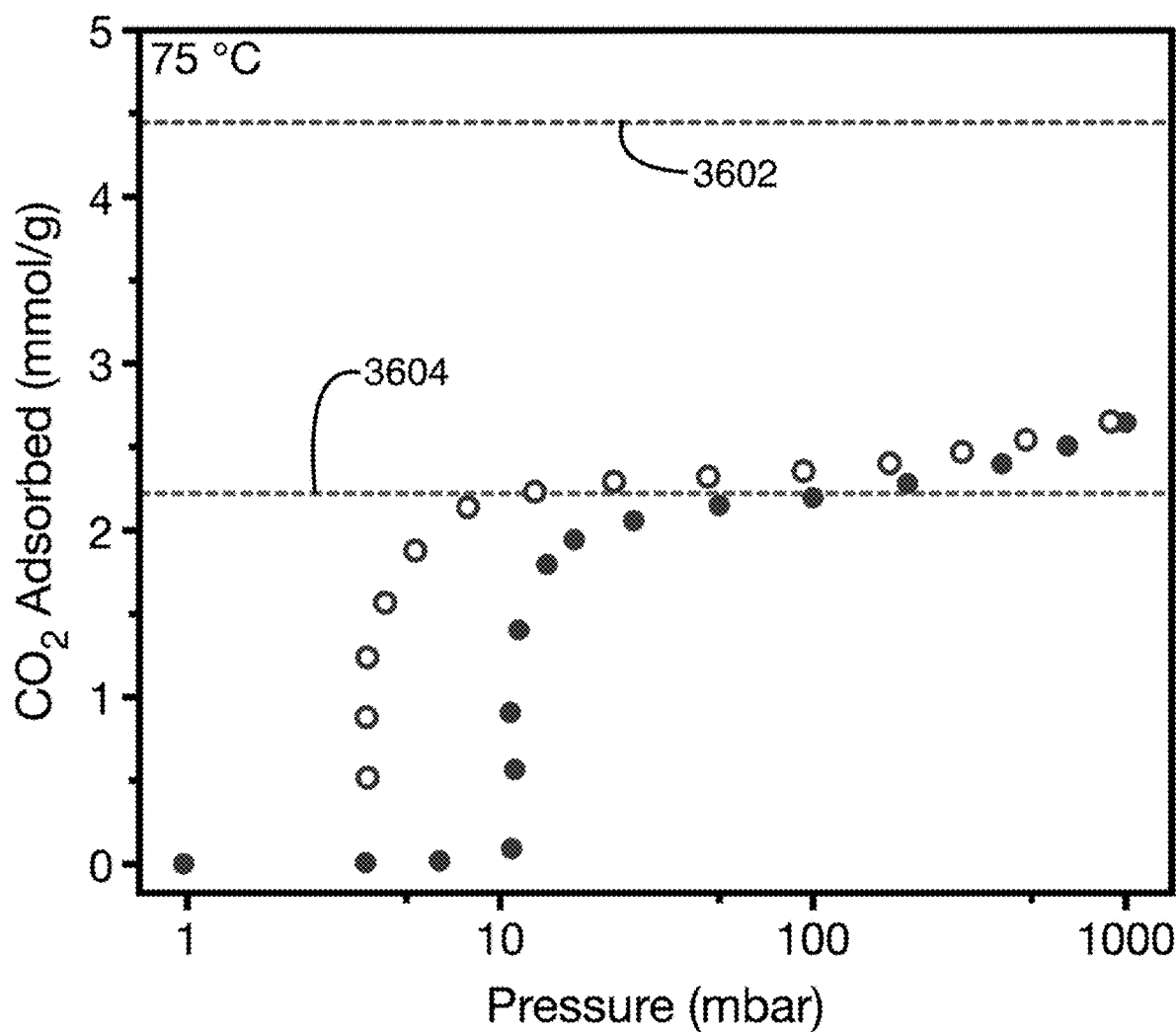
FIG. 36 illustrates the $CO_2$ adsorption (filled circles) and desorption (open circles) isotherms of EMM-53(2-2-2) (triethylenetetramine-$Mg_2$(dobpdc)) at 75° C. Lines 3602 and 3604 respectively represent the theoretical $CO_2$ uptake if each polyamine could capture (i) two $CO_2$ molecules and (ii) one $CO_2$ molecule, in accordance with an embodiment of the present disclosure.

FIG. 36 illustrates the $CO_2$ adsorption (filled circles) and desorption (open circles) isotherms of EMM-53(2-2-2) (triethylenetetramine-$Mg_2$(dobpdc)) at 75° C. Lines 3602 and 3604 represent the theoretical $CO_2$ uptake if each polyamine could capture two $CO_2$ molecules and one $CO_2$ molecule, respectively.

Figure 37:
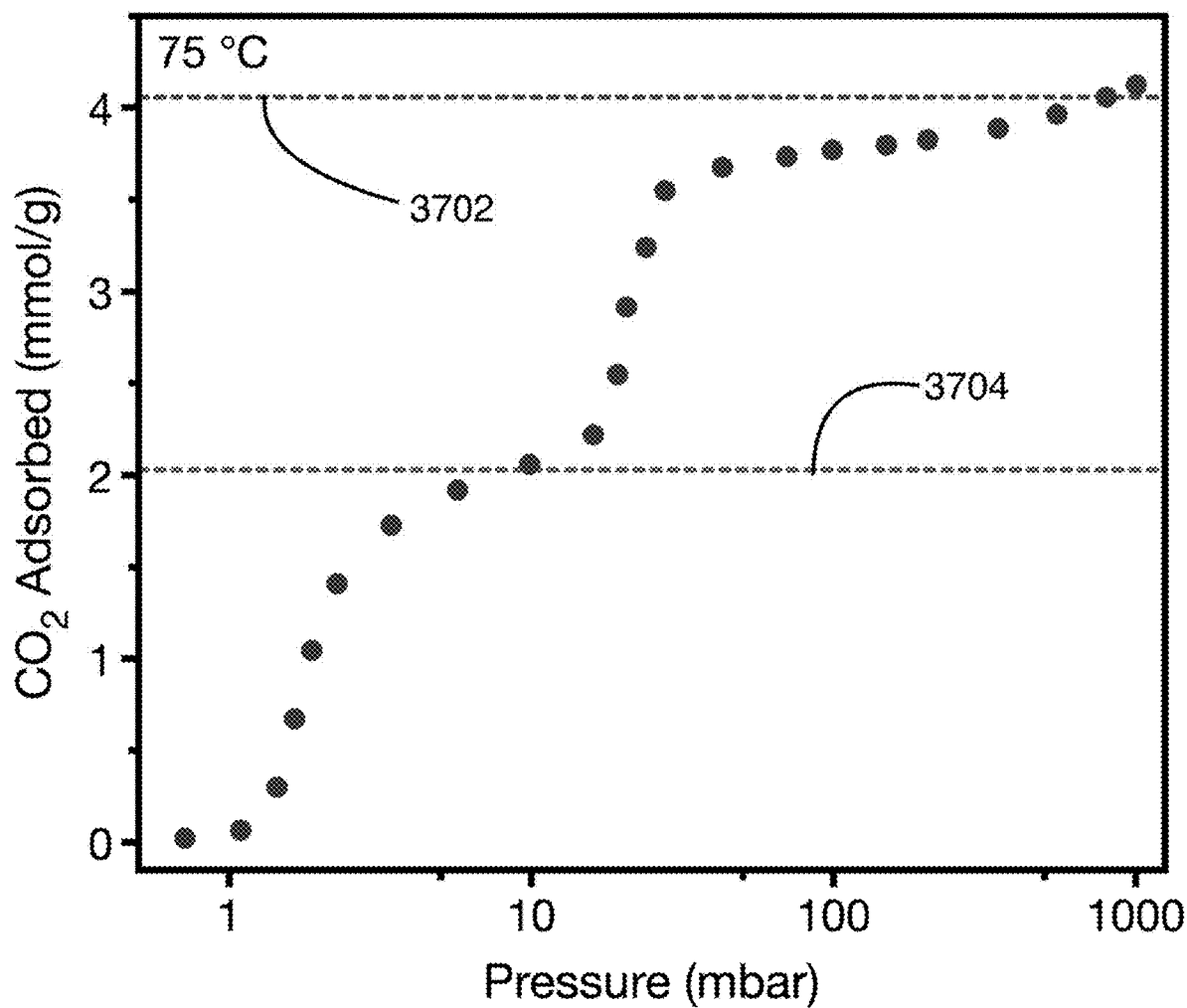
FIG. 37 illustrates the $CO_2$ adsorption isotherm of EMM-53(3-2-3) (N,N'-Bis(3-aminopropyl)-1,2-ethylenediamine-$Mg_2$(dobpdc)) at 75° C. Lines 3702 and 3704 respectively represent the theoretical $CO_2$ uptake if each polyamine could capture (i) two CO$_2$ molecules and (ii) one CO$_2$ molecule, in accordance with an embodiment of the present disclosure.

FIG. 37 illustrates the $CO_2$ adsorption isotherm of EMM-53(3-2-3) (N,N'-Bis(3-aminopropyl)-1,2-ethylenediamine-$Mg_2$(dobpdc)) at 75° C. Lines 3702 and 3704 represent the theoretical $CO_2$ uptake if each polyamine could capture two $CO_2$ molecules and one $CO_2$ molecule, respectively.

Figure 38:
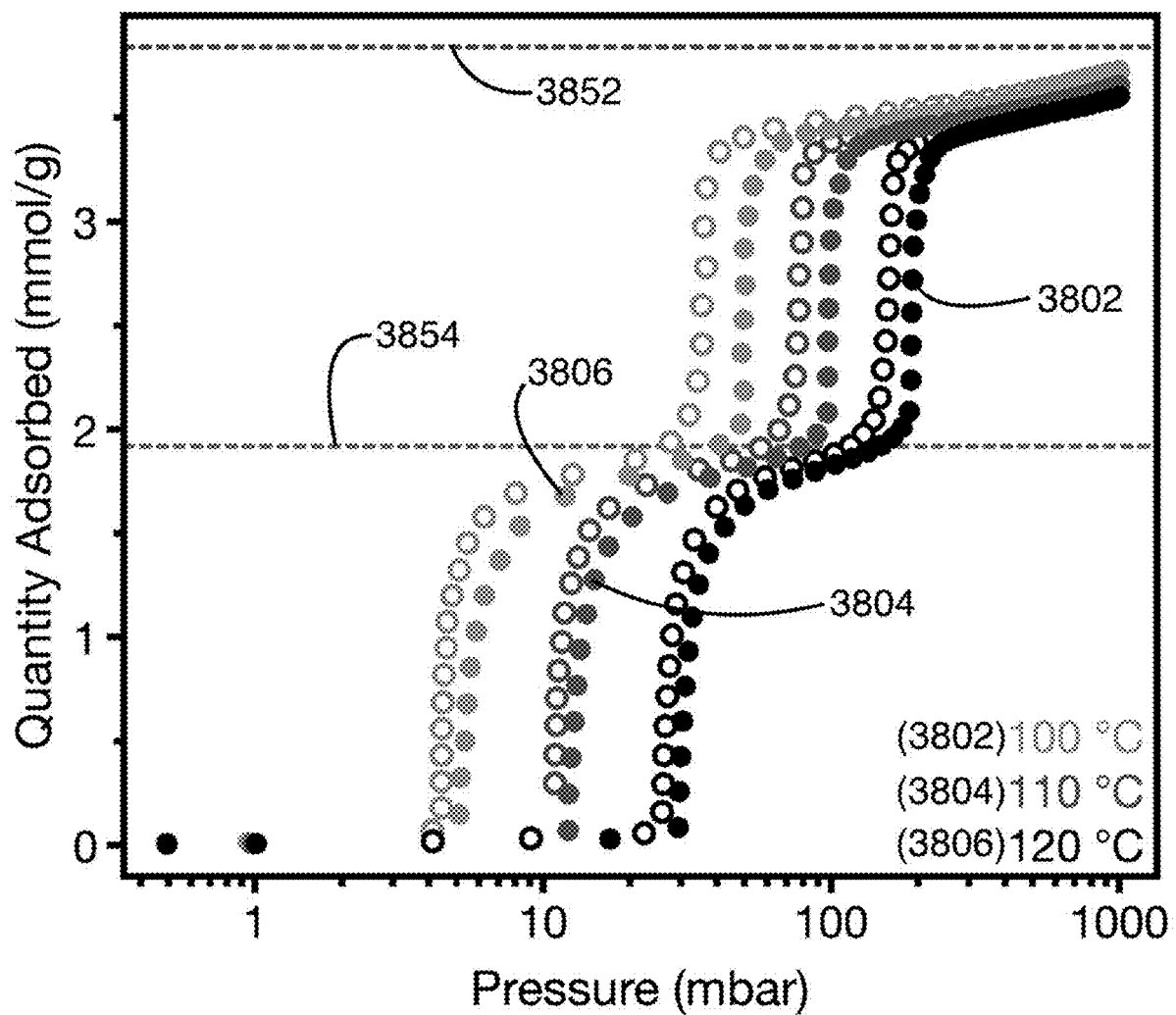
FIG. 38 illustrates the CO$_2$ adsorption (filled circles) and desorption (open circles) isotherms of EMM-53 (N,N'-Bis (3-aminopropyl)-1,4-diaminobutane-Mg$_2$(dobpdc)) at temperatures ranging from 100-120° C. Lines 3852 and 3854 respectively represent the theoretical CO$_2$ uptake if each polyamine could capture (i) two CO$_2$ molecules and (ii) one CO$_2$ molecule, in accordance with an embodiment of the present disclosure.

FIG. 38 illustrates the $CO_2$ adsorption isotherms of EMM-53 (N,N'-Bis(3-aminopropyl)-1,4-diaminobutane-$Mg_2$ (dobpdc)) at temperatures ranging from 100–120° C. Lines 3852 and 3854 represent the theoretical $CO_2$ uptake if each polyamine could capture two $CO_2$ molecules and one $CO_2$ molecule, respectively.

Figure 39:
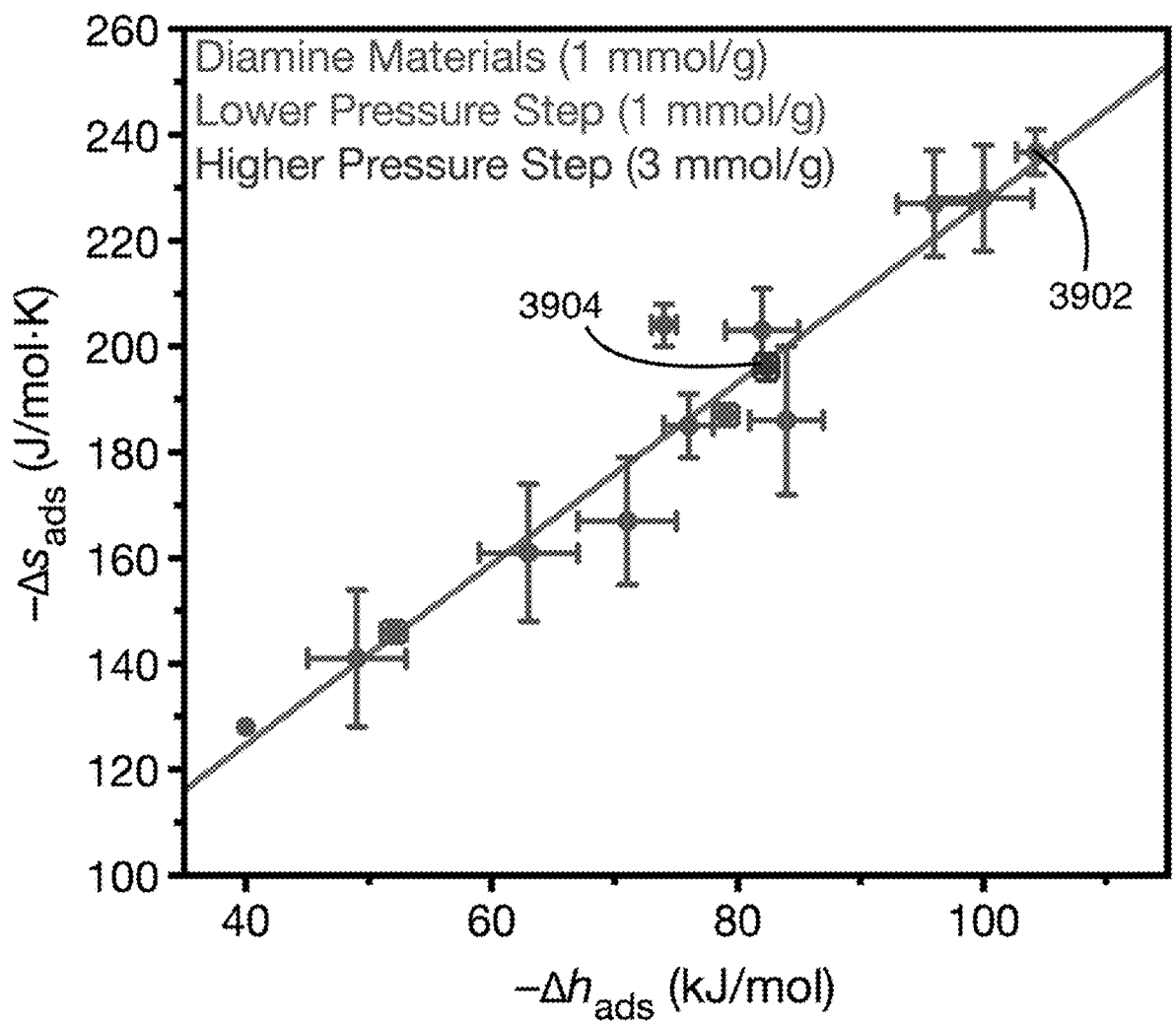
FIG. 39 illustrates the differential enthalpies and differential entropies of adsorption for EMM-53 (N,N'-Bis(3-aminopropyl)-1,4-diaminobutane-Mg$_2$(dobpdc)) for the lower pressure step, labeled 3902, and the higher pressure step, labeled 3904, on a plot of the correlation between the $-\Delta h_{ads}$ and $-\Delta s_{ads}$ for CO$_2$ adsorption in diamine-appended variants of Mg$_2$(dobpdc). See, Siegelman, 2017, J. Am. Chem. Soc. 139, p. 13541.

FIG. 39 illustrates the differential enthalpies and differential entropies of adsorption for EMM-53 (N,N'-Bis(3-aminopropyl)-1,4-diaminobutane-$Mg_2$(dobpdc)) for the lower pressure step (3902) and the higher pressure step (3094) on a plot of the correlation between the $-\Delta h_{ads}$ and $-\Delta s_{ads}$ for $CO_2$ adsorption in diamine-appended variants of $Mg_2$(dobpdc).

Figure 40A:
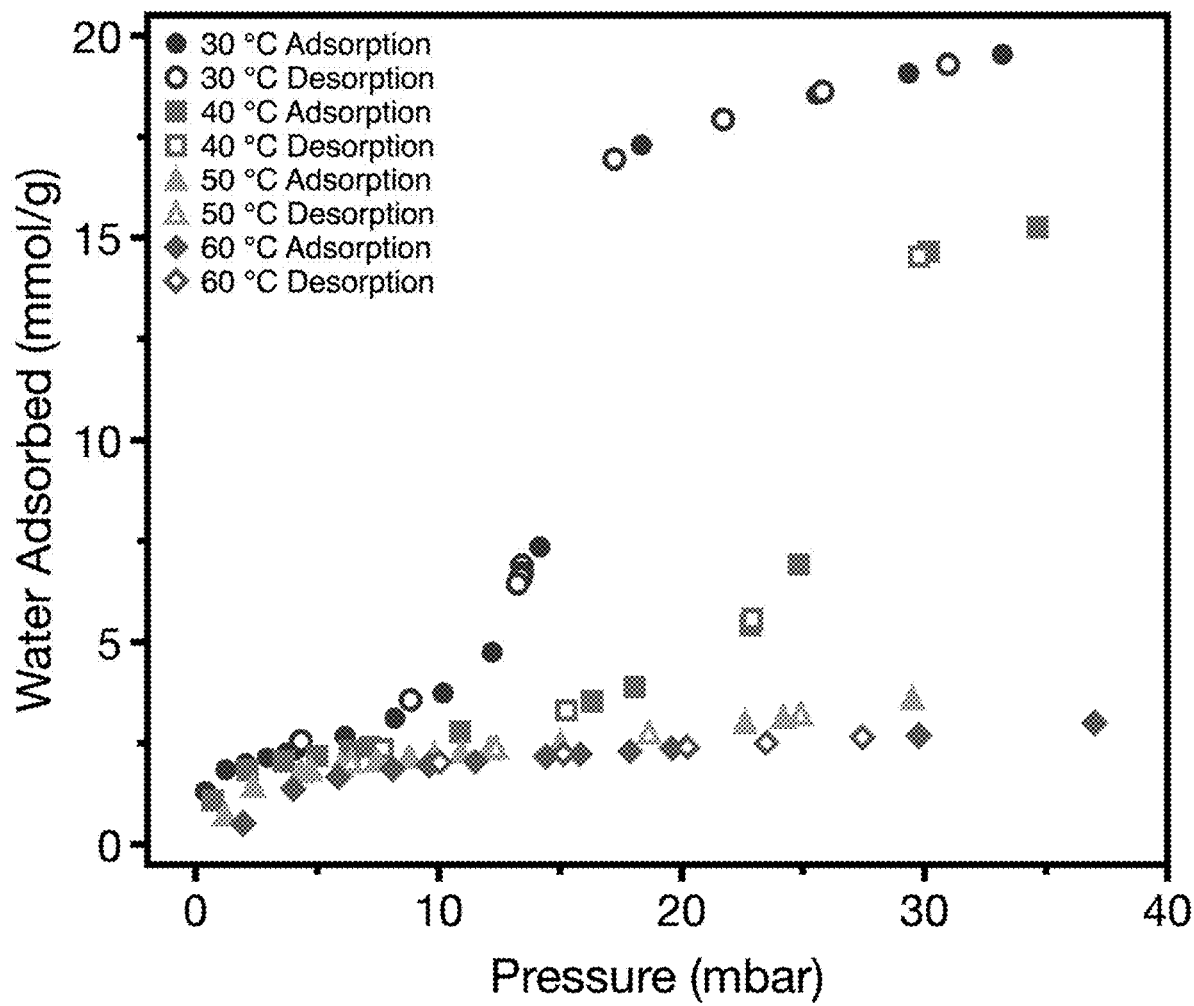
FIGS. 40A and 40B respectively illustrate the H$_2$O adsorption (filled circles) and desorption (open circles) isotherms of EMM-53 (N,N'-Bis(3-aminopropyl)-1,4-diaminobutane-Mg$_2$(dobpdc)) at temperatures ranging from 30–60° C. shown with the x-axis in absolute (Panel A) and relative (Panel B) pressure in accordance with an embodiment of the present disclosure.
Figure 40B:
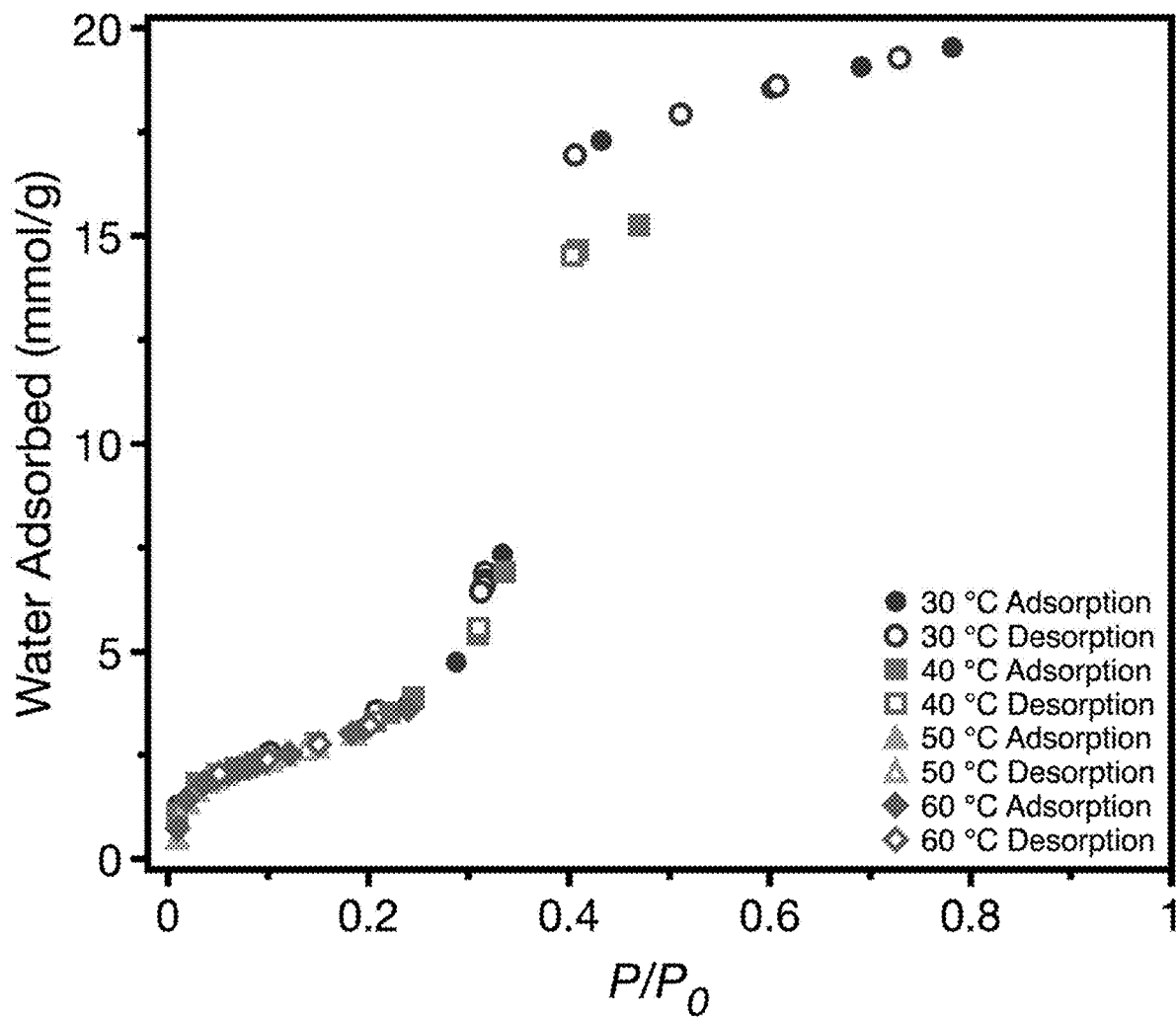

FIG. 40 illustrates the $H_2O$ adsorption (filled circles) and desorption (open circles) isotherms of EMM-53 (N,N'-Bis (3-aminopropyl)-1,4-diaminobutane-$Mg_2$(dobpdc)) at 30° C., 40° C., 50° C., and 60° C. shown with the x-axis in absolute (FIG. 40A) and relative (FIG. 40B) pressure.

Figure 41:
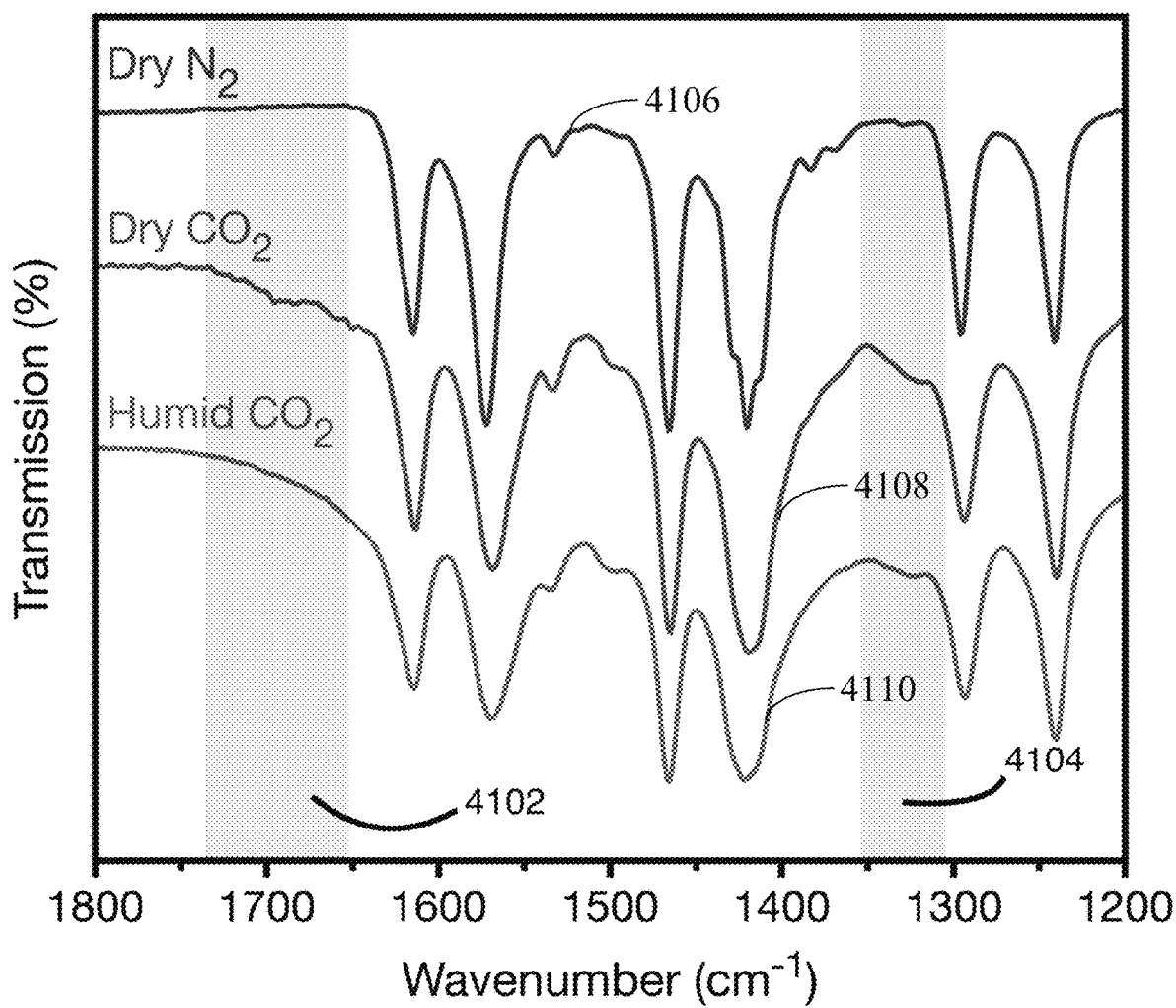
FIG. 41 illustrates the IR spectra of EMM-53(2-2-2) (triethylenetetramine-Mg$_2$(dobpdc)), under an atmosphere of dry N$_2$, dry CO$_2$, and simulated humid CO$_2$. Regions 4102 and 4104 respectively represent the diagnostic C=O (1650-1700 cm$^{-1}$) and C—N (1320-1340 cm$^{-1}$) stretches upon adsorption of CO$_2$ in accordance with an embodiment of the present disclosure.

FIG. 41 illustrates the infrared spectra of EMM-53(2-2-2) (triethylenetetramine-$Mg_2$(dobpdc)), under an atmosphere of dry $N_2$ (4106), dry $CO_2$ (4108), and simulated humid $CO_2$ (4110). The diagnostic C=O (1650-1700 $cm^{-1}$) and C—N (1320-1340 $cm^{-1}$) stretches upon adsorption of $CO_2$ are shaded in gray.

Figure 42:
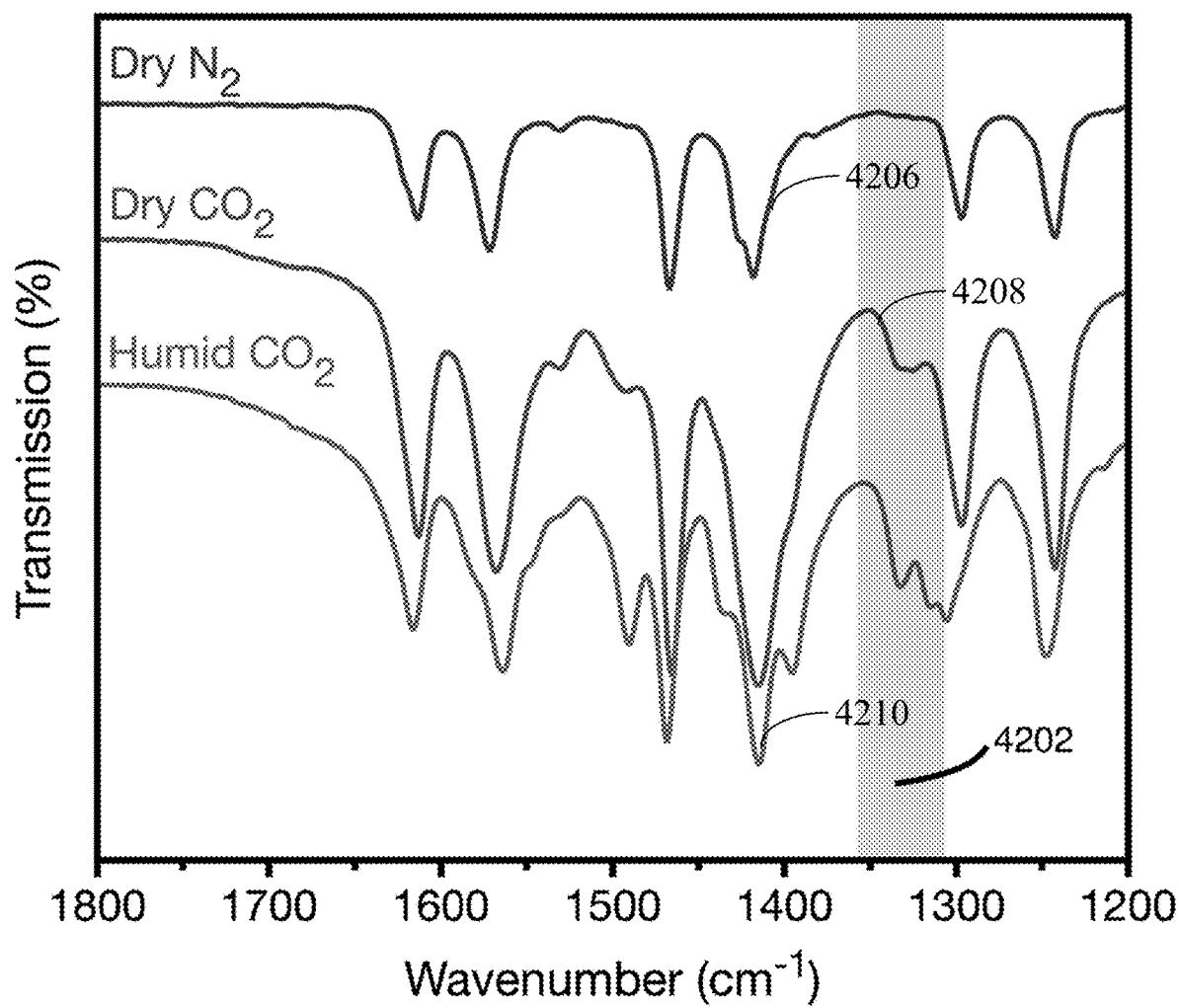
FIG. 42 illustrates the IR spectra of EMM-53 (N,N'-Bis (3-aminopropyl)-1,4-diaminobutane-Mg$_2$(dobpdc)), under an atmosphere of dry N$_2$, dry CO$_2$, and simulated humid CO$_2$. Region 4202 represents the diagnostic C—N (1320-1340 cm$^{-1}$) stretch upon adsorption of CO$_2$ in accordance with an embodiment of the present disclosure.

FIG. 42 illustrates infrared spectra of EMM-53 (N,N'-Bis (3-aminopropyl)-1,4-diaminobutane-$Mg_2$(dobpdc)), under an atmosphere of dry $N_2$ (4206), dry $CO_2$ (4208), and simulated humid $CO_2$ (4210). The diagnostic C—N (1320-1340 $cm^{-1}$) stretch upon adsorption of $CO_2$ is shaded in gray.

Figure 43:
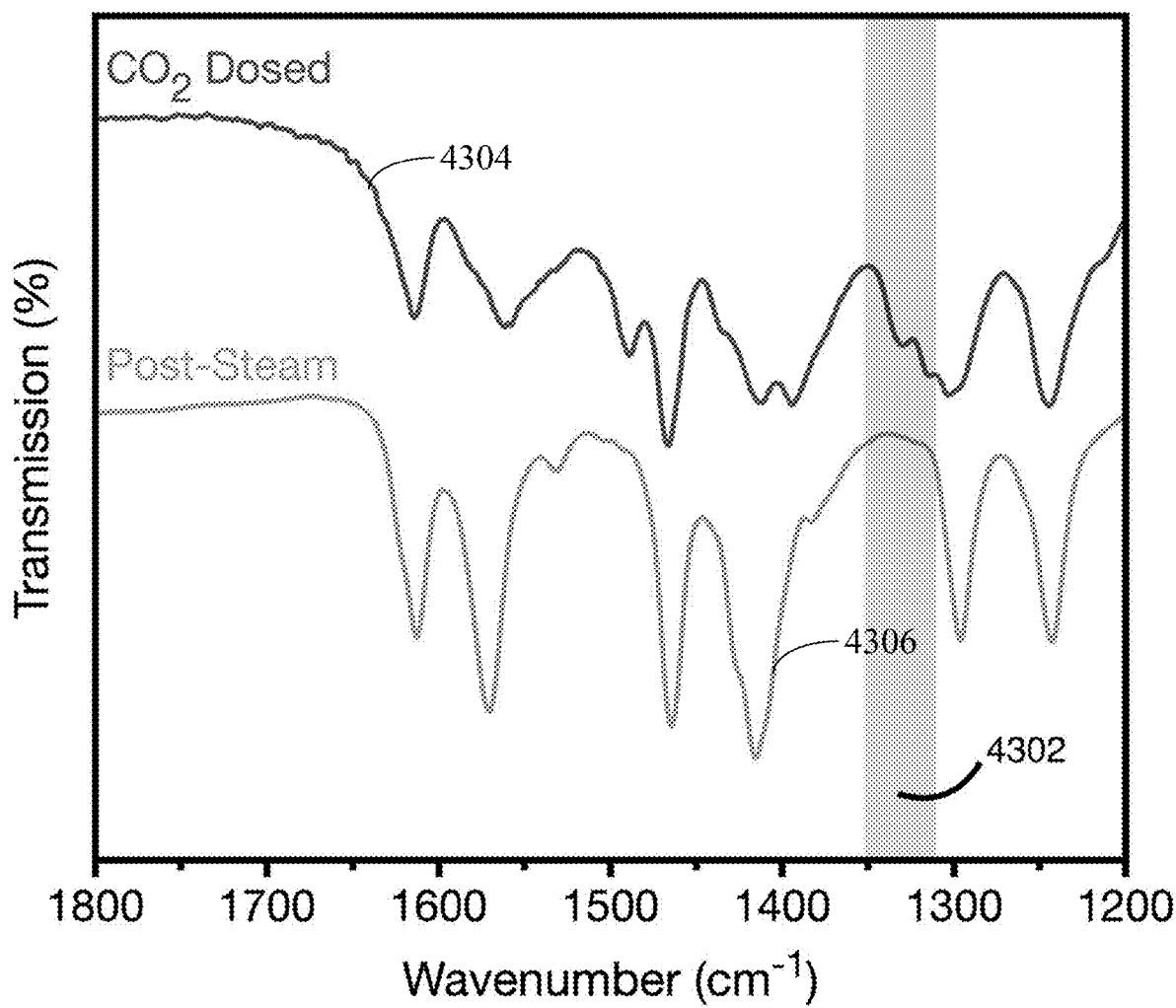
FIG. 43 illustrates the IR spectra of EMM-53 (N,N'-Bis (3-aminopropyl)-1,4-diaminobutane-Mg$_2$(dobpdc)) dosed with an atmosphere of CO$_2$ and after treatment with steam. Region 4302 represents the diagnostic C—N (1320-1340 cm$^{-1}$) stretch upon adsorption of CO$_2$.

FIG. 43 illustrates the infrared spectra of EMM-53 (N,N'-Bis(3-aminopropyl)-1,4-diaminobutane-$Mg_2$(dobpdc)) dosed with an atmosphere of $CO_2$ (4304) and after treatment with steam (4306). The diagnostic C—N (1320-1340 $cm^{-1}$) stretch upon adsorption of $CO_2$ is shaded in gray (4302).

Figure 44:
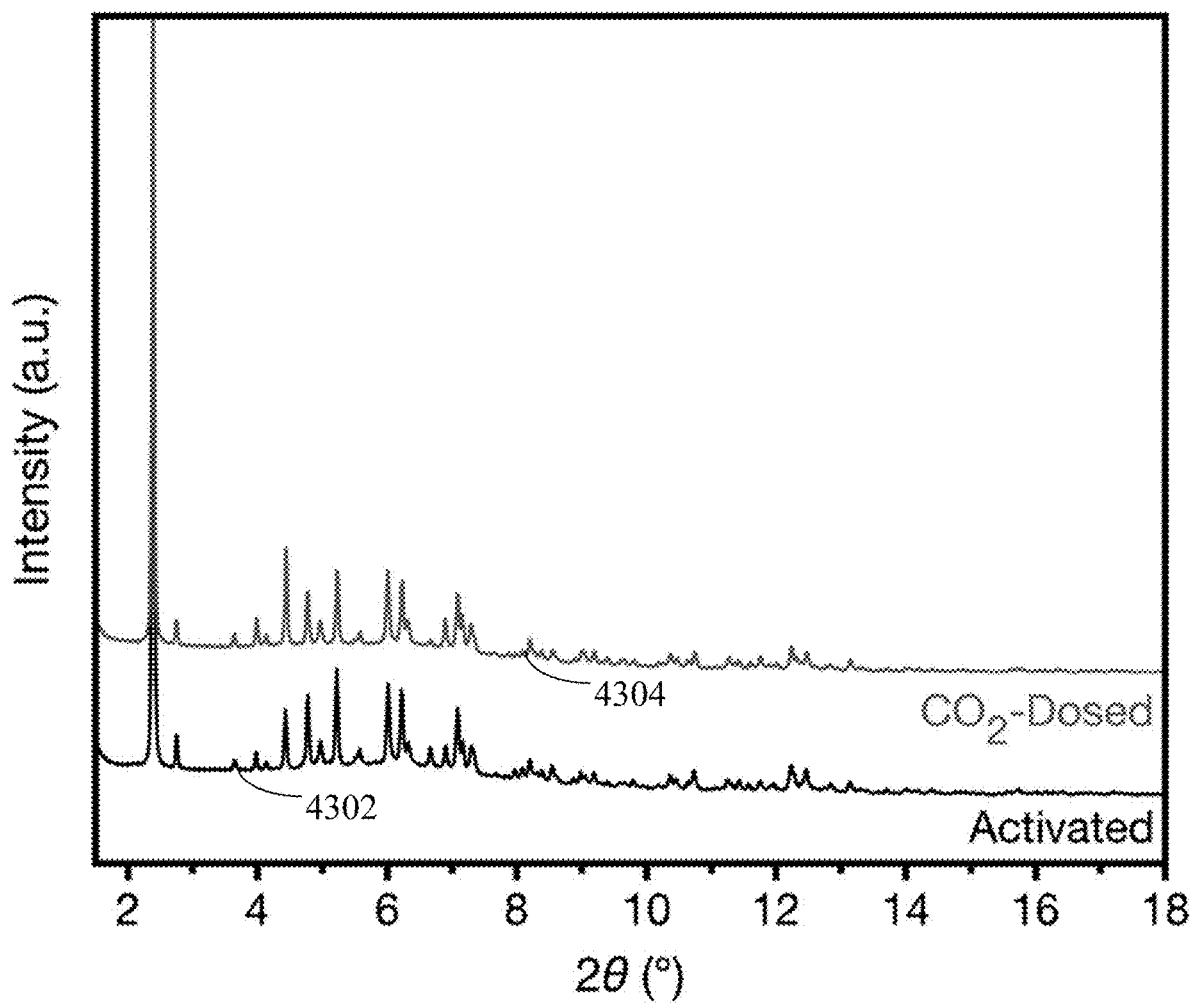
FIG. 44 illustrates the powder X-ray diffraction patterns ($\lambda$=0.45236 Å) at 300 K for EMM-53 (N,N'-Bis(3-aminopropyl)-1,4-diaminobutane-Mg$_2$(dobpdc)) evacuated and dosed with 1 bar of CO$_2$.

FIG. 44 illustrates the powder x-ray diffraction patterns ($\lambda$=0.45236 Å) at 300 K for EMM-53 (N,N'-Bis(3-aminopropyl)-1,4-diaminobutane-$Mg_2$(dobpdc)) evacuated (4302) and dosed with 1 bar of $CO_2$ (4304).

Figure 45:
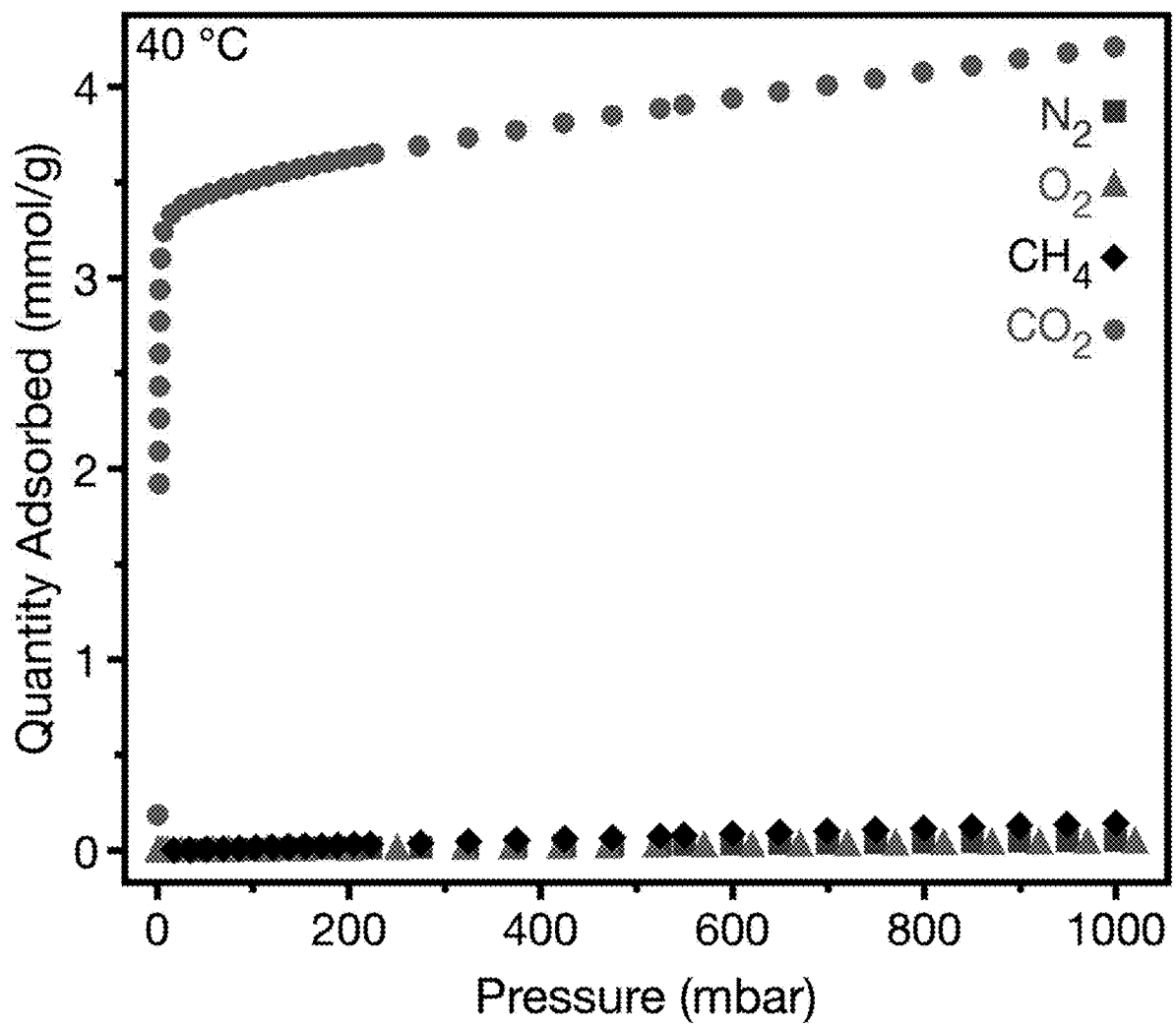
FIG. 45 illustrates the CO$_2$ CH$_4$, O$_2$, and N$_2$ adsorption isotherms of EMM-53 (N,N'-Bis(3-aminopropyl)-1,4-diaminobutane-Mg$_2$(dobpdc)) at 40° C. in accordance with an embodiment of the present disclosure. The selectivity for CO$_2$ over the other gases is illustrated.

FIG. 45 illustrates the $CO_2$, $CH_4$, $O_2$, and $N_2$ adsorption isotherms of EMM-53 (N,N'-Bis(3-aminopropyl)-1,4-diaminobutane-$Mg_2$(dobpdc)) at 40° C. The selectivity for $CO_2$ over the other gases is further illustrated. As illustrated in FIG. 45, EMM-53 adsorbs more than 3 mmol/g $CO_2$ at $CO_2$ pressures greater than 100 mbar and less than 0.25 mmol/g $N_2$ at $N_2$ pressures between 100 mbar and 1000 mbar, less than 0.25 mmol/g $O_2$ at $O_2$ pressures between 100 mbar and 1000 mbar, and less than 0.25 mmol/g $CH_4$ at $CH_4$ pressures between 100 mbar and 1000 mbar at 40° C.

Figure 46:
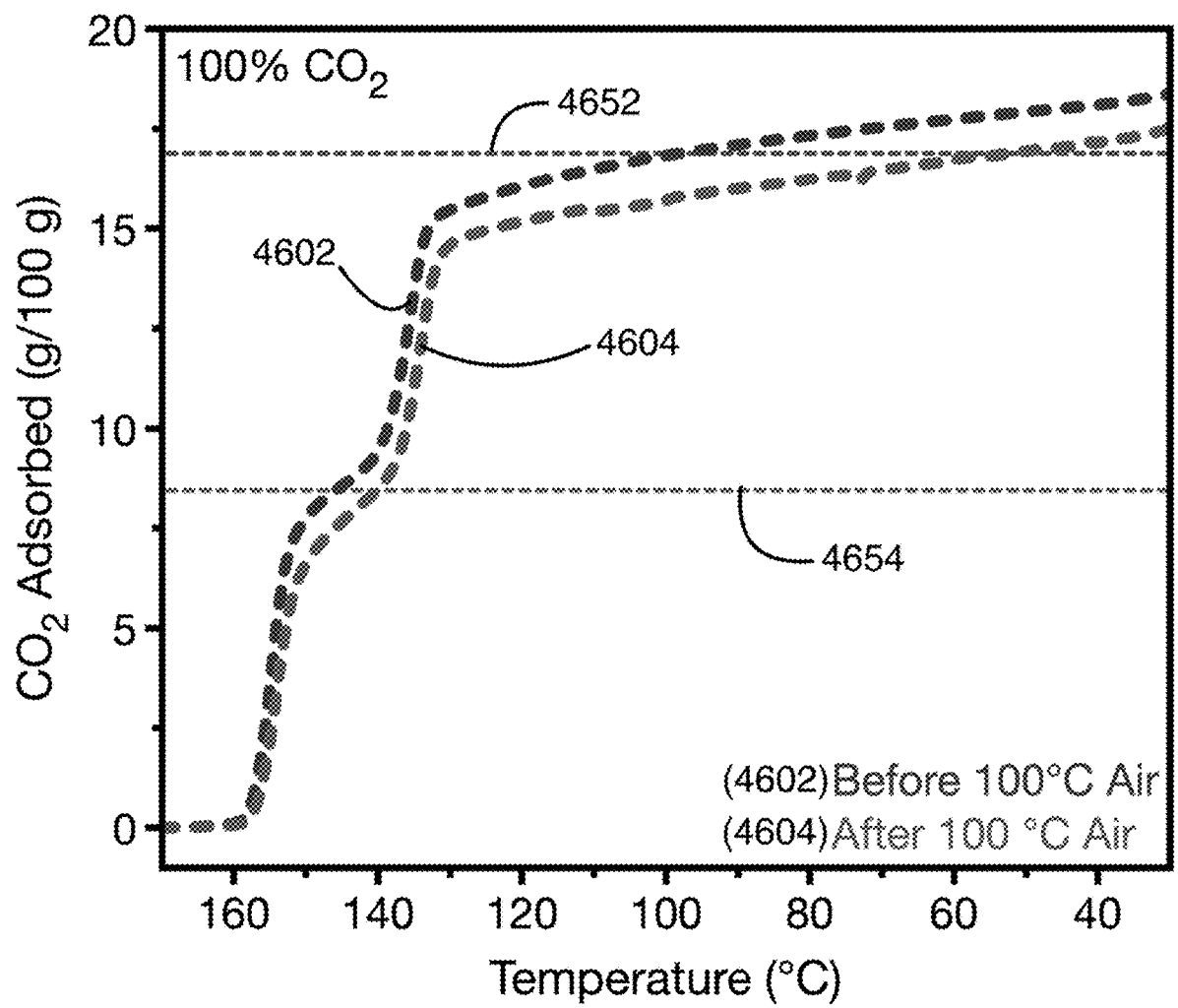
FIG. 46 illustrates the adsorption isobars for EMM-53 (N,N'-Bis(3-aminopropyl)-1,4-diaminobutane-Mg$_2$ (dobpdc)) taken before and after treatment under flowing air at 100° C. for 12 hours in accordance with an embodiment of the present disclosure. Lines 4652 and 4654 respectively represent the theoretical CO$_2$ uptake if each polyamine could capture (i) two CO$_2$ molecules and (ii) one CO$_2$ molecule, in accordance with an embodiment of the present disclosure.

FIG. 46 illustrates adsorption isobars for EMM-53 (N,N'-Bis(3-aminopropyl)-1,4-diaminobutane-$Mg_2$(dobpdc)) taken before (4602) and after (4604) treatment under flowing air at 100° C. for 12 hours. Lines 4652 and 4654 represent the theoretical $CO_2$ uptake if each polyamine could capture two $CO_2$ molecules and one $CO_2$ molecule, respectively.

Figure 47:
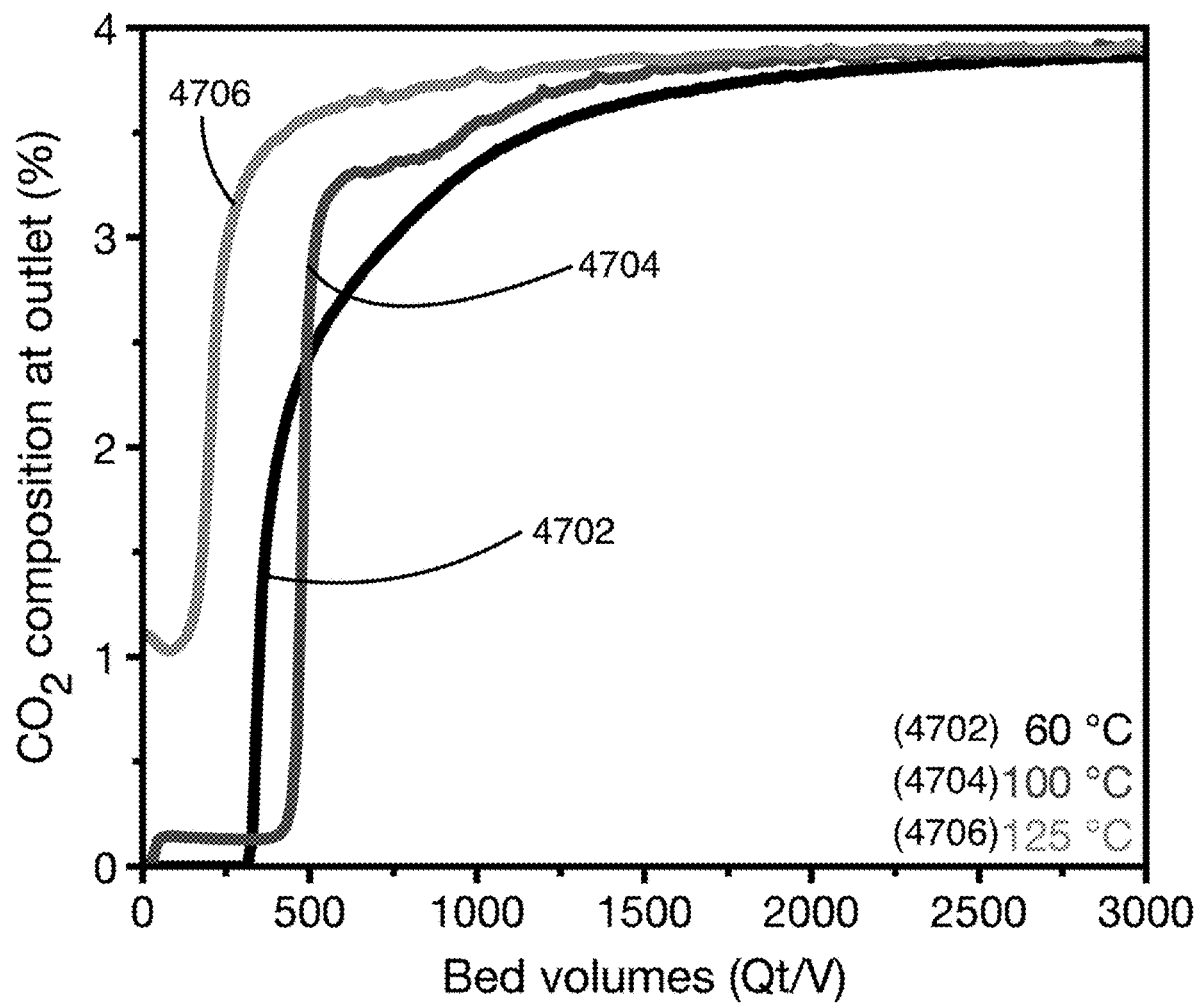
FIG. 47 illustrates the CO$_2$ breakthrough profiles for EMM-53 (N,N'-Bis(3-aminopropyl)-1,4-diaminobutane-Mg$_2$(dobpdc)) under 30 sccm of dry, simulated natural gas flue gas (4% CO$_2$ in N$_2$) at ~1 bar and an external column temperature ranging from 60-125° C. in accordance with an embodiment of the present disclosure.

FIG. 47 illustrates the $CO_2$ breakthrough profiles for EMM-53 (N,N'-Bis(3-aminopropyl)-1,4-diaminobutane-$Mg_2$(dobpdc)) under 30 sccm of dry, simulated natural gas flue gas (4% $CO_2$ in $N_2$) at ~1 bar and an external column temperature ranging from 60–125° C. (lines 4702, 4704, and 4706).

CONCLUSION

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

We claim:
1. An activated adsorption material, comprising:
   a metal-organic framework comprising a plurality of metal cations and a plurality of polytopic organic linkers; and
   a plurality of polyamine ligands, wherein
   each respective polyamine ligand in the plurality of polyamine ligands comprises:

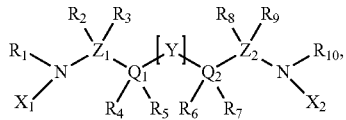

$X_1$ and $X_2$ are respective first and second metal cations in the plurality of metal cations,
   Y is:

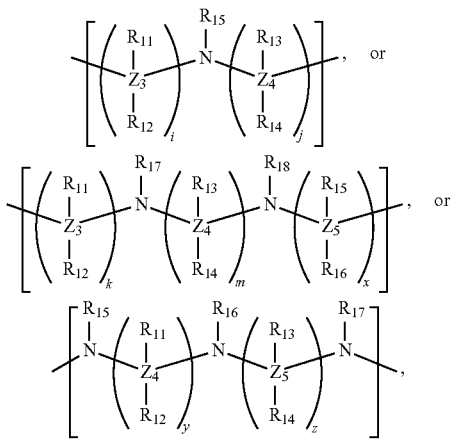

$Z_1$, $Z_2$, $Z_3$, $Z_4$, $Z_5$, $Q_1$ and $Q_2$ are each independently carbon, silicon, germanium, sulfur, or selenium,
   i, j, k, x, y, and z are each independently 0, 1, or 2,
   m is 2, 3, or 4, and
   each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted arlyoxy, or substituted or unsubstituted heteroaryloxy, wherein at least twenty percent of the polyamine ligands in the plurality of polyamine ligands are (i) amine appended by a first amine to a first metal cation in the plurality of metal cations and (ii) amine appended by a second amine to a second cation in the plurality of metal cations of the metal-organic framework.

2. The activated adsorption material of claim 1, wherein at least eighty percent of the polyamine ligands in the plurality of polyamine ligands are (i) amine appended by a first amine to a first metal cation in the plurality of metal cations and (ii) amine appended by a second amine to a second metal cation in the plurality of metal cations of the metal-organic framework.

3. The activated adsorption material of claim 1, wherein each metal cation in the plurality of metal cations is Mg, Ca, Cr, Mn, Fe, Co, Ni, Cu, or Zn.

4. The activated adsorption material of claim 1, wherein Y is:

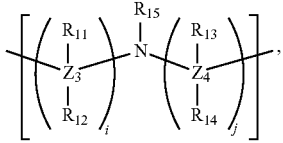

and
wherein,
   i and j are each zero,
   i is 1 and j is zero,
   i is 1 and j is 1, or
   i is 1 and j is 2.

5. The activated adsorption material of claim 1, wherein Y is:

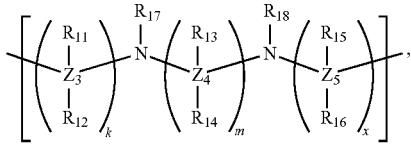

k and x are zero, and
m is 2.

6. The activated adsorption material of claim 1, wherein Y is:

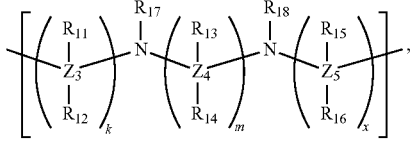

k and x are each 1, and
m is 3 or 4.

7. The activated adsorption material of claim 1, wherein Y is:

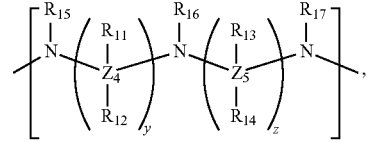

and
y and z are each two.

8. The activated adsorption material of claim 1, wherein $Z_1$, $Z_2$, $Z_3$, $Z_4$, $Z_5$, $Q_1$ and $Q_2$ are each independently carbon.

9. The activated adsorption material of claim 1, wherein each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is independently H, halogen, substituted or unsubstituted n-alkyl or a substituted or unsubstituted branched-chain alkyl.

10. The activated adsorption material of claim 9, wherein each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ is H.

11. The activated adsorption material of claim 1, wherein each metal ion (X) in the plurality of metal ions is Mg.

12. The activated adsorption material of claim 1, wherein the polytopic organic linker is
4,4'-dioxidobiphenyl-3,3'-dicarboxylate (dobpdc$^{4-}$),
4,4"-dioxido-[1,1':4',1"-terphenyl]-3,3"-dicarboxylate (dotpdc$^{4-}$),
2,5-dioxidobenzene-1,4-dicarboxylate (dobdc$^{4-}$), or
3,3' dioxide-biphenyl-4,4'-dicarboxylate (para-carboxylate-dobpdc$^{4-}$).

13. The activated adsorption material of claim 1, wherein each polyamine ligand in the plurality of polyamine ligands is:
diethylenetriamine,
N-(2-aminoethyl)-1,3-propanediamine,
bis(3-aminopropyl)amine,
N-(3-Aminopropyl)-1,4-diaminobutane,
triethylenetetramine,
N,N'-bis(2-aminoethyl)-1,3-propanediamine,
1,2-bis(3-aminopropylamino)ethane,
N,N'-bis(3-aminopropyl)-1,3-propanediamine,
N,N'-bis(3-aminopropyl)-1,4-diaminobutane, or
tetraethylenepentamine.

14. The activated adsorption material of claim 1, wherein the loading of the plurality of polyamine ligands to the metal-organic framework is between 80 percent and 120 percent.

15. The activated adsorption material of claim 1, wherein the adsorption material exhibits a step-shaped $CO_2$ adsorption profile or desorption profile.

16. The activated adsorption material of claim 1, wherein the adsorption material exhibits a single or multiple-step-shaped $CO_2$ adsorption or desorption profile.

17. The activated adsorption material of claim 1, wherein the adsorption material exhibits a $CO_2$ adsorption profile that includes a $CO_2$ adsorption step above 140° C.

18. The activated adsorption material of claim 1, wherein the polytopic organic linker has the formula:

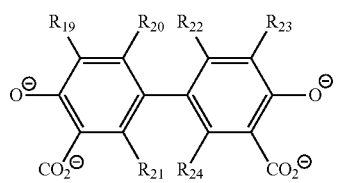

wherein,
$R_{19}, R_{20}, R_{21}, R_{22}, R_{23}$, and $R_{24}$ are each independently selected from H, halogen, hydroxyl, methyl, and halogen substituted methyl.

19. The activated adsorption material of claim 1, wherein the polytopic organic linker has the formula:

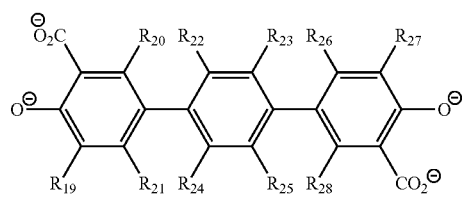

wherein $R_{19}, R_{20}, R_{21}, R_{22}, R_{23}, R_{24}, R_{25}, R_{26}, R_{27}$ and $R_{28}$ are each independently selected from H, halogen, hydroxyl, methyl, and halogen substituted methyl.

20. The activated adsorption material of claim 1, wherein the polytopic organic linker has the formula:

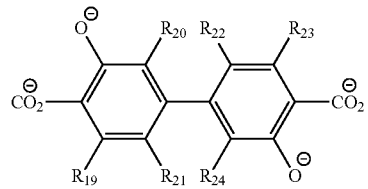

wherein,
$R_{19}, R_{20}, R_{21}, R_{22}, R_{23}$, and $R_{24}$ are each independently selected from H, halogen, hydroxyl, methyl, and halogen substituted methyl.

21. The activated adsorption material of claim 1, wherein the polytopic organic linker has the formula:

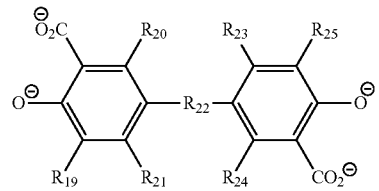

wherein,
$R_{19}, R_{20}, R_{21}, R_{23}, R_{24}$, and $R_{25}$, are each independently selected from H, halogen, hydroxyl, methyl, and halogen substituted methyl, and
$R_{22}$ is selected from substituted or unsubstituted aryl, and substituted or unsubstituted heteroaryl.

22. The activated adsorption material of claim 1, wherein the polytopic organic linker has the formula:

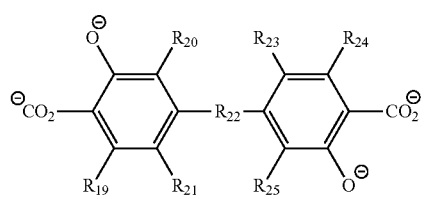

wherein,
$R_{19}, R_{20}, R_{21}, R_{23}, R_{24}$, and $R_{25}$ are each independently selected from H, halogen, hydroxyl, methyl, and halogen substituted methyl, and
$R_{22}$ is selected from substituted or unsubstituted aryl, and substituted or unsubstituted heteroaryl.

23. The activated adsorption material of claim 1, wherein the adsorption material has a polyamine ligand: metal-organic framework metal cation loading ratio of 0.9 or less to 1.5.

24. The activated adsorption material of claim 1, wherein the adsorption material adsorbs more than 3 mmol/g $CO_2$ at $CO_2$ pressures greater than 100 mbar and less than 0.25 mmol/g $N_2$ at $N_2$ pressures between 100 mbar and 1000 mbar at 40° C.

25. The activated adsorption material of claim 1, wherein the adsorption material adsorbs more than 3 mmol/g $CO_2$ at $CO_2$ pressures greater than 100 mbar and less than 0.25 mmol/g $O_2$ at $O_2$ pressures between 100 mbar and 1000 mbar at 40° C.

26. The activated adsorption material of claim 1, wherein the adsorption material adsorbs more than 3 mmol/g $CO_2$ at $CO_2$ pressures greater than 100 mbar and less than 0.25 mmol/g $CH_4$ at $CH_4$ pressures between 100 mbar and 1000 mbar at 40° C.

27. A method for abating $CO_2$ from a flue gas, the method comprising:
(a) contacting the flue gas with the activated adsorption material of claim 1 to reversibly adsorb $CO_2$ from the flue gas thereby generating an adsorption material enriched for $CO_2$; and
(b) stripping a major portion of the $CO_2$ from the adsorption material enriched for $CO_2$ using a regeneration process.

28. The method of claim 27, wherein the regeneration process comprises a temperature swing adsorption method, a vacuum swing adsorption method, a pressure swing adsorption method, a concentration swing adsorption method, or a combination thereof.

29. The method of claim 27, wherein the regeneration process comprises applying steam to the adsorption material enriched for $CO_2$ thereby resulting in the desorption of the bound $CO_2$ for the reuse of the adsorption material.

30. A method for removing $CO_2$ from a biogas, natural gas, or landfill gas, the method comprising contacting the biogas, natural gas, or landfill gas with the activated adsorption material of claim 1 to reversibly adsorb $CO_2$ from the biogas thereby generating an adsorption material enriched for $CO_2$ and a residual gas that is greater than 98 percent pure methane.

31. The method of claim 30, the method further comprising stripping a major portion of the $CO_2$ from the adsorption material enriched for $CO_2$ using a regeneration process.

32. The method of claim 31, wherein the regeneration process comprises applying steam to the activated adsorption material enriched for $CO_2$ resulting in the desorption of the bound $CO_2$ for the reuse of the adsorption material.

33. The method of claim 31, wherein the regeneration process is a temperature swing adsorption method, vacuum swing adsorption method, a pressure swing adsorption method, a concentration swing adsorption method, or a combination thereof.

34. A method of separating carbon dioxide from a gas produced by a source, comprising exposing the carbon dioxide within the gas to the activated adsorption material of claim 1 whereby the carbon dioxide is reversibly separated into the adsorption material.

35. The method of claim 34, wherein the carbon dioxide is reversibly separated from the activated adsorption material by a regeneration process comprising applying steam to the activated adsorption material resulting in the desorption of the bound $CO_2$ for the reuse of the adsorption material.

36. The method of claim 34, wherein the carbon dioxide is reversibly separated from the activated adsorption material by a regeneration process.

37. The method of claim 34, wherein the regeneration process is a temperature swing adsorption method, vacuum swing adsorption method, a pressure swing adsorption method, a concentration swing adsorption method, or a combination thereof.

38. A method of synthesizing an activated adsorption material, the method comprising:
(A) grafting a plurality of polyamine ligands onto a metal-organic framework, wherein the metal-organic framework comprises a plurality of metal cations and a plurality of polytopic organic linkers, wherein the grafting comprises exposing an amount of the metal-organic framework to a solution comprising the polyamine ligand diluted with a solvent thereby forming unactivated adsorption material, wherein each polyamine ligand is:

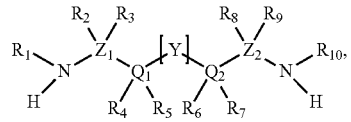

and
wherein,
Y is:

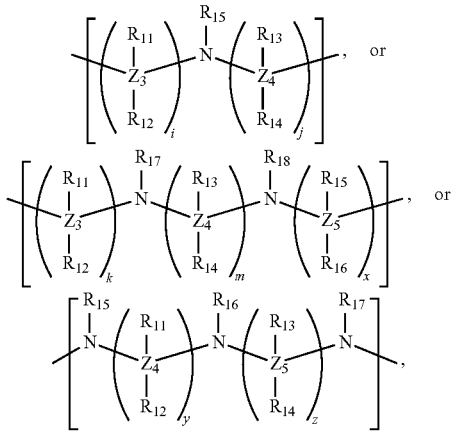

$Z_1$, $Z_2$, $Z_3$, $Z_4$, $Z_5$, $Q_1$ and $Q_2$ are each independently carbon, silicon, germanium, sulfur, or selenium,
i, j, k, x, y, and z are each independently 0, 1, or 2,
m is 2, 3, or 4, and
each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$ and $R_{18}$ is independently H, halogen, substituted or unsubstituted alkyl, substituted or unsubstituted heteroalkyl, substituted or unsubstituted aryl, substituted or unsubstituted heteroaryl, substituted or unsubstituted heterocycloalkyl, substituted or unsubstituted alkoxy, substituted or unsubstituted arlyoxy, or substituted or unsubstituted heteroaryloxy; and
(B) subjecting the unactivated adsorption material to an inert environment at a temperature of at least 165° C. for at least four hours thereby activating the adsorption material, wherein at least twenty percent of the polyamine ligands in the plurality of polyamine ligands in the activated adsorption material are (i) amine appended by a first amine to a first metal cation in the plurality of metal cations and (ii) amine appended by a second amine to a second cation in the plurality of metal cations of the metal-organic framework.

39. The method of claim 38, wherein the solvent is toluene, water, methanol, dichloromethane, tetrahydrofuran, cyclohexane, pentane, 2-butanone, trichloroethylene, methyl-t-butyl ether, heptane, diethyl ether, or a mixture thereof.

40. The method of claim 38, wherein the inert environment is a stream of argon gas, $N_2$ gas, or a combination thereof, blown on the unactivated adsorption material.

41. The method of claim 38, wherein the activated adsorption material has a polyamine ligand loading of 110 percent or less.

42. The method of claim 38, wherein the temperature is at least 190° C.

43. The method of claim 38, wherein each metal cation in the plurality of metal cations is independently Mg, Ca, Mn, Cr, Fe, Co, Ni, Cu, or Zn.

44. The method of claim 38, wherein Y is:

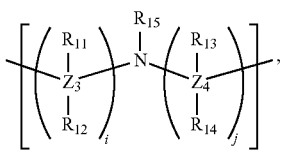

and
wherein,
i and j are each zero,
i is 1 and j is zero,
i is 1 and j is 1, or
i is 1 and j is 2.

45. The method of claim 38, wherein Y is:

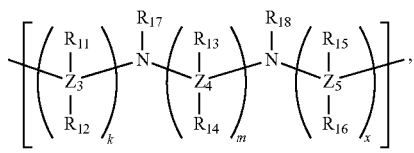

and
wherein,
k and x are zero, and
m is two or three.

46. The method of claim 38, wherein Y is:

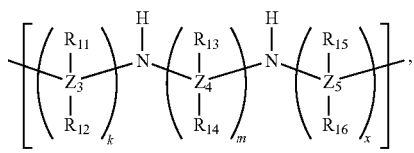

k and x are each one, and
m is two, three, or four.

47. The method of claim 38, wherein Y is:

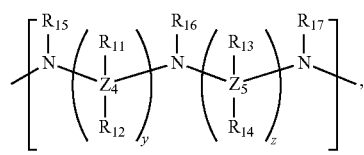

and
y and z are each two.

48. The method of claim 38, wherein $Z_1$, $Z_2$, $Z_3$, $Z_4$, $Z_5$, $Q_1$ and $Q_2$ are each independently carbon.

49. The method of claim 38, wherein each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is independently H, halogen, substituted or unsubstituted n-alkyl or a substituted or unsubstituted branched-chain alkyl.

50. The method of claim 49, wherein each instance of each $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, and $R_{18}$ is H.

51. The method of claim 38, wherein each metal ion (X) in the plurality of metal ions is Mg.

52. The method of claim 38, wherein the polytopic organic linker is
4,4'-dioxidobiphenyl-3,3'-dicarboxylate (dobpdc$^{4-}$),
4,4''-dioxido-[1,1':4',1''-terphenyl]-3,3''-dicarboxylate (dotpdc$^{4-}$),
2,5-dioxidobenzene-1,4-dicarboxylate (dobdc$^{4-}$), or
3,3' dioxide-biphenyl-4,4'-dicarboxylate (para-carboxylate-dobpdc$^{4-}$).

53. The method of claim 38, wherein each polyamine ligand in the plurality of polyamine ligands is:
diethylenetriamine,
N-(2-aminoethyl)-1,3-propanediamine,
bis(3-aminopropyl)amine,
N-(3-Aminopropyl)-1,4-diaminobutane,
triethylenetetramine,
N,N'-bis(2-aminoethyl)-1,3-propanediamine,
1,2-bis(3-aminopropylamino)ethane,
N,N'-bis(3-aminopropyl)-1,3-propanediamine,
N,N'-bis(3-aminopropyl)-1,4-diaminobutane, or
tetraethylenepentamine.

54. The method of claim 38, wherein the activated adsorption material exhibits a step-shaped $CO_2$ adsorption profile or desorption profile.

55. The method of claim 38, wherein the activated adsorption material exhibits a single- or multiple-step-shaped $CO_2$ adsorption profile or desorption profile.

56. The method of claim 38, wherein the activated adsorption material exhibits a $CO_2$ adsorption profile that includes a $CO_2$ adsorption step above 140° C.

57. The method of claim 38, wherein the polytopic organic linker has the formula:

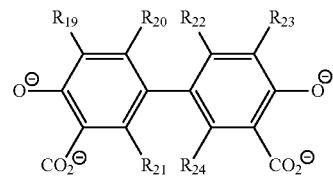

wherein,
$R_{19}$, $R_{20}$, $R_{21}$, $R_{22}$, $R_{23}$, and $R_{24}$, are each independently selected from H, halogen, hydroxyl, methyl, and halogen substituted methyl.

58. The method of claim 38, wherein the polytopic organic linker has the formula:

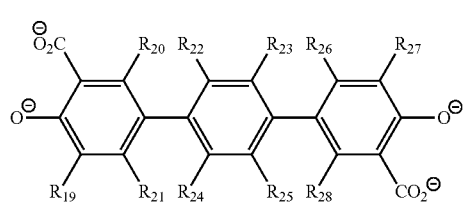

wherein $R_{19}$, $R_{20}$, $R_{21}$, $R_{22}$, $R_{23}$, $R_{24}$, $R_{25}$, $R_{26}$, $R_{27}$, and $R_{28}$, are each independently selected from H, halogen, hydroxyl, methyl, and halogen substituted methyl.

59. The method of claim 38, wherein the polytopic organic linker has the formula:

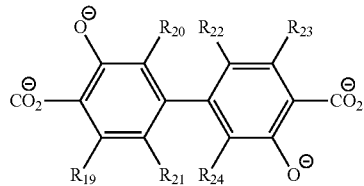

wherein, $R_{19}$, $R_{20}$, $R_{21}$, $R_{22}$, $R_{23}$, and $R_{24}$ are each independently selected from H, halogen, hydroxyl, methyl, and halogen substituted methyl.

60. The method of claim 38, wherein the polytopic organic linker has the formula:

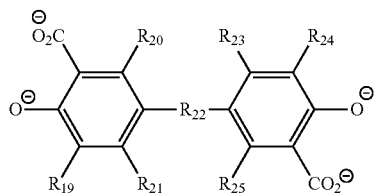

wherein,
$R_{19}$, $R_{20}$, $R_{21}$, $R_{23}$, $R_{24}$, and $R_{25}$ are each independently selected from H, halogen, hydroxyl, methyl, and halogen substituted methyl, and
$R_{22}$ is selected from substituted or unsubstituted aryl, and substituted or unsubstituted heteroaryl.

61. The method of claim 38, wherein the polytopic organic linker has the formula:

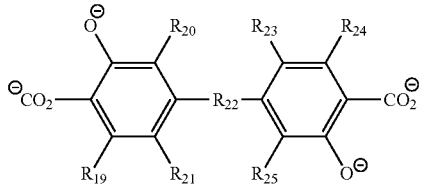

wherein,
$R_{19}$, $R_{20}$, $R_{21}$, $R_{23}$, $R_{24}$, and $R_{25}$ are each independently selected from H, halogen, hydroxyl, methyl, and halogen substituted methyl, and
$R_{22}$ is selected from substituted or unsubstituted aryl, and substituted or unsubstituted heteroaryl.

62. A method for removing $CO_2$ from a multi-component gas mixture comprising $CO_2$ and at least one of $N_2$, $CH_4$, $H_2O$, and $O_2$, the method comprising:
contacting the multi-component gas mixture with the activated adsorption material of claim 1 to reversibly adsorb $CO_2$ from the multi-component gas mixture thereby generating an adsorption material enriched for $CO_2$ and a residual gas that is depleted of $CO_2$.

\* \* \* \* \*